(12) United States Patent
Mathauer et al.

(10) Patent No.: US 6,727,318 B1
(45) Date of Patent: Apr. 27, 2004

(54) METHOD FOR PRODUCING AQUEOUS POLYMER DISPERSIONS CONTAINING COLORANTS

(75) Inventors: Klemens Mathauer, Ludwigshafen (DE); Arno Böhm, Mannheim (DE); Walter Mächtle, Ludwigshafen (DE); Peter Rossmanith, Mannheim (DE); Sabine Kielhorn-Bayer, Maxdorf (DE); Klaus Müllen, Köln (DE); Ulrike Rohr, Mainz (DE); Friedrich-Wilhelm Raulfs, Mannheim (DE); Ulrike Schlösser, Neustadt (DE); Wolfgang Schrof, Neuleiningen (DE); Harutyun Hanciogullari, Limburgerhof (DE); Karl Siemensmeyer, Frankenthal (DE); Paul Delavier, Neustadt (DE); Rüdiger Sens, Ludwigshafen (DE); Torsten Freund, Limburgerhof (DE); Takahiro Ikeda, Yokkaichi (JP); Takanori Wakebe, Mochibuku (JP)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/600,868

(22) PCT Filed: Jan. 13, 1999

(86) PCT No.: PCT/EP99/00157
§ 371 (c)(1),
(2), (4) Date: Aug. 9, 2000

(87) PCT Pub. No.: WO99/40123
PCT Pub. Date: Aug. 12, 1999

(30) Foreign Application Priority Data

Feb. 9, 1998 (DE) .......................... 198 05 121

(51) Int. Cl.⁷ ................................ C08K 3/00
(52) U.S. Cl. ...................... 524/801; 526/214
(58) Field of Search .................. 524/801; 526/214

(56) References Cited

U.S. PATENT DOCUMENTS

| | | |
|---|---|---|
| 4,269,749 A | 5/1981 | Marriott et al. |
| 4,809,954 A | 3/1989 | Delwig et al. |
| 5,108,654 A | 4/1992 | Ragaini |
| 5,151,516 A | 9/1992 | Beck et al. |
| 5,280,121 A | 1/1994 | Hari |
| 5,607,864 A | 3/1997 | Ricchiero et al. |
| 5,710,197 A | 1/1998 | Fischer et al. |
| 5,897,811 A | 4/1999 | Lesko |
| 5,942,560 A | 8/1999 | Idogawa et al. |
| 5,990,221 A | 11/1999 | Dames et al. |

FOREIGN PATENT DOCUMENTS

| | | |
|---|---|---|
| DE | 44 36 892 | 10/1994 |
| DE | 44 24 817 | 1/1996 |
| DE | 195 21 500 | 6/1996 |
| DE | 196 28 143 | 1/1998 |
| DE | 197 56 874 | 6/1999 |
| EP | 238 436 | 3/1989 |
| EP | 422 535 | 9/1992 |
| EP | 465 410 | 1/1994 |
| EP | 691 390 | 1/1996 |
| EP | 566 448 | 3/1997 |
| GB | 2 250 930 | 6/1992 |
| WO | WO 96/22331 | 7/1996 |
| WO | WO 96/22332 | 7/1996 |
| WO | WO 98/02466 | 7/1996 |
| WO | WO 97/22607 | 6/1997 |

OTHER PUBLICATIONS

K. Sonogashira, et al., Tetrahedron Letters, No. 50, pp. 4467–4470, "A Convenient Synthesis of Acetylenes: Catalytic Substitution of Acetylenic Hydrogen with Bromoalkenes, Iodoarenes, and Bromopyridines", 1975.

P. L. Tang, et al., Journal of Applied Polymer Science, vol. 43, pp. 1059–1066, "Miniemulsion Polymerization—A Comparative Study of Preparative Variables", 1991.

*Primary Examiner*—Bernard Lipman
(74) *Attorney, Agent, or Firm*—Oblon, Spivak, McClelland, Maier & Neustadt, P.C.

(57) ABSTRACT

The present invention relates to a process for preparing dye-comprising aqueous polymer dispersions by free-radical aqueous emulsion polymerization of ethylenically unsaturated monomers in the presence of free-radical initiators, in which at least some of the monomers are employed in the form of an oil-in-water emulsion E1 whose disperse phase comprises at least one oil-soluble dye, wherein the disperse phase of E1 is formed essentially of dye-comprising monomer droplets having a diameter <500 nm. The present invention also relates to perylene dyes of the formula III as set forth in claim 35. The present invention relates in addition to dye-comprising formulations which comprise the dye-comprising polymers of the invention and to pigmented formulations which comprise a polymer of the invention comprising optical brightener.

28 Claims, No Drawings

METHOD FOR PRODUCING AQUEOUS POLYMER DISPERSIONS CONTAINING COLORANTS

The present invention relates to a process for preparing dye-comprising aqueous polymer dispersions by free-radical aqueous emulsion polymerization of ethylenically unsaturated monomers, in which at least some of the monomers are employed in the form of an oil-in-water emulsion E1 whose disperse phase comprises at least one oil-soluble dye.

Dye-comprising polymers can in principle be prepared in two different ways. One approach is to take dyes which are of sufficient solubility in polymers, possibly at elevated temperature and to dissolve them homogeneously in these polymers. The advantage in this case lies in particular in the high level of brilliance of the color produced and in the high color strength, i.e., a low dye requirement. However, this approach does have the disadvantage that, under a thermal load or when the polymers are in contact with solvents, the dyes migrate; this results in reduced properties of fastness with respect to weather and migration, since dye molecules that have migrated to the surface of the substrate are attacked by light or oxygen or leached by solvents. The alternative approach is to disperse insoluble color pigments in the polymer matrix. This avoids the disadvantages which may occur when the colorants are dissolved homogeneously in the polymer matrix. A disadvantage of this approach, however, is that the individual molecules of colorant in the pigment crystals interact with one another, leading to a broadening of the absorption bands and thus to an unwanted reduction in the purity of shade and the strength of coloration. Furthermore, the shape anisotropy of the pigment crystallites gives rise to rheology problems, such as thixotroping, on incorporation into the polymeric matrix.

The disadvantages of both approaches can in principle be circumvented by replacing the color pigments by dye-comprising polymer dispersions in which the dye is distributed homogeneously in the polymer particles. "Pigments" of this kind should on the one hand feature high color brilliance and purity of shade and should on the other hand be largely unaffected by rheological problems, owing to the spherical form of the polymer particles.

With optical brighteners, which should be classed as dyes in the wider sense, and specifically as fluorescent dyes, the problem arises that there is a reduction in the fluorescence yield owing to the formation of relatively high molecular mass associations in the pigment crystals. The danger of formation of relatively high molecular mass associations also exists if the optical brighteners migrate from the interior of the polymer matrix to the surface.

Dye-comprising polymer dispersions are fundamentally known. For instance, EP-A 691 390 and DE-A 44 36 892 describe dye-comprising aqueous polymer dispersions based on ethylenically unsaturated monomers, which are obtainable by preparing, in a first step, a polymeric compound in an organic solvent, one or more soluble dyes being added to said organic solvent before, during or after the polymerization, and by converting, in a second step, the resultant dye-comprising polymer solutions into aqueous polymer dispersions. Dye-comprising polymer dispersions of this kind, however, are still not satisfactory in terms of the migration stability of the dyes.

Dye-comprising polymer dispersions based on polyurethanes are known from DE-A 195 21 500. These are likewise secondary dispersions, with the abovementioned disadvantages.

EP-A 566 448 describes dye-comprising aqueous polymer dispersions based on ethylenically unsaturated monomers, which are obtainable by conducting, in a first step, a free-radical aqueous emulsion polymerization of ethylenically unsaturated monomers and by impregnating the resultant polymer dispersions with a solution of dyes in organic solvents. The polymer dispersions obtainable in this way, however, likewise lack satisfactory migration stability of the dyes. The document also refers to the fact that sufficiently water-compatible dyes can be added even during the polymerization. However, the document gives no concrete references to such an embodiment. The use of relatively large amounts of organic solvents, which is required by this approach, is a disadvantage.

U.S. Pat. No. 4,680,332 likewise recommends preparing dye-comprising polymer dispersions by impregnating aqueous polymer dispersions with solutions of organic dyes in solvents such as toluene or chlorobenzene and also impregnation with oil-in-water emulsions of such dye solutions. This approach also fails to produce satisfactory products.

DE-A 44 24 817 describes "fluorescent pigments" in which a fluorescent dye is present in solution in a polymer matrix based on crosslinked poly(meth)acrylates. Polymers of this kind are obtainable by free-radical suspension polymerization of ethylenically unsaturated monomers, including at least one crosslinking monomer, in the presence of the fluorescent dye. A feature of the so-called "fluorescent pigments" is the reduced migration tendency of the fluorescent dyes. A disadvantage, however, is that the preparation process is limited to pigments having particle sizes >2 $\mu$m. Furthermore, the polymer dispersion obtained in this way is not stable to sedimentation. Consequently, such "fluorescent pigments" are unsuitable for a large number of applications, inkjet processes being one example.

It is an object of the present invention to provide a process for preparing dye-comprising polymer dispersions in which the polymer particles comprise at least one organic dye in homogeneous distribution, i.e., in molecularly disperse form, said polymer particles being distinguished by high migration stability of the dyes present in them. This process should, furthermore, make it possible to obtain fine, stable, dye-comprising polymer dispersions.

We have found that this object is achieved by a process of free-radical aqueous emulsion polymerization using an oil-in-water monomer emulsion where the monomers contain the dye in dissolved form, subject to the proviso that the monomer droplets essentially have a diameter <500 nm. Conventional emulsion polymerization, on the other hand, is unsuccessful.

The present invention therefore provides a process for preparing dye-comprising aqueous polymer dispersions by free-radical aqueous emulsion polymerization of ethylenically unsaturated monomers in the presence of free-radical initiators, at least some of the monomers being employed in the form of an oil-in-water emulsion E1 whose disperse phase comprises at least one oil-soluble dye, wherein the disperse phase of E1 is formed essentially of dye-comprising monomer droplets having a diameter<500 nm.

In accordance with the invention, the oil-soluble dyes include organic optical brighteners, i.e., organic molecules having an extended, conjugated $\pi$-electron system, which unlike the $\pi$-electron system of conventional organic dyes absorbs ultraviolet rather than visible-range radiation and emits it as a bluish fluorescence (see Römpp Chemielexikon, $9^{th}$ edition). Optical brighteners are used, for example, to increase the whiteness of white substrates treated with them, such as paper or fabrics.

The process of the invention differs essentially from conventional emulsion polymerizations in the droplet size of the monomer emulsion to be polymerized. In conventional emulsion polymerization techniques, in contradistinction to the process of the invention, the monomer droplets in the polymerization vessel generally have diameters above 1000 nm. The failure of conventional emulsion polymerization in the preparation of dye-comprising polymers can probably be attributed to the fact that in conventional emulsion polymerization the monomer droplets serve solely as a reservoir for the polymers to be polymerized while the actual polymerization reaction takes place in the aqueous dispersion medium or on the polymer particles that are formed in the course of the polymerization. In that case, the monomers, which generally have a certain solubility in water, diffuse from the monomer droplets to the centers of polymerization (an extensive discussion of the mechanism of free-radical aqueous emulsion polymerization is given, for example, in A. Echte, Handbuch der technischen Polymerchemie, pp. 322 to 345). The dye, on the other hand, which does not generally possess sufficient solubility in water, remains in the monomer droplets; homogeneous incorporation of the dyes into the polymer particles is therefore not guaranteed. In contradistinction to the course of polymerization sketched out above, it is presumed that in the process of the invention the polymerization takes place in the monomer droplets. There is therefore homogeneous incorporation of the dyes into the polymeric matrix.

Suitable ethylenically unsaturated monomers in the process of the invention are in principle all monomers which can typically be employed in the context of free-radical aqueous macroemulsion polymerization. Preferably, the major amount of the monomers to be polymerized is made up of monoethylenically unsaturated monomers A having a water solubility >0.01 g/l. These include olefins such as ethylene or propene, vinylaromatic monomers such as styrene, α-methylstyrene, o-chlorostyrene or vinyltoluenes, vinyl halides and vinylidene halides such as vinyl chloride and vinylidene chloride, esters of vinyl alcohol and $C_1$–$C_8$ monocarboxylic acids, such as vinyl acetate, vinyl propionate, vinyl n-butyrate or vinylhexanoate, esters of allyl alcohol and $C_1$–$C_8$ monocarboxylic acids, such as allyl acetate, allyl propionate, allyl n-butyrate and allyl hexanoate, esters of preferably $C_3$–$C_6$ α,β-monoethylenically unsaturated mono- and dicarboxylic acids, such as in particular acrylic acid, methacrylic acid, maleic acid, fumaric acid and itaconic acid, with generally $C_1$–$C_{12}$, preferably $C_1$–$C_8$ and, in particular, $C_1$–$C_4$ alkanols, such as, in particular, methyl, ethyl, n-butyl, tert-butyl, isobutyl and -2-ethylhexyl acrylate and methacrylate, dimethyl maleate or di-n-butyl maleate, and also $C_{4-8}$ conjugated dienes such as 1,3-butadiene and isoprene.

The monomers A additionally include those monomers A' whose homopolymers are of increased water solubility (i.e. >60 g/l at 25° C.). Such monomers A' are used as modifying monomers and are employed generally in amounts <20% by weight based on the total amount of monomers to be polymerized, preferably <10% by weight, for example, in amounts of from 0.1 to 20% by weight based on the monomers to be polymerized. The monomers A' include both monoethylenically unsaturated monomers having at least one acid group, such as a COOH, $SO_3H$ or $PO_3H_2$ group which may also be present in salt form (referred to below as anionic monomers); monoethylenically unsaturated, cationic monomers, especially those having a quaternary ammonium group (i.e. a group $R_3N^\oplus$ in which R is hydrogen or alkyl, especially methyl or ethyl) or an immonium group (i.e. a group $=N^\oplus(R)$ in which R is hydrogen or alkyl, especially methyl or ethyl); and monoethylenically unsaturated, neutral monomers. The amount of monomers A', based on total monomer amount, can be up to 30% by weight, based on the total amount of monomers A.

Examples of monoethylenically unsaturated anionic monomers A' are $C_3$–$C_6$ monoethylenically unsaturated mono- and dicarboxylic acids, such as acrylic acid, methacrylic acid, maleic acid, itaconic acid, acrylamidoglycolic acid, methacrylamidoglycolic acid, acryloyloxyglycolic acid, methacryloyloxyglycolic acid, monoethylenically unsaturated sulfonic acids and phosphonic acids, such as vinylsulfonic acid, allylsulfonic acid, methallylsulfonic acid, styrenesulfonic acid, vinylnaphthalenesulfonic acid and (meth)acrylamido-2-methylpropanesulfonic acid, and also vinylphosphonic acid, allylphosphonic acid, methallylphosphonic acid, styrenephosphonic acid, and (meth)acrylamido-2-methylpropanephosphonic acid, and also the water-soluble salts thereof, examples being their alkali metal salts or ammonium salts, especially their sodium salts. Examples of neutral monomers A' are, in particular, the amides of monoethylenically unsaturated mono- and dicarboxylic acids, such as acrylamide, methacrylamide and maleimide, and also N-vinyllactams of 3 to 8 carbon atoms, such as N-vinylpyrrolidone and N-vinylcaprolactam, and also acrylonitrile. Particularly suitable cationic monomers A' are the quaternization and protonation products of monoethylenically unsaturated amines, examples being the quaternization products of dialkylaminoalkyl esters of monoethylenically unsaturated carboxylic acids, such as the quaternization products of dimethylaminoethyl acrylate or methacrylate, and of diethylaminoethyl acrylate or methacrylate, and also the quaternization products of 1-vinylimidazoles such as 1-vinylimidazole and 1-vinyl-2-methylimidazole with $C_2$–$C_{10}$ oxiranes, $C_1$–$C_{10}$ alkyl halides or $C_1$–$C_{10}$ dialkyl sulfates; for example with methyl halide, ethyl halide, methyl sulfate or ethyl sulfate. Monomers of this kind are known, for example, from EP-A 246580 and U.S. Pat. No. 4,859,756. The quaternization products of 1-vinylimidazoles are also referred to below as vinylimidazolium salts and the quaternization products of aminoalkyl acrylates or methacrylates as (meth)acryloyloxyalkylammonium salts.

It has proven advantageous for the process of the invention, and especially for the stability of the emulsion E1, if the monomers to be polymerized include not only the monomers A having a water solubility >0.01 g/l but also monomers B which possess a water solubility <0.01 g/l (at 25° C. and 1 atm).

The ethylenically unsaturated monomers to be polymermerized preferably comprise from 50 to 99.5% by weight, based on the total amount of the monomers A and B, in particular from 80 to 99% by weight and, with very particular preference, from 90 to 98% by weight of at least one monomer A and from 0.5 to 50% by weight, in particular from 1 to 20% by weight and, with very particular preference, from 2 to 10% by weight of at least one monomer B.

Examples of monomers B having a low water solubility as required above are 2- and 4-n-butylstyrene, p-tert-butylstyrene, esters of $C_3$–$C_6$ α,β-monoethylenically unsaturated carboxylic acids and at least $C_{12}$ (generally up to $C_{30}$) alkanols, such as lauryl acrylate and stearyl acrylate, for example. Such monomers B also, however, include esters of vinyl alcohol or allyl alcohol with at least $C_9$ (generally up to $C_{30}$) alkanecarboxylic acids, examples being vinyl nonanoate, vinyl decanoate, vinyl laurate and vinyl stearate, and also commercial monomers VEOVA® 9–11 (VEOVA X is a trade name of Shell and stands for vinyl esters of carboxylic acids which are also designated as Versatic® X acids). Further such monomers B include macromonomers such as oligopropene acrylate (very generally, macromonomers are polymeric or oligomeric compounds which have at least one, usually terminal, ethylenically unsaturated double bond; to be useful as a monomer B of minimal solubility in water their relative number-average molecular weight should preferably be not more than 100,000; in general this relative number-average molecular weight will be from 1000 to 50,000 or from 2000 to 50,000; macromonomers are known to the skilled worker; their preparation is described, for example, in Makromol. Chem. 223 (1994) 29–46). In very general terms, suitable monomers B of minimal solubility in water are all those whose molar solubility at 25° C. and 1 atm in water is lower than the corresponding solubility of lauryl acrylate. Further examples of such monomers B are the methacryloyl-polybutyl acrylate AB-6 and the methacryloyl-polystyrene A5-6 from Toa Gosei Kagaku KK (JP), both of which have a number-average relative molecular weight of 6000. Other compounds B which can be employed as macromonomers having low water solubility are Polyol 130 and Polyol 110 from Hüls AG (low-viscosity stereospecific polybutadiene (75% 1,4-cis, 24% 1,4-trans, 1% vinyl) whose dynamic viscosity at 20° C. is 3000 mPa·s).

Rather than using monomers B, the stability of the emulsion E1 can also be improved by using noncopolymerizable compounds B' having a water solubility <0.01 g/l. Such compounds B' can be used together with or in place of the monomers B. Compounds B' are preferably used in amounts of less than 10% by weight, based on the total amount of the monomers A and B.

One example of a compound B' is Acronal® A 150 F, a poly-n-butyl acrylate from BASF AG, whose 50% strength by weight solution in ethyl acetate at 23° C. and 1 atm has a viscosity (determined in accordance with ISO 3219, DIN 53019, at 250 $s^{-1}$) of 33 mPa·s.

Another suitable compound B' is PnBa, a high-temperature solution polymer of n-butyl acrylate (120° C. in isopropanol) having a K value of 24 as determined at 25° C. in isopropanol. The K value is a relative viscosity number which is determined in analogy to DIN 53726. It constitutes the flow rate of the pure solvent relative to the flow rate of the 0.1% strength by weight solution of the polymer in the same solvent (cf. also Cellulosechemie 13 (1932), 58–64 and Kirk-Othmer, Encyclopedia of Chemical Technology, Vol. 23, pp. 967–968). The K value is a measure of the average molecular weight of a polymer. A high K value corresponds to a high average molecular weight.

Further possible compounds B' are resins such as rosins (cf. Ullmanns Encycl. Techn. Chem., $4^{th}$ edition (1976), Vol. 12, pp. 525–538) and hydrocarbon resins (cf. Encycl. Polym. Sci. Eng. (1987) Vol. 7, pp. 758–782), such as Kristalex F 85 from Hercules for example. Mention may be made, by way of example, of Foral® 85 E, a glyceryl ester of highly hydrogenated rosin (softening point: 86° C.) from Hercules. Further suitable compounds B' are polystyrenes (cf. C. M. Miller et al., J. Polym. Sci.: Part A: Polym. Chem. 32, 2365–2376, 1994).

In addition, however, other water-insoluble, oil-soluble substances such as aliphatic and aromatic hydrocarbons (e.g. hexadecane), film-forming auxiliaries or plasticizers such as Plastilit® 3060 from BASF (a technical-grade mixture of the di-n-butyl esters of $C_4$–$C_6$ dicarboxylic acids) are suitable as possible compounds B'.

In the process of the invention it has proven advantageous if the monomers to be polymerized also include crosslinking monomers C. These are, in particular, monomers C having at least 2 nonconjugated double bonds. Such monomers C are, if desired, employed in an amount of from 0.1 to 30% by weight, based on the total amount of the monomers to be polymerized, in particular from 0.5 to 20% by weight and, with very particular preference, from 1 to 10% by weight.

Suitable monomers C include, for example, the vinyl, allyl and methallyl esters of the abovementioned ethylenically unsaturated carboxylic acids and also the esters of these acids with tricyclodecenyl alcohol, especially the esters of methacrylic acid and acrylic acid, the esters of the abovementioned ethylenically unsaturated carboxylic acids with polyhydric alcohols, such as ethylene glycol diacrylate, ethylene glycol dimethacrylate, butanediol diacrylate, butanediol dimethacrylate, hexanediol diacrylate, hexanediol dimethacrylate, triethylene glycol diacrylate, triethylene glycol trimethacrylate, tris(hydroxymethyl)ethane triacrylate and trimethacrylate, pentaerythritol triacrylate and trimethacrylate, and also the allyl and methallyl esters of polyfunctional carboxylic acids, such as diallyl maleate, diallyl fumarate and diallyl phthalate. Further typical monomers C are compounds such as divinylbenzene, divinylurea, diallylurea, triallylcyanurate, and N,N'-divinyl- and N,N'-diallylimidazolidin-2-one, and also methylenebisacrylamide and methylenebismethacrylamide. As monomers C, furthermore, it is also possible to employ the anhydrides of monoethylenically unsaturated carboxylic acids, such as methacrylic anhydride.

Instead of or together with the monomers C it is also possible to use monoethylenically unsaturated monomers D which instead of the at least one further ethylenically unsaturated bond have a functional group which is capable of subsequent crosslinking of the polymer or of a reaction with a functional group of the dye that does not belong to the chromophore of the dye. Functional groups of this kind are typically selected from epoxy, hydroxyl, N-methylol and carbonyl groups. Examples of monomers D are N-alkylolamides of the abovementioned ethylenically unsaturated carboxylic acids, e.g., N-methylol(meth)acrylamide, the hydroxyalkyl esters of the abovementioned ethylenically unsaturated carboxylic acids, especially hydroxyethyl (meth)acrylate, the bisacetonylamides of the abovementioned ethylenically unsaturated carboxylic acids, especially N,N-bisacetonyl(meth)acrylamide, and also the vinyl, allyl and methallyl glycidyl ethers, glycidyl esters of the abovementioned ethylenically unsaturated carboxylic acids, such as glycidyl (meth)acrylate, and, furthermore, the esters of acetylacetic acid with the hydroxyalkyl esters of the abovementioned ethylenically unsaturated carboxylic acids, e.g., acetylacetoxyethyl (meth)acrylate. Said monomers D can where desired be copolymerized in amounts of from 0.1 to 30% by weight, based on the total amount of the monomers to be polymerized. In general, the total amount of monomers C and monomers D will not exceed 30% by weight, preferably 20% by weight and, in particular, 10% by weight, based on the total amount of the monomers to be polymerized. In one preferred embodiment the monomers to be polymerized include at least one monomer C and/or D in a total amount of >0.1% by weight, in particular in an amount of from 0.5 to 20% by weight and, especially, from 1 to 15% by weight, based on the total amount of the monomers to be polymerized. In one preferred embodiment the monomers to be polymerized include not only monomers A and, if desired, B but also, exclusively, monomers C in an amount of from 0.5 to 20% by weight, in particular from 1 to 15% by weight. Instead of or together with the monomers C it is also possible to employ anhydrides of ethylenically unsaturated dicarboxylic acids.

Furthermore, it can be of advantage if the process of the invention is conducted in the presence of an organosilicon compound which on hydrolysis forms silanol groups and has at least one polymerization-active group. By polymerization-active groups are meant those functional groups which, in a free-radical polymerization reaction, react with the growing polymer chain to form a covalent bond. Preferred copolymerization-active groups are, in particular, mercapto groups and ethylenically unsaturated double bonds. Examples of such compounds include vinyl-, allyl- and methallyltrialkoxysilanes, examples being vinyl-, allyl- and methallyltrimethoxysilane, and also acryloxyalkyl- and methacryloxyalkyltrialkoxysilanes such as methacryloxypropyltrimethoxysilane and methacryloxypropyltriethoxysilane, and also γ-mercaptoalkyltrialkoxysilanes, such as 3-mercaptopropyltrimethoxysilane. Compounds of this type are likewise counted among the crosslinking monomers D and can be copolymerized in amounts of up to 20% by weight, in particular up to 10% by weight, based on the total amount of monomers to be polymerized.

Suitable oil-soluble dyes for the process of the invention are all those dyes which are of sufficient solubility in the monomers to be polymerized. Particularly suitable dyes are those whose solubility in the monomers is >0.01% by weight, preferably >0.05% by weight, in particular >0.1% by weight, with particular preference >0.5% by weight and, with very particular preference, >1% by weight. The dyes will generally be employed in amounts of from 0.001 to 20% by weight, preferably from 0.01 to 10% by weight and, in particular, from 0.02 to 5% by weight, based on the monomers to be polymerized. Depending on the desired depth of color and solubility of the dye in the monomers to be polymerized it is also possible to employ up to 50% by weight, in particular up to 40% by weight and, for example, from 5 to 30% by weight of dye, based on the monomers to be polymerized.

Dyes having basic amino groups, which are usually present in their salt form and therefore only of poor solubility in the monomers, can also be employed in the process of the invention if the dyes are subjected to salt exchange with long-chain carboxylic acids, for example, those of 8 to 22 carbon atoms, with dialkyl phosphates, with monoalkyl phosphates or with alkylsulfonic acids, such as dodecylsulfonic acid. Correspondingly, dyes having acidic functional groups, or salts thereof, can be converted into a monomer-soluble form by salt exchange with long-chain amines, for example, those of 8 to 22 carbon atoms. Examples of suitable long-chain carboxylic acids are fatty acids such as capric acid, palmitic acid, stearic acid, oleic acid, linoleic acid and linolenic acid; suitable amines are, for example, primary, linear or branched-chain alkylamines of 8 to 22 carbon atoms. For salt exchange it is generally sufficient to combine the dye with the long-chain carboxylic acid or amine or salts thereof in the monomers and to heat this mixture until the dye dissolves, with exclusion of oxygen and with stirring if desired.

The dyes employed in accordance with the invention generally feature a chromophore having an extended π-electron system and preferably at least one, or more, substituents which improve the solubility of the dyes in nonpolar media or media of low polarity, such as the monomers. Suitable substituents include alkyl, uninterrupted or interrupted by heteroatoms and unsubstituted or substituted by hydroxyl or halogen, and further include alkoxy, dialkylamino, dialkylaminocarbonyl, alkyloxycarbonyl, alkylcarbonylamino, alkylcarbonyloxy, aryl, aryloxy, arylcarbonyl, arylcarbonyloxy, arylcarbonylamino, aryloxycarbonyl, arylaminocarbonyl, arylalkyl, cycloalkyl, halogen.

Alkyl here and below refers to either linear or branched alkyl which as far as is indicated can be interrupted by one or more nonadjacent oxygen atoms, sulfur atoms, imino groups or alkylimino groups and/or can be substituted one or more times by halogen or hydroxyl. Examples of unsubstituted alkyl groups include methyl, ethyl, n-propyl, i-propyl, n-butyl, 2-butyl, isobutyl, tert-butyl, n-pentyl, isopentyl, neopentyl, tert-pentyl, hexyl, 2-methylpentyl, heptyl, 1-ethylpentyl, n-octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl. Examples of oxygen-interrupted alkyl groups include 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-isopropoxypropyl, 2- or 3-butoxypropyl, 2- or 3-(2-ethylhexyloxypropyl) etc. Halogen-substituted alkyl groups include in particular perfluoroalkyl groups of 1 to 4 carbon atoms, such as trifluoromethyl. Examples of hydroxy-substituted alkyl groups are hydroxymethyl, 1- or 2-hydroxyethyl, 1-, 2- or 3-hydroxypropyl and 1,2-bishydroxyethyl.

By aryl is meant in particular phenyl or naphthyl which is unsubstituted or substituted by 1, 2 or 3 substituents selected from $C_1$–$C_4$-alkyl, $C_1$–$C_4$-alkyloxy, halogen and hydroxyl, which if desired may also be ethoxylated. Arylalkyl stands for aryl which is attached via an alkylene group having preferably 1 to 6 and especially 1 to 4 carbon atoms. Examples of $C_1$–$C_4$-alkylene include methylene, 1,1-ethylene, 1,2-ethylene, 1,1-propylene, 1,2-propylene, 2,2-propylene, 1,3-propylene and 1,4-butylene. Examples of arylalkyl include in particular benzyl and 2-phenylethyl, which if desired are also substituted.

Examples of cycloalkyl are aliphatic monocycles such as cyclopentyl, cyclohexyl and cycloheptyl and also aliphatic polycycles such as norbornyl, adamantyl or decahydronaphthyl, which can be substituted like aryl. By heterocycloalkyl is meant aliphatic mono- and polycyclic radicals which have at least one heteroatom in the ring, e.g. S, O and/or N. Examples of such radicals are pyrrolidinyl, furanyl, piperidinyl, oxazolidinyl, morpholinyl and tetrahydropyranyl. By heteroaryl are meant radicals which are derived from unsubstituted or substituted, unfused or benzofused heteroaromatic compounds such as thiophene, pyrrole, pyrazole, imidazole, oxazole, thiazole, pyridine, pyrimidine, pyridazine, triazine, quinoline, quinazoline, and the like.

In the process of the invention the organic, oil-soluble dyes are selected, for example, from oil-soluble derivatives of naphthalene, perylene, terrylene, quaterrylene, diketopyrrolopyrrole, from perinone dyes, coumarin dyes, oxazine dyes, anthracene dyes, naphthacene dyes, anthraquinone dyes, azo dyes, methine dyes, azamethine dyes, isoindoline dyes and isoindolinone dyes, porphyrins, phthalocyanines and naphthalocyanines, and also the metal complexes of the three last-mentioned dye classes. Here and below, oil solubility of the dye means that the dye is soluble at least to a limited extent in the monomers to be polymer ized so that under polymerization conditions it is present in solution or, if appropriate, in molecularly disperse form (i.e., distributed homogeneously in the monomer phase in the form of bimolecular aggregates or higher polymolecular aggregates) in the monomers.

Examples of suitable oil-soluble coumarin dyes are described in U.S. Pat. No. 3,880,869 and DE-A 44 24 817, the full content of which is hereby incorporated by reference.

Examples of suitable nonpolar perylene dyes are those as described in U.S. Pat. No. 4,618,694, DE-A 24 51 782, U.S. Pat. No. 4,379,934, U.S. Pat. No. 4,446,324, EP-A 277 980, EP-A 657 436 or WO 96/22332. Further suitable nonpolar perylene dyes can be found, for example, in EP-A 73 007. The documents cited are hereby incorporated fully by reference.

Suitable naphthalene dyes include, inter alia, naphthalene-1,8-dicarboximides substituted on the imide nitrogen by unsubstituted, linear or branched $C_1$–$C_{20}$-alkyl or aryl, which may carry $C_1$–$C_6$-alkoxy substituents in position 4 and/or 5 of the naphthalene ring system.

Suitable anthracene dyes include, inter alia, 9,10-diphenylanthracene, 9,10-bisphenylethynylanthracene and 1,8-dichloro-9,10-bisphenylethynylanthracene. Examples of suitable anthracene dyes can be found, for example, in Ullmann's Encyclopedia of Industrial Chemistry, 5th Edition, Vol. A2, p. 402 f. Examples of suitable porphyrin dyes include tetraphenylporphyrin and octaethylporphyrin and also the zinc or nickel complexes thereof. Examples of suitable phthalocyanine dyes are metallophthalocyanines, especially copper phthalocyanines, which have solubilizing alkyl groups of preferably 10 to 20 carbon atoms on the phenylene units of the choromophore, it being possible for the alkyl radicals to be attached to the chromophore directly or by way of a functional group; for example, by way of a sulfonamide group. Common in commerce are, for example, sulfonamides of mono- or polysulfonated metallophthalocyanines with $C_{10}$–$C_{20}$-alkylamines, an example being the tetrasulfonamide of tetrasulfonated copper phthalocyanine with stearylamine.

The following dyes are particularly worthy of note:

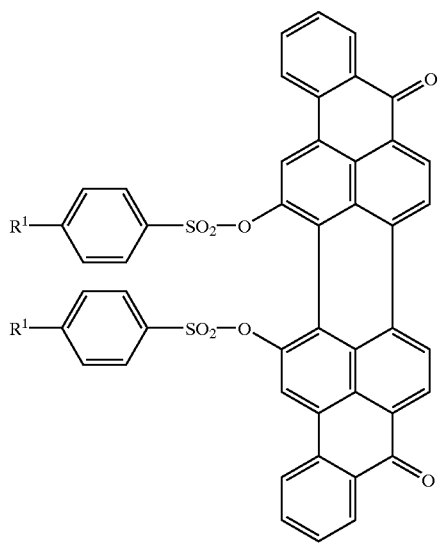

in which $R^1$ is an alkyl radical, especially a $C_1$–$C_{13}$-alkyl radical;

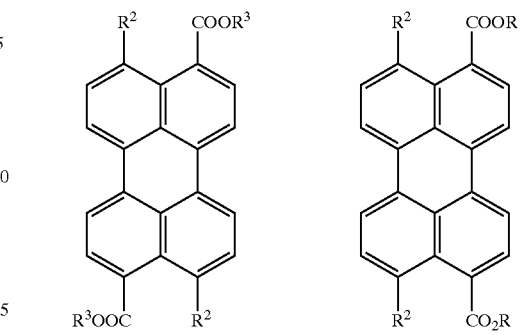

in which $R^2$ is a hydrogen atom or a cyano group and $R^3$ is a $C_1$–$C_{11}$-alkyl group;

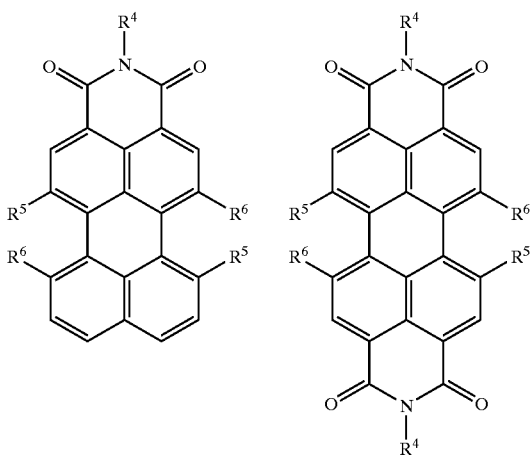

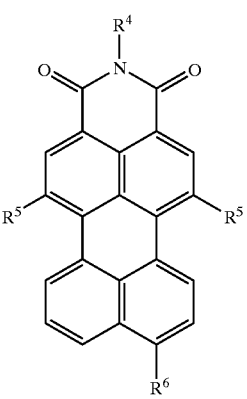

in which $R^4$ is $C_5$–$C_{20}$-alkyl, which is uninterrupted or interrupted by one or more nonadjacent oxygen atoms, or phenyl which is unsubstituted or substituted one or more times by $C_1$–$C_{13}$-alkyl or $C_1$–$C_{13}$-alkoxy, and $R^5$ and $R^6$ independently of one another are hydrogen, chloro, bromo, phenoxy or halogen-, cyano-, $C_1$–$C_4$-alkyl- or $C_1$–$C_4$-alkoxy-substituted phenoxy;

In accordance with the invention, the oil-soluble dyes also include optical brighteners which are soluble in the monomers to be polymerized, i.e., oil-soluble. Examples of suitable optical brighteners are compounds from the classes of the bisstyrylbenzenes, stilbenes, benzoxazoles, coumarins, pyrenes and naphthalenes.

Optical brighteners from the class of the naphthalenes are, for example, compounds of the formula:

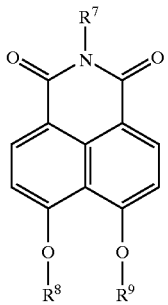

in which $R^7$ is $C_5$–$C_{20}$-alkyl which is uninterrupted or interrupted by an oxygen atom, or, phenyl which is substituted one or more times by $C_1$–$C_{13}$-alkyl or $C_1$–$C_{13}$-alkoxy, and is preferably 3-pentyl or

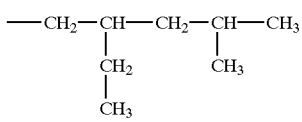

and $R^8$ and $R^9$ are $C_1$–$C_6$-alkyl, especially methyl, ethyl, n-propyl, isopropyl, n-butyl or tert-butyl.

Suitable optical brighteners from the class of the bisstyrylbenzenes are, in particular, compounds of the formula:

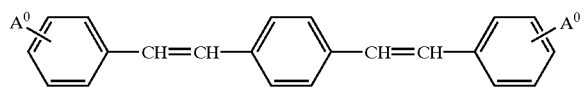

in which the radicals $A^0$ independently of one another are H, Cl, Br, I, CN, trifluoromethyl, $C_1$–$C_4$-alkoxy, $C_1$–$C_4$-alkylcarbonyl, $C_1$–$C_4$-alkoxycarbonyl or $C_1$–$C_4$-alkylsulfonyl. Independently of one another, the central double bonds preferably have an E configuration. Independently of one another, the radicals $A^0$ can be arranged in the ortha, meta or para position with respect to the central double bond. Preferably, at least one of the radicals $A^0$ is a CN group. Examples of compounds of this type are o,o-dicyanobisstyrylbenzene (=1,4-bis(2'-cyanostyryl)benzene), o,m-dicyanobisstyrylbenzene, o,p-dicyanobisstyrylbenzene, m,m-dicyanobisstyrylbenzene, m,p-dicyanobisstyrylbenzene, p,p-dicyanobisstyrylbenzene, o-cyano-p-methoxycarbonylbisstyrylbenzene (=1-(2-cyanostyryl)-4-(4-methoxycarbonylstyryl)benzene and p,p-dimethoxycarbonylbisstyrylbenzene (=1,4-bis(4'-methoxycarbonylstyryl)benzene).

Suitable optical brighteners from the class of the stilbenes conform, for example, to the formulae

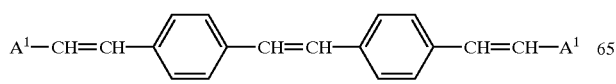

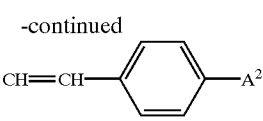

in which $A^1$ independently at each occurrence is $C_1$–$C_4$-alkoxycarbonyl or cyano, respectively, and $A^2$ independently at each occurrence is benzoxazol-2-yl which can be substituted once or twice by $C_1$–$C_4$-alkyl, especially methyl, or is $C_1$–$C_4$-alkoxycarbonyl or 3-($C_1$–$C_{14}$-alkyl)-1,2,4-oxadiazol-3-yl.

Suitable optical brighteners from the class of the benzoxazoles conform, for example, to the formulae

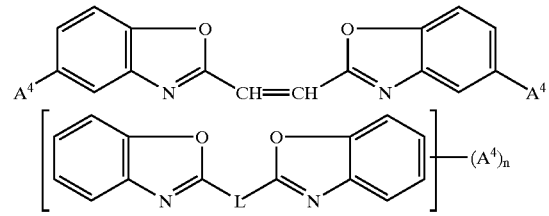

in which $A^4$ independently at each occurrence is H or $C_1$–$C_4$-alkyl, especially methyl, respectively, L is a radical of the formula

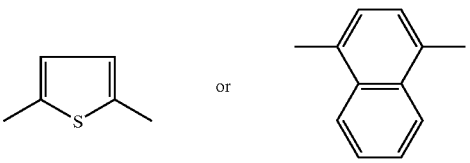

and n is 0, 1 or 2.

Suitable optical brighteners from the class of the coumarins conform, for example, to the formula

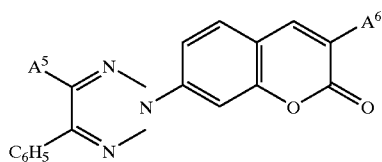

in which $A^5$ is H or $C_1$–$C_4$-alkyl and $A^6$ is phenyl or 3-halopyrazol-1-yl, especially 3-chloropyrazol-1-yl.

Suitable optical brighteners from the class of the pyrenes conform, for example, to the formula

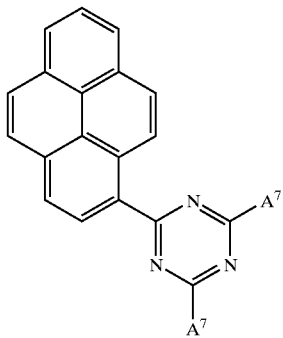

in which

A⁷ respectively, independently at each occurrence, is H or $C_1$–$C_4$-alkoxy, especially methoxy.

It is possible to employ the abovementioned brighteners alone or else as mixtures with one another.

The abovementioned optical brighteners are generally commercial products which are known per se. They are described, for example, in Ullmann's Encyclopedia of Industrial Chemistry, 5th Edition, Volume A18, pages 156 to 161, or can be obtained by the methods specified there.

In one preferred embodiment of the present invention use is made of dyes which have at least one copolymerizable, ethylenically unsaturated double bond which does not belong to the chromophore of the dye. In general, the dyes involved in this case are those which are described by the formula I $$Q\text{—}X\text{—}S\text{—}P \quad (I)$$

in which

X is selected from a single bond, ethynylene or —(CH$_2$)$_k$—X'— where
k=0, 1, 2, 3 or 4 and
X' is selected from —O—; —N(R)—; —S—; —O—C(O)—; —O—C(O)—O—; —O—C(O)—N(R')—; —N(R')—C(O)—; —N(R')—C(O)—O—; —N(R')—C(O)—N(R'')—; —C(O)—; —C(O)—O—; —C(O)—N(R')—; —S(O)$_2$—O—; —S(O)$_2$—N(R')—; —O—S(O)$_2$—; —N(R')—S(O)$_2$—; in which R is hydrogen, linear or branched $C_1$–$C_6$-alkyl, aryl, aryl-$C_1$–$C_6$-alkyl, $C_1$–$C_6$-alkylcarbonyl, arylcarbonyl or formyl and R', R'' independently of one another are hydrogen, linear or branched $C_1$–$C_6$-alkyl, aryl or aryl-$C_1$–$C_6$-alkyl which are optionally substituted by OH, halogen, $C_1$–$C_4$-alkyl or $C_1$–$C_4$-alkyloxy.

S is selected from a single bond, $C_1$–$C_{12}$-alkylene which can be interrupted by one or more nonadjacent oxygen atoms, sulfur atoms or (alkyl)imino groups, or is 1,2-, 1,3- or 1,4-phenylene which optionally has one or two substituents selected from $C_1$–$C_4$-alkyl, $C_1$–$C_4$-alkyloxy or halogen, or is 1,2-, 1,3- or 1,4-xylylene which is optionally substituted as for phenylene, and P is a polymerizable group of the formula II

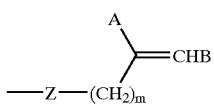

in which

A and B independently of one another are hydrogen, $C_1$–$C_6$-alkyl or phenyl, or A and B together with the double bond to which they are attached form a cyclopentene or cyclohexene ring,
m is 0, 1, 2 or 3, and
Z is a single bond or possesses one of the definitions indicated above for X', and
Q is the chromophore of an organic dye.

In formula I, X is preferably a single bond, ethynylene or X' (k=0). S is preferably selected from a single bond, $C_1$–$C_2$-alkylene, especially $C_1$–$C_6$-alkylene, 1,2-, 1,3- and 1,4-phenylene. Q is preferably derived from one of the abovementioned dyes, especially from perylene dyes. P is preferably a group of the formula II in which A is hydrogen or $C_1$–$C_4$-alkyl, especially methyl, B is hydrogen or methyl and m is 0 or 1. In particular, P is vinyl, allyl, methallyl, acrylamido, methacrylamido, acryloxy, methacryloxy, 3-vinylureido, 3-allylureido, 3-methallylureido, N-vinylaminocarbonyloxy, N-allylaminocarbonyloxy or N-methallylcarbonyloxy.

Copolymerizable dyes of the formula I are known in principle. For example EP-A-090 282 and EP-A-260 687 describe copolymerizable anthraquinone dyes of the formula I. EP-A-090 282, furthermore, discloses copolymerizable azo dyes.

In one particularly preferred embodiment of the present invention, copolymerizable perylene dyes of the formula III

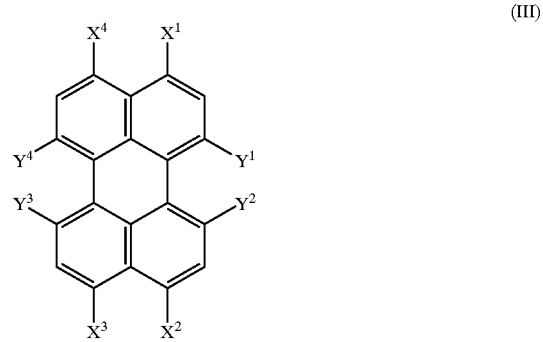

are employed in which one or two of the groups $X^1$ to $X^4$, $Y^1$ to $Y^4$ are a radical of the formula IV $$\text{—X—S—P} \quad (IV)$$

in which X, S and P are as defined above, or $X^1$ together with $X^4$ and/or $X^2$ together with $X^3$ may alternatively be a group of the formula V

in which S and P possess one of the abovementioned definitions, and
the remaining groups $X^1$ to $X^4$, $Y^1$ to $Y^4$ independently of one another are selected from hydrogen, linear or branched $C_1$–$C_{12}$-alkyl which can if desired be interrupted by one or more nonadjacent oxygen atoms, sulfur atoms or by (alkyl)imino groups and/or can be substituted by OH and/or halogen, or are cycloalkyl, heterocycloalkyl, aryl, hetaryl, aryl-$C_1$–$C_6$-alkyl, hetaryl-$C_1$–$C_6$-alkyl, $C_2$–$C_{18}$-alkynyl, arylethynyl, tris($C_1$–$C_4$-alkyl)silylethynyl, cyano, nitro, halogen and/or atomic groups selected from:

—O—R'; —O—C(O)—R'; —N(R')—C(O)—R";
—NRR'; —C(O)—R'; —C(O)—OR'; —C(O)—
NR'R"; —N(R')—C(O)—OR"; —N(R')C(O)—NRR",
—O—S(O)$_2$—R', —N(R')—S(O)$_2$—R". R, R' and R" here have the definitions indicated above.

In the remaining groups $X^1$ to $X^4$, $X_1$ together with $X^4$ and/or $X^2$ together with $X^3$ can alternatively be —X"—C(O)—, —C(O)—N(R''')—C(O)— or —C(O)—O—C(O)—, in which R''' has the definitions indicated above for R' and R" respectively and X" is —CH=CH—, 1,2-phenylene, 1,2-naphthylene, 2,3-naphthylene or 2,3-pyridinylene, each of which is unsubstituted or substituted once or twice by $C_1$–$C_4$-alkylene, $C_1$–$C_4$-alkoxy or halogen.

Dyes of the formula III in which $X^1$ together with $X^4$ is a group of the formula V in accordance with the above definition and $X^2$ together with $X^3$ is a group of the formula —C(O)—N(R''')—C(O)— are known from U.S. Pat. No. 4,667,036 and EP A-422 535. These dyes are suitable for the process of the invention. However, ease of access to them is limited by the asymmetric substitution pattern and the attendant complexities of preparation.

Dyes of the formula III, with the exception of dyes in which $X^1$ together with $X^4$ is a group of the formula V and $X^2$ together wth $X^3$ is a group of the formula —C(O)—N(R''')—C(O)— are novel and likewise provided by the present invention.

In preferred dyes of the formula III, $X^1$ and $X^4$ form either a group of the formula V in accordance with the above definition (dyes IIIa) or a group of the formula —C(O)—N(R''')—C(O)— (dyes IIIb).

In the dyes IIIa, the remaining groups $X^2$ and $X^3$ are preferably different in meaning from —X—S—P and in particular are selected independently of one another from hydrogen, linear or branched $C_1$–$C_{12}$-alkyl which is uninterrupted or interrupted by one or more nonadjacent oxygen atoms, sulfur atoms or by (alkyl)imino groups and/or is unsubstituted or substituted by halogen, and from alkyloxy, unsubstituted or substituted aryl or aryloxy, and halogen. $Y^1$ to $Y^4$ in the dyes IIIa have one of the abovementioned definitions other than X—S—P.

In the dyes IIIb, one of the groups $X^2$ and $X^3$ is preferably a group —X—S—P. The remaining group $X^2$ or $X^3$ then has one of the abovementioned definitions other than X—S—P.

Preference is also given to perylene dyes of the formula III in which $X^1$, $X^3$ and $X^4$ independently of one another are selected from hydrogen, linear or branched $C_1$–$C_{12}$-alkyl which can be uninterrupted or interrupted by one or more nonadjacent oxygen atoms, sulfur atoms or by (alkyl)imino groups and/or can be unsubstituted or substituted by OH and/or halogen, and from alkyloxy, cycloalkyl, cycloalkyloxy, $C_2$–$C_8$-alkynyl, tris($C_1$–$C_4$-alkyl) silylethynyl, aryl, aryloxy, halogen and cyano, $X^2$ is a group of the formula IV

—X—S—P (IV)

in which X, S and P are as defined above, and
$Y^1$ to $Y^4$ possess the definitions indicated above other than —X—S—P (dyes IIIc).

A fourth class of dyes of the formula III comprises those dyes in which both $X_1$ with $X^4$ and $X^2$ with $X^3$ are a group of the formula V as defined above (dyes IIId).

$Y^1$ to $Y^4$ in formula III are preferably hydrogen or halogen, or phenoxy, the latter being unsubstituted or substituted. Preferred substituents in this case are halogen, especially chloro and bromo, $C_1$–$C_4$-alkyl, e.g., methyl, ethyl, n-propyl, n-butyl and tert-butyl, or $C_1$–$C_4$-alkyloxy, e.g., methoxy, ethoxy, n-propyloxy, n-butyloxy or tert-butyloxy.

The group S in formula IV or V is preferably a single bond, linear or branched, preferably linear, $C_1$–$C_{12}$-alkylene, 1,4-phenylene/or 1,4-phenylene-$C_1$–$C_4$-alkylene. X is preferably ethynylene or a single bond.

Very particularly preferred perylene dyes of the formula III have a group of the formula IV or V in which P is vinyl, allyl, methallyl, acrylamido, methacrylamido, acryloxy, methacryloxy, 3-vinylureido, 3-allylureido, 3-methallylureido, N-vinylaminocarbonyloxy, N-allylaminocarbonyloxy or N-methallylaminocarbonyloxy.

The dyes of the formula III according to the invention can be prepared by conventional methods, starting from known perylene derivatives. Perylene derivatives suitable as starting compounds are described, for example, in EP-A-238 436, EP-A-465 410, WO 97/22 607 and WO 96/22 332 and by Rademacher et al., Chem. Ber. 115, 1982, 2972, Quante et al., Macromol. Chem. Phys. 197, 1996, 4029, Feiler et al., Liebigs Ann. 1995, 1229, Schlichting et al., Liebigs Ann./Recueil 1997, 395 and Kaiser et al., Chem. Ber. 124, 1991, 529.

Usually, in the known perylene derivatives, by conventional methods—for example, by esterification or amidation of perylenecarboxylic acids, by imidation of perylenedicarboxylic acids, by esterification or etherification of hydroxyl-functionalized perylenes, by alkylation of perylenecarboxamides or perylenecarboximides (or perylenetetracarboxylic diimides)—groups —X—S—$R^f$ or groups —X—S—P are introduced. In these groups, X, S and P are as defined above. $R^f$ is a functional group which can be converted into a polymerizable group P or which is able to form a chemical bond with an ethylenically unsaturated compound W having a reactive group $R^w$ which is complementary to $R^f$.

In principle the reactive group $R^f$ can also be in latent form and can be converted into the reactive form $R^f$ only by subsequent chemical modification. Typical reactive groups $R^f$ include hydroxyl groups, primary and secondary amino groups, which can be reacted with ethylenically unsaturated carboxylic acids or carboxylic acid derivatives, such as carbonyl chlorides, carboxylic anhydrides, or with isocyanates or allyl halides to give the desired end products. The groups —X—S—$R^f$ and —X—S—P can also be introduced into the perylene compound by means of transition metal-catalyzed aryl/aryl coupling, aryl/alkynyl coupling or Heck reaction. The abovementioned reaction types are fundamentally known to the skilled worker and can be employed analogously to prepare the perylene compounds of the invention (in this respect cf. J. March, Advanced Organic Chemistry, John Wiley & Sons, New York, 1992; Larock, Comprehensive Organic Transformations, VCH Verlagsgesellschaft, Weinheim, 1989).

The dyes IIIb and IIIc are obtainable, for example, starting from perylene compounds of the formula VI

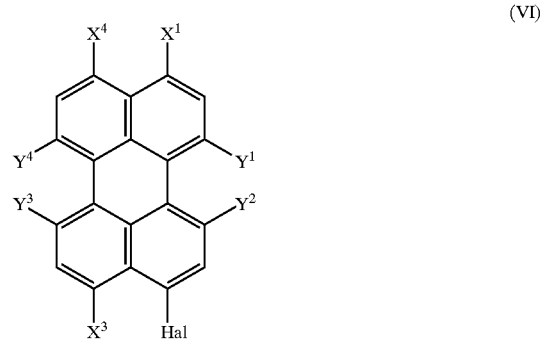

(VI)

in which $X^1$, $X^3$ and $X^4$ and $Y^1$ to $Y^4$ possess one of the definitions given above other than halogen and —X—S—P, and Hal is halogen, especially bromo. Preferably, $X^1$ and $X^4$ are selected independently from hydrogen, $C_1$–$C_{12}$-alkyl and aryl. $X^1$ and $X^4$ can also together be —C(O)—N(R''')—C(O)—. $X^3$ is hydrogen in particular. Such compounds are described, for example, by Schlichting et al. (see above), and in WO 96/22 332. The compounds of the formula VI can then be reacted, in analogy to the procedure described in Schlichting et al. (see above), with suitable ω-functionalized alkynes (see also Tetrahedron Lett. 50, 1975, 4467). Reactive groups, such as OH groups or $NH_2$ groups, can then be liberated from the coupling products, directly or following hydrogenation of the ethynyl groups, by conventional methods (see e.g. Schlichting et al. and literature referred to therein) and these groups can subsequently be reacted with a reactive ethylenically unsaturated compound W, an example being the acid chloride of an ethylenically unsaturated carboxylic acid, such as acryloyl chloride, or an ethylenically unsaturated isocyanate, such as allyl isocyanate, to give the desired compounds IIIa or IIIb respectively. The last-mentioned reaction will typically be conducted in an inert, aprotic solvent; for example, in an aliphatic or cycloaliphatic ether, an aromatic hydrocarbon or a nitrogen-containing solvent such as pyridine, quinoline or N-methylpyrrolidone.

The reaction of the acid chlorides will preferably be conducted in the presence of a base. Typical bases are trialkylamines, such as triethylamine, tripropylamine, tributylamine, and also diazabicyclooctane and diazabicycloundecene. The chosen ratio of base to acid chloride is typically equimolar.

Based on the reactive group in the perylene, the acid chloride is employed preferably in an amount of from 1 to 5 molar equivalents and the isocyanate in an amount of from 1 to 3 molar equivalents.

The reaction temperature customarily lies within a range from 20 to 150° C. and is guided by the reactivity and polymerization tendency of the compound W. In the case of the reaction of hydroxyalkylperylenes with acryloyl chloride, it lies preferably within the range from 20 to 70° C.; in the case of reaction with methacryloyl chloride, in the range from 40 to 90° C.; and, in the case of reaction with isocyanates, in the range from 80 to 140° C.

Compounds of the formula VI can also be subjected to asymmetric aryl/aryl coupling with arylboronic esters in the presence of palladium(0) compounds. Advantageously, the arylboronic acids can already include a copolymerizable double bond, since this is not attacked under coupling conditions. Examples of suitable arylboronic acids having copolymerizable double bonds are o-, m- and para-styreneboronic acids. The arylboronic acids can of course also have functionalities $R^f$ which, possibly following chemical modification with an ethylenically unsaturated compound W, can be reacted to give the desired end product of the formula III.

The reaction of the perylene VI normally takes place in a mixture of an aqueous solution of an inorganic base and an organic solvent which is immiscible with water.

Suitable bases are alkali metal hydroxides and carbonates. Suitable organic solvents are alkylaromatics such as toluene and xylenes.

Suitable palladium(0) compounds are, in particular, tetrakis(triarylphosphine)palladium and tetrakis(trialkylphosphine)palladium, e.g., tetrakis(triphenylphosphine)palladium. The palladium(0) compound is preferably employed in an amount of from 8 to 10 mol % based on the perylene VI. The arylboronic acid is preferably employed in an amount of from 1.1 to 1.4 molar equivalents, based on the perylene VI.

The reaction temperatures lie customarily within the range from 80 to 120° C., the reaction period in the range from 10 to 18 h.

Dyes IIIa and IIId are obtainable in a simple manner by reacting a perylenedicarboxylic acid of the formula VIIa or a perylenetetracarboxylic acid of the formula VIIb, preferably their internal anhydrides

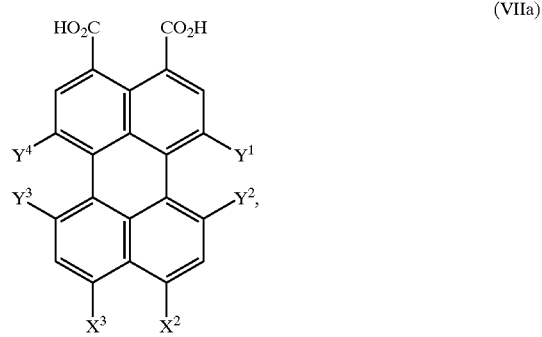

(VIIa)

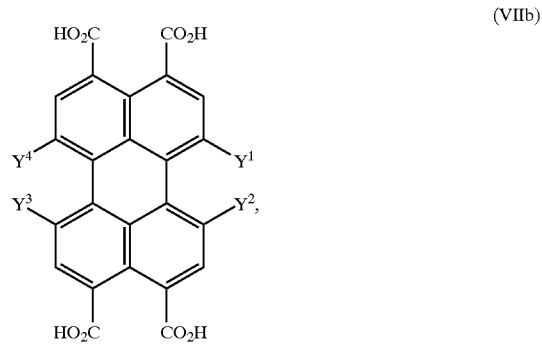

(VIIb)

in which $X^2$, $X^3$ and $Y^1$ to $Y^4$ have the definitions given above other than —X—S—P, with a primary amine which carries an ethylenically unsaturated double bond, such as allylamine, or with a primary amine which has a further reactive group $R^f$ (see above), and then converting the reactive group $R^f$ into a polymerizable group P in the manner described above. The reaction of the dicarboxylic acid VIIa or the tetracarboxylic acid with the primary amine takes place in analogy to known methods (see e.g. WO 96/22 331 and literature cited therein).

The process of the invention is generally conducted such that, in a first step, an emulsion E1 is produced from the monomers to be polymerized and the dye, the monomer droplets in said emulsion having a diameter which is <500 nm and preferably in the range from 100 to 400 nm. The emulsion E1 is subsequently contacted with at least one initiator under temperature conditions under which the initiator triggers a free-radical polymerization of the ethylenically unsaturated bonds.

The average size of the droplets of the disperse phase of the aqueous emulsion E1 to be used in accordance with the invention can be determined in accordance with the principle of quasielastic dynamic light scattering (the z-average droplet diameter $\bar{d}_z$ of the unimodal analysis of the autocorrelation function). In the examples of this document, this was done using a Coulter N4 Plus Particle Analyser from Coulter Scientific Instruments (1 bar, 25° C.). The measurements were carried out on dilute aqueous emulsions E1 whose nonaqueous constituents content was 0.01% by weight. Dilution was carried out using water which had been saturated beforehand with the monomers present in the aqueous emulsion. This measure is intended to prevent the dilution being accompanied by a change in the droplet diameters.

In accordance with the invention, the values thus determined in the emulsions E1 for $\bar{d}_z$ are normally $\leq$500 nm, in many cases $\leq$400 nm. A favorable $\bar{d}_z$ range, according to the invention, is that from 100 nm to 300 nm or from 100 nm to 200 nm. Normally, $\bar{d}_z$ of the aqueous emulsion E1 to be employed in accordance with the invention is $\geq$40 nm.

The preparation of the aqueous emulsion E1 to be used for the process according to the invention takes place judiciously starting from conventional oil-in-water emulsions of the monomers in which the dye is already in solution or is dispersed molecularly in the monomer droplets. Such conventional emulsions (also referred to below as macroemulsions) can be obtained, for example, by dissolving the dye in the monomer and converting this solution into an aqueous emulsion in accordance with known techniques; for example, by stirring the dye/monomer solution into an aqueous medium which comprises emulsifier. Conventional emulsions here generally have an average droplet size of more than 1000 nm. The macroemulsion is subsequently converted by known techniques into the emulsion E1 (also referred to below as miniemulsion) (cf. P. L. Tang, E. D. Sudol, C. A. Silebi und M. S. El-Aasser in Journal of Applied Polymer Science, Vol. 43 [1991] 1059–1066).

High-pressure homogenizers, for example, can be employed for this purpose. In these machines, the fine dispersion of the components is achieved by means of a high local input of energy. In this respect, two variants have become particularly established.

In the first variant, the aqueous macroemulsion is compressed to more than 1000 bar using a piston pump, and is then released through a narrow gap. In this case, the action is based on an interplay of high shear and pressure gradients and cavitation in the gap. An example of a high-pressure homogenizer operating in accordance with this principle is the Niro-Soavi high-pressure homogenizer type NS1001L Panda.

In the second variant, the compressed aqueous macroemulsion is released into a mixing chamber through two nozzles which are directed against one another. The action of fine dispersion is in this case dependent above all on the hydrodynamic conditions within the mixing chamber. An example of this type of homogenizer is the Microfluidizer type M 120 E from Microfluidics Corp. In this high-pressure homogenizer, the aqueous macroemulsion is compressed by means of a pneumatically operated piston pump to pressures of up to 1200 atm, and is released through an "interaction chamber". In this chamber, the jet of emulsion is divided, in a microchannel system, into two jets which are caused to intersect at an angle of 180°. Another example of a homogenizer operating in accordance with this mode of homogenization is the Nanojet model Expo from Nanojet Engineering GmbH. With the Nanojet, however, instead of a solid channel system, two homogenizing valves are installed which can be adjusted mechanically.

In addition to the abovementioned principles, homogenization can also be brought about, for example, by the use of ultrasound (e.g., the Branson Sonifier II 450). In this case, the fine dispersion is a result of cavitation mechanisms. Also suitable in principle for homogenization by means of ultrasound are the devices described in GB 22 50 930 A and U.S. Pat. No. 5,108,654. The quality of the aqueous emulsion E1 produced in the sonic field is dependent in this case not only on the sonic input but also on other factors, such as, for example, the intensity distribution of the ultrasound in the mixing chamber, the residence time, the temperature, and the physical properties of the substances to be emulsified, for example their toughness, surface tension and vapor pressure. In this context, the resulting droplet size depends, inter alia, on the concentration of the emulsifier and on the energy input for homogenization, and can therefore be adjusted specifically by, for example, making a corresponding change in the homogenization pressure and/or in the corresponding ultrasound energy.

For the preparation of the emulsion E1 from conventional emulsions by means of ultrasound, the device described in the earlier German Patent Application DE 197 56 874.2 has proven particularly appropriate. This is a device which has a reaction chamber or a through-flow reaction channel and at least one means for transmitting ultrasound waves to the reaction chamber or through-flow reaction channel, the means for transmitting ultrasound waves being configured such-that the entire reaction chamber, or the through-flow reaction channel in one subsection, can be sonicated uniformly with ultrasound waves. For this purpose, the emitting surface of the means for transmitting ultrasound waves is configured such that it corresponds essentially to the surface of the reaction chamber or, if the reaction chamber is a subsection of a through-flow reaction channel, extends essentially over the entire width of the channel, and that the reaction chamber depth which is essentially vertical with respect to the emitting surface is lower than the maximum effective depth of the ultrasound transmission means.

The term "reaction chamber depth" refers here essentially to the distance between the emitting surface of the ultrasound transmission means and the floor of the reaction chamber.

Preference is given to reaction chamber depths of up to 100 mm. The depth of the reaction chamber should advantageously not be more than 70 mm, and with particular advantage not more than 50 mm. The reaction chambers may in principle also have a very small depth, although in view of a minimal risk of clogging, maximum ease of cleaning and high product throughput preference is given to reaction chamber depths which are substantially greater than, for instance, the customary gap heights in high-pressure homogenizers and are usually more than 10 mm. Advantageously, the depth of the reaction chamber can be altered, by means, for example, of ultrasound transmission means which enter the housing to different extents.

In accordance with a first embodiment of this device, the emitting surface of the means of transmitting ultrasound corresponds essentially to the surface of the reaction chamber. This embodiment is used for the batchwise production of emulsions E1. With the device of the invention, ultrasound is able to act on the entire reaction chamber. In the reaction chamber, the axial pressure of sonic irradiation brings about a turbulent flow which produces intensive cross-mixing.

In accordance with a second embodiment, a device of this kind has a flow cell. In this case the housing is designed as a through-flow reaction channel, with an inlet and an outlet, the reaction chamber being a subsection of the through-flow reaction channel. The width of the channel is that extent of the channel which runs essentially normal to the flow direction. In this arrangement, the emitting surface covers the entire width of the flow channel tranversely to the flow direction. That length of the emitting surface which is perpendicular to this width, in other words the length of the emitting surface in the flow direction, defines the effective range of the ultrasound. In accordance with one advantageous variant of this second embodiment, the through-flow reaction channel has an essentially rectangular cross section. If a likewise rectangular ultrasound transmission means of appropriate dimensions is installed in one side of the rectangle, sonication is particularly effective and uniform. Owing to the turbulent flow conditions which prevail in the ultrasonic field, however, it is also possible and not disadvantageous to employ a circular transmission means. Moreover, instead of a single ultrasound transmission means it is possible to arrange two or more separate transmission means which are connected in series as viewed in the flow direction. In such an arrangement it is possible for both the emitting surfaces and the depth of the reaction chamber, in other words the distance between the emitting surface and the floor of the through-flow channel, to vary.

With particular advantage, the means of transmitting ultrasound waves is designed as a sonotrode whose end remote from the free emitting surface is coupled to an ultrasonic transducer. The ultrasound waves can be generated, for example, by exploiting the inverse piezoelectric effect. In this case, generators are used to generate high-frequency electrical oscillations (usually in the range from 10 to 100 kHz, preferably between 20 and 40 kHz), and these are converted by a piezoelectric transducer into mechanical vibrations of the same frequency, and, with the sonotrode as the transmission element, are coupled into the medium that is to be sonicated.

With particular preference, the sonotrode is designed as a rod-shaped, axially emitting $\lambda/2$ (or multiples of $\lambda/2$) longitudinal oscillator. A sonotrode of this kind can be fastened in an aperture of the housing by means, for example, of a flange provided on one of its nodes of oscillation. In this way the entry point of the sonotrode into the housing can be given a pressuretight design, so that the reaction chamber can be sonicated even under superatmospheric pressure. It is preferably possible to regulate the amplitude of oscillation of the sonotrode; in other words, the particular amplitude of oscillation established is monitored on-line and, if necessary, is corrected automatically. The instantaneous amplitude of oscillation can be monitored, for example, by means of a piezoelectric transducer mounted on the sonotrode, or by means of a strain gauge with downstream evaluation electronics.

In a further advantageous embodiment of such devices, the reaction chamber contains internals for improving the flow behavior and mixing behavior. These internals may, for example, be simple deflector plates or any of a wide variety of porous structures.

If required, mixing can be intensified further by means of an additional stirring mechanism. Advantageously, the reaction chamber is thermostatable.

Emulsifiers suitable in principle for conducting the process of the invention include all those water-soluble emulsifiers which are in common use for free-radical aqueous macroemulsion polymerization. These include not only anionic and cationic but also nonionic emulsifiers. Preference is given to the use of anionic and/or nonionic emulsifiers. Examples of suitable neutral emulsifiers are ethoxylated mono-, di- and trialkylphenols (EO units: 3 to 50, alkyl: $C_4$ to $C_9$), ethoxylated fatty alcohols (EO units: 3 to 50, alkyl: $C_8$ to $C_{36}$) and ethoxylated oxo alcohols (EO units: 3 to 50, alkyl: $C_8$ to $C_{36}$). Examples of suitable anionic emulsifiers are alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_9$), of alkylsulfonic acids (alkyl: $C_{12}$ to $C_{18}$), of sulfonated fatty acids and of alkylarylsulfonic acids (alkyl: $C_9$ to $C_{18}$). Up to 30 mol % of the ethylene oxide units can also be replaced by other alkylene oxide units, especially propylene oxide units.

Further suitable anionic emulsifiers are the alkali metal salts and ammonium salts of di-$C_4$–$C_{20}$-alkyl esters of sulfosuccinic acid, especially the di-n-octyl esters and the di-2-ethylhexyl esters. Also suitable as anionic emulsifiers are the salts of bis(phenylsulfonyl) ethers having a $C_4$–$C_{24}$-alkyl group on at least one phenylsulfonyl group. The alkyl group, which can be linear or branched, preferably has 6 to 18 carbon atoms and especially 6, 12 or 16 carbon atoms. The salts involved are preferably sodium, potassium or ammonium salts or mixed forms of these salts, particular preference being given to the sodium salts. The sodium salts are especially advantageous if they contain at least one alkyl group of 12 carbon atoms and are branched. It is common to use technical-grade mixtures comprising a proportion of from 50 to 90% by weight of the monoalkylated product, an example being Dowfax® 2A1 (trade mark of Dow Chemical Company). Said compounds are general knowledge, for example, from U.S. Pat. No. 4,269,749, and are obtainable commercially.

Further suitable emulsifiers can be found in Houben-Weyl, Methoden der organischen Chemie, Volume XIV/1, Makromolekulare Stoffe [Macromolecular substances], Georg-Thieme Verlag, Stuttgart, 1961, pages 192 to 208, and in Ullmann's Encyclopedia of Industrial Chemistry, 5th ed., VCH Weinheim 1987, Vol. 9a, pp. 313–318.

These emulsifiers can of course also be employed in a mixture with protective colloids. Protective colloids are water-soluble organic polymers. These are barely able to reduce the surface tension of water and, unlike emulsifiers, have relative molecular weights which are generally more than 1000 and, preferably, more than 2000.

As with the emulsifiers, there are anionic, cationic and neutral protective colloids. Examples of typical anionic protective colloids are homopolymers and copolymers of the abovementioned monoethylenically unsaturated monomers A' which have at least one acid group, and the salts, especially the alkali metal salts and ammonium salts, of such homopolymers and copolymers. Preference is given to homopolymers and copolymers of acrylic acid, methacrylic acid, maleic acid, styrenesulfonic acid and/or 2-acrylamido-2-methylpropanesulfonic acid, with or without neutral comonomers, which are selected, for example, from olefins such as ethylene, propene, 1-butene, isobutene and diisobutene, vinylaromatic compounds such as styrene, esters of acrylic acid or methacrylic acid, hydroxyalkyl esters of acrylic acid or methacrylic acid, acrylamide, methacrylamide, vinyl acetate and acrylonitrile, and salts thereof. Further anionic protective colloids are anionically modified starches and ligninsulfonates.

Examples of cationic protective colloids are the homopolymers and copolymers of monoethylenically unsaturated cationic monomers, examples being homopolymers and copolymers of quaternized N-vinylimidazoles or of quaternized dialkylaminoalkyl acrylates and methacrylates, with, for example, N-vinylpyrrolidone and/or N-vinylcaprolactam. Also included among cationic protective colloids are cationically modified starches.

Examples of neutral protective colloids are polyvinyl alcohols, partially hydrolyzed homopolymers and copolymers of vinyl acetate, ethylene oxide-propylene oxide block copolymers, modified starches, cellulose derivatives, polyvinylpyrrolidone, and copolymers of vinylpyrrolidone with neutral monomers such as with vinylcaprolactam, vinyl acetate, acrylamide, methacrylamide, methyl acrylate, ethyl acrylate, n-butyl acrylate or with methyl methacrylate.

The amount of emulsifier for preparing the aqueous emulsion E1 is, in accordance with the invention, judiciously chosen so as essentially not to exceed the critical micelle-forming concentration of the emulsifiers used within the aqueous phase in the final resultant aqueous emulsion E1. Based on the amount of monomers present in the aqueous emulsion E1, this amount of emulsifier is generally within the range from 0.1 to 5% by weight. As already mentioned, protective colloids can be added alongside the emulsifiers, and have the capacity to stabilize the disperse distribution of the final resultant aqueous polymer dispersion. Irrespective of the amount of emulsifier employed, the protective colloids can be used in amounts of up to 50% by weight, for example, in amounts of from 1 to 30% by weight, based on the monomers to be polymerized.

One preferred embodiment of the process of the invention comprises introducing all of the emulsion E1 in the initial charge to the polymerization vessel. The polymerization is started, for example, by adding at least some of the initiator and then heating the mixture to polymerization temperature. The remainder of the initiator is then added continuously, a little at a time, or all at once to the polymerization reaction. In a likewise preferred embodiment, the mixture is first heated to polymerization temperature and then the initiator is added in the manner described above.

In another embodiment of the process of the invention, a dye solution is first prepared from the monomers to be polymerized and from the oil-soluble dye, and this solution is then converted into a conventional emulsion together with water and the major amount, preferably all, of the emulsifiers and, if used, protective colloids. This emulsion is subsequently homogenized in the manner described above to give an emulsion E1. The resulting emulsion E1 is then added continuously, at a constant or increasing rate of addition, or a little at a time, preferably in accordance with the progression of the polymerization, to the polymerization vessel, which is at reaction temperature and contains water and preferably some of the initiator, in particular from 1 to 20% of the total amount of initiator. The initiator is added in parallel with the monomer addition. In this case, the emulsion can be prepared in a separate stage before the commencement of polymerization, or continuously at the rate at which it is consumed, using, for example, the device described in DE 197 56 874.2.

The free-radical polymerization initiator is preferably employed in the form of an aqueous solution. Usually, the initiator is not present in the monomer emulsion E1.

Suitable free-radical polymerization initiators are in principle all those which are able to trigger a free-radical polymerization. They can be peroxides, hydroperoxides, and azo compounds.

The free-radical polymerization initiators generally employed for the process of the invention are those which are soluble in water under polymerization conditions. Of these, preference is given to those initiators which are insoluble or only sparingly soluble in the monomers. Examples of such polymerization initiators are peroxodisulfuric acid and its ammonium and alkali metal salts, and also hydrogen peroxide or hydroperoxides such as tert-butyl hydroperoxide, or saltlike azo compounds, an exmaple being 2,2'-azobis-2-amidinopropane dihydrochloride. The water-soluble free-radical polymerization initiators used can of course also comprise combined systems which are composed of at least one reducing agent and at least one peroxide and/or hydroperoxide (referred to below as redox initiators). Examples of suitable reducing agents are the sodium salt of hydroxymethanesulfonic acid, sodium sulfite, sodium disulfite, sodium thiosulfate, acetone-bisulfite adduct, triethylamine, hydrazine or hydroxylamine, and also ascorbic acid, glycolic acid and tartaric acid.

The combined systems frequently also comprise a small amount of a metal compound which is soluble in the aqueous medium and whose metallic component is able to exist in a plurality of valence states (redox-active metal compound). Examples used are copper(II) salts, iron(II) salts, or a combination of water-soluble iron salts and vanadium salts.

It has been found particularly advantageous to use water-soluble initiators which include at least one nonionic peroxide, especially hydrogen peroxide. Initiators of this kind are frequently employed together with at least one of the abovementioned reducing agents (redox initiators). Examples of such combinations are hydrogen peroxide/sodium salt of hydroxymethanesulfinic acid, tert-butyl hydroperoxide/sodium salt of hydroxymethanesulfinic acid, and hydrogen peroxide/ascorbic acid. The abovementioned nonionic initiators can also be employed without reducing agents. In this case, one of the abovementioned water-soluble, redox-active metal compounds is preferably added to the polymerization medium. Neutral initiator systems of this kind are employed in particular in the process of the invention if the aim is to achieve relatively high dye levels in the polymer particles of the dispersions of the invention, and especially when dye levels of at least 3% by weight, in particular at least 5% by weight and, especially from 5 to 30% by weight, based on the overall weight of the monomers to be polymerized or of the polymer matrix, are the target. Nonionic initiators are also used in particular when a basic dye is used in the polymerization, since the decomposition of the ionic initiators which are commonly employed forms acidic substances—hydrogen sulfates are formed when peroxodisulfates are used—which protonate the basic dye and so reduce its oil solubility.

Based on the monomers to be subjected to free-radical polymerization, the amount of free-radical polymerization initiators used is usually from 0.1 to 10% by weight, preferably from 0.2 to 8% by weight and, frequently, from 0.5 to 5% by weight. The free-radical aqueous emulsion polymerization of the invention can of course also be initiated by exposure, for example, to actinic radiation.

In general, the polymerization process of the invention produces aqueous polymer dispersions having an overall dye-comprising polymer content of up to 50% by weight based on the overall weight of the dispersion. A higher overall dye-comprising polymer content is generally associated with an undesirable increase in the viscosity of the dispersion. If such a higher solids content is required, it is advisable to configure the process of the invention in accordance with the details in DE-A 196 28143. That means producing an aqueous emulsion E1 from at least part of the ethylenically unsaturated monomers and the total amount of dye, and from the remainder, if appropriate, of the monomers, producing a conventional emulsion E2 in which the monomer droplets have a diameter of more than 1000 nm.

In this case the polymerization reaction itself is conducted such that at least some of the aqueous emulsion E1 is supplied to the polymerization reaction as a feed I, continuously, and the conventional emulsion E2 is supplied to the polymerization reaction during the feed I, in parallel or a little at a time. The conventional emulsion E2 preferably contains no compounds whose water solubility is <0.01 g/l, and in particular no dye.

In this context, in accordance with the invention, not more than 90%, preferably not more than 50%, in particular not more than 30% and, with very particular preference not more than 20% of the monomer emulsion E1 is supplied continuously as feed I to the polymerization vessel. For further details, reference is made to DE-A 196 28 143, the entirety of which is incorporated herein by reference.

In the context of the process of the invention, the feeds can be supplied to the polymerization reactor from above, from the side, or through the reactor floor.

In the process of the invention the polymerization temperature is guided generally by the decomposition temperature of the free-radical polymerization initiator employed. Redox initiator systems generally decompose at particularly low temperatures. Such temperatures are preferred in accordance with the invention from the standpoint of reduced formation of coagulum. Typical polymerization temperatures are from 0° C. to 95° C., frequently from 30° C. to 90° C. If increased pressure is used, the polymerization temperature may also be up to 120° C. or more. Normally, polymerization takes place at atmospheric pressure (1 atm).

The process of the invention permits the preparation of dye-comprising aqueous polymer dispersions in which the polymer particles contain at least one oil-soluble dye in molecularly disperse form and, furthermore, have particle sizes of below 1000 nm. Unlike aqueous suspension polymers, such polymer dispersions are stable to sedimentation. Furthermore, the polymer dispersions are notable for the low migration tendency of the dye molecules they contain.

The dye-comprising aqueous polymer dispersions obtainable in accordance with the invention are superior to the known dye-comprising polymer dispersions in particular when the polymeric matrix is composed of at least one monoethylenically unsaturated monomer A having a water solubility >0.01 g/l and at least one further monomer selected from monoethylenically unsaturated monomers B which have a water solubility <0.01 g/l, monomers C which contain at least two nonconjugated, ethylenically unsaturated double bonds, and crosslinking monomers D.

Polymer dispersions of this kind are likewise provided by the present invention.

Dye-comprising aqueous polymer dispersions having superior properties are also obtained when, in accordance with the process of the invention, the abovementioned monomers A having a water solubility >0.01 g/l and, if present, the monomers B, C and D are polymerized together with an oil-soluble organic dye which has at least one copolymerizable functional group which is not part of the dye chromophore. Polymer dispersions of this kind are likewise provided by the present invention.

Irrespective of the nature of the oil-suitable dye, the polymeric matrix is preferably composed of from 50 to 99.5% by weight, in particular from 80 to 99% by weight and, with very particular preference, from 90 to 98% by weight of monomers A, from 0.5 to 50% by weight, in particular from 1 to 20% by weight and, with very particular preference, from 2 to 10% by weight of monomers B, from 0 to 30% by weight, in particular from 0.5 to 20% by weight and, with very particular preference, from 1 to 10% by weight of monomers C, and up to 30% by weight, preferably up to 20% by weight and, in particular, up to 10% by weight of monomers D, the total amount of monomers C and D not exceeding preferably 30% by weight and, in particular, 10% by weight-based on the total monomer amount. Where the oil-soluble dye employed has no copolymerizable functional group, the polymer matrix chosen will preferably comprise, in copolymerized form, the monomers C and/or D in amounts of at least 0.1% by weight, in particular at least 0.5% by weight and, with very particular preference, at least 1% by weight. The polymer matrix comprises in particular from 0.5 to 20% by weight, with particular preference from 1 to 15% by weight, of monomers C, and of these, with particular preference, divinylbenzene, butanediol diacrylate, butanediol dimethacrylate, hexanediol diacrylate, hexanediol dimethacrylate, triethylene glycol diacrylate and triethylene glycol dimethacrylate, and no monomers D.

A preferred embodiment of the dye-comprising polymer dispersions of the invention comprises those polymer dispersions which have a copolymerizable dye, and of these, in turn, comprises those whose polymeric matrix includes monomers C and/or D in copolymerized form.

The dye-comprising aqueous polymer dispersions of the invention can be configured such that the polymer matrix of the dye-comprising polymer contains no copolymerized monomers A'. Dispersions of this kind are particularly suitable for obtaining dye-comprising polymers which are intended for incorporation into nonpolar media; for example, as the coloring component in printing inks, alkyd resin paints, e.g., melamine-alkyd resin stoving enamels, or for coloring polymer fibers or plastics compositions.

In another embodiment of the polymer dispersions of the invention, the monomers A copolymerized in the polymeric matrix of the polymer particles comprise:

from 0.5 to 30% by weight, in particular from 1 to 20% by weight and, especially, from 2 to 15% by weight of at least one monomer A1 having a water solubility >60 g/l (in each case at 25° C. and 1 atm), and from 70 to 99.5% by weight, in particular from 80 to 99% by weight and, especially, from 85 to 98% by weight of at least one monomer A2 having a water solubility <60 g/l (in each case at 25° C. and 1 atm), based in each case on the total monomer amount.

The monomers A1 include not only the abovementioned monomers A' but also the hydroxyalkyl esters of ethylenically unsaturated carboxylic acids, especially acrylic acid and methacrylic acid, such as hydroxyethyl acrylate, hydroxypropyl acrylate and hydroxybutyl acrylate, and also the N-alkylolamides of ethylenically unsaturated carboxylic acids. In this embodiment the monomers A1 preferably comprise either at least one of the monoethylenically unsaturated cationic monomers listed under A' or at least one of the monoethylenically unsaturated monomers, listed under A', which have at least one acid group, in free form or deprotonated form, the latter being preferred. Particularly preferred monomers A1 are acrylic acid, methacrylic acid and acrylamido-2-methylpropanesulfonate in the form, for example, of the ammonium or sodium salt.

The monomers A2 include all of the monomers listed under monomers A that are different from the monomers A' and, accordingly, have a water solubility in the range from 0.01 to 60 g/l. Particularly preferred monomers A2 in this embodiment are styrene, $C_1$–$C_8$-alkyl esters of acrylic acid and methacrylic acid, such as methyl methacrylate, n-butyl acrylate, tert-butyl acrylate and 2-ethylhexyl acrylate, and the vinyl esters of aliphatic carboxylic acids, such as vinyl acetate and vinyl propionate, for example.

In one preferred embodiment of the process of the invention, the dye-comprising polymer particles of the dispersion have a monomodal distribution of their particle sizes. This means that the distribution of the polymer particles sizes in the dispersion, as determined, for example, by light scattering experiments or using an ultracentrifuge, exhibits a pronounced maximum in the case of one particle size. In general, this maximum will be at <1000 nm. In a particularly preferred embodiment the polymer particles have z-average particle diameters $d_z$ (determined by quasielastic dynamic light scattering, see above) in the range from 100 to 400 nm, in particular from 100 to 300 nm and, with very particular preference, from 100 to 200 nm.

The particle sizes of the polymer particles in the dispersions of the invention have a narrow distribution, i.e., the ratio of the mid-peak width of the polymer particle size distribution curve determined by dynamic light scattering to the average particle diameter $d_z$ is generally <1, preferably <0.75 and, in particular, <0.5.

For a large number of end uses, especially if the dye-comprising polymer particles of the invention are intended for use as a replacement for conventional organic pigments, it has been found advantageous for the glass transition temperature of the polymer matrix, $T_g$, to be at least 60° C. The glass transition temperature, here and below, is the midpoint temperature determined by means of DTA in accordance with ASTM-D 3418-82.

The polymer dispersions of the invention can be converted to polymer powders in a customary manner by means of conventional drying methods, for example; by freeze drying or, preferably, by spray drying. Such polymer powders are likewise provided by the present invention.

In the case of a spray drying operation the procedure, for example, is to spray the polymer dispersion to be dried in a stream of hot air in a customary drying tower. In this instance, the entry temperature of the stream of hot air is in the range from 100 to 200° C., preferably from 120 to 160° C., and the exit temperature of the stream of hot air is in the range from 30 to 90° C. and, preferably, from 60 to 80° C. The aqueous polymer dispersion can be sprayed in the stream of hot air by means, for example, of single-substance or multisubstance nozzles or by way of a rotating disk. The polymer powders are normally deposited using cyclones or filter separators. The sprayed, aqueous polymer dispersion and the stream of hot air preferably move in parallel.

The polymer dispersions of the invention are preferably dried in the presence of customary drying assistants. Examples of these are polyvinyl alcohols (see e.g. EP-A-56 622, EP-A-680 993, DE-A-22 14 410 and DE-A-26 14 261), polyvinylpyrrolidones (see e.g. DE 22 38 903 and EP 576 844), phenolsulfonic acid-formaldehyde condensates (see e.g. EP-A 407 889, WO 98/03576), naphthalenesulfonic acid-formaldehyde condensates (see e.g. WO 98/03577), homopolymers and copolymers of 2-acrylamido-2-methylpropanesulfonic acid (see e.g. EP-A 629 650, EP-A 671 435 and DE-A 195 39 460), copolymers of ethylenically unsaturated carboxylic acid, such as especially acrylic acid, methacrylic acid and maleic acid, with hydrophobic comonomers such as styrene (see e.g. EP 467 103) or olefins (see e.g. EP 9 169) or with hydroxyalkyl esters (see e.g. JP 59 162 161). If not already listed here, it is also possible to use the water-soluble polymers PW, which are specified below, as drying assistants. Anticaking agents, such as highly disperse silica, can also be employed.

The dye-comprising polymer dispersions of the invention and the dye-comprising polymer powders obtainable from them, even following their incorporation into high molecular mass application media such as varnishes, printing inks, plastics or inorganic materials, are notable for high color strength, great brightness, and good transparency. In contradistinction to conventional pigments, no dependency of the shade on the polymer particle size is observed. Furthermore, the polymer dispersions of the invention as "color pigments", unlike conventional pigments, exhibit no shape anisotropy and associated rheological problems, and have a narrow particle size distribution. Furthermore, the average particle size can easily be adjusted via the particle size of the monomer emulsion employed. In addition, the dye-comprising polymer dispersions of the invention have the feature over conventional pigments of a very much smaller amount of expensive chromophore to achieve the same color effect. The dyes are, furthermore, better protected in the polymeric matrix against bleaching as a consequence of exposure to UV radiation or oxygen than are conventional dyes or pigments. The same applies to the polymers of the invention with optical brightener. Substrates treated with the polymer dispersions of the invention comprising optical brighteners therefore exhibit a reduced tendency toward yellowing, especially on subjection to UV radiation or on exposure to elevated temperature. Furthermore, the use of such polymer dispersions in comparison to conventional optical brighteners achieves a comparable whiteness with smaller amounts of optical brightener. Polymer dispersions of the invention which comprise optical brighteners, are particularly suitable as a whitening component in colored paper slips. In addition, they can be added to the paper pulps themselves as a whitening component for improving the whiteness.

On the basis of these advantageous properties, the dye-comprising polymer dispersions of the invention are suitable for a host of applications. Mention may be made here, by way of example, of the pigmentation of high molecular mass organic and inorganic materials, of printing inks, especially for security printing, and of inks for the inkjet printing of paper and textiles. The dye-comprising polymer dispersions of the invention are suitable, furthermore, as coloring components for electrophotographic toners. Polymer dispersions of the invention comprising fluorescent dyes can be used as components of daylight-fluorescent colors and fluorescent or retroreflective coatings. Use of the polymer dispersions of the invention and of the polymers obtainable from them in systems for the passive or active utilization of solar energy is likewise a possibility. In addition, the polymers obtainable from the polymer dispersions of the invention are suitable for use in solid-state lasers.

The dye-comprising aqueous polymer dispersions of the invention and the polymer powders obtainable from them by drying are particularly suitable for use as a coloring component in aqueous dye-comprising formulations such as inks, for example, especially inks for the inkjet printing of paper and textiles. In this application, the dye-comprising polymer particles of the invention serve as a substitute for pigment particles in conventional, aqueous pigmented formulations.

The present invention also, accordingly, provides aqueous dye-comprising formulations comprising:

i. at least one dye-comprising polymer of the invention which is present in the formulation in the form of dispersed polymer particles and is selected from the polymers present in the aqueous, dye-comprising polymer dispersions of the invention, and the polymer powders produced from them, and ii. customary auxiliaries.

Aqueous, dye-comprising formulations, especially inks which are used in the inkjet process (techniques such as thermal inkjet, piezo inkjet, continuous inkjet, and valve jet), are subject to a series of requirements: they must have surface tension and a viscosity suitable for printing, they must be stable on storage, i.e., they should not coagulate or flocculate, and the dispersed undissolved colorant should not settle, and they should not lead to clogging of the printer nozzle, which can be a problem in the case of pigmented inks, i.e., inks comprising dispersed colorant particles. Finally, in the case of the continuous inkjet, they must be stable to the addition of conductive salts and must show no tendency to flocculate when the ion content is increased. Furthermore, the prints obtained are required to satisfy the coloristic requirements—that is, high brightness and depth of color, and good fastness properties, e.g., rubfastness, lightfastness, waterfastness and wet rubfastness, even on uncoated papers.

The aqueous dye-comprising formulations of the invention, which comprise the dye-comprising polymers of the invention in place of conventionally employed color pigments, already meet these requirements to an extraordinary extent. Compared with conventional pigmented formulations, moreover, they feature a greater brightness of color. The requirement, made of pigmented formulations, of the redispersibility of the coloring component, which is particularly important when the formulation is concentrated by drying and by means of which it is possible to avoid blockage of the printer nozzle in the case of inkjet inks, can, surprisingly, be ensured without suffering losses in terms of the other performance properties, if the dye-comprising formulations of the invention comprise at least one water-soluble polymer PW.

Water-soluble polymers PW are basically those polymers which are entirely soluble in the aqueous dispersion medium of the aqueous, dye-comprising formulation of the invention in the amount chosen for use. Suitable water-soluble polymers PW are in principle all those polymers which have already been specified as protective colloids or as drying assistants. Ionic polymers PW are preferred. The preferred ionic polymers PW have either cationic functional groups, especially quaternary ammonium or immonium groups, or acidic functional groups, preferably in deprotonated form (i.e. anionic groups).

Preferred polymers PW having cationic functional groups, referred to below as cationic polymers PW, are copolymers composed of at least one monoethylenically unsaturated, cationic monomer, especially a monomer having at least one quaternary ammonium group or immonium group, and at least one further, neutral comonomer. Suitable cationic monomers are all of the monoethylenically unsaturated cationic monomers specified in connection with A', examples being quaternized N-vinylimidazoles such as 1-vinyl-3-methylimidazolium chloride or methosulfate, or quaternized dialkylaminoalkyl acrylates and methacrylates, such as acryloyloxyethyltrimethylammonium chloride or methosulfate. Neutral comonomers are selected, for example, from olefins such as ethylene, propene, 1-butene, isobutene and diisobutene, vinylaromatics such as styrene, alkyl esters of acrylic acid or methacrylic acid, hydroxyalkyl esters of acrylic acid or methacrylic acid, polyethylene glycol acrylates and methacrylates having 2 to 50 ethylene oxide units, acrylamide, methacrylamide, vinyl acetate and acrylnitrile. Preferred comonomers are vinylamides such as N-vinylformamide, N-vinylacetamide, especially N-vinylcaprolactam, N-vinylpiperidone and N-vinylpyrrolidone.

Suitable cationic polymers PW are in general composed of from 5 to 95% by weight, in particular from 10 to 50% by weight, of at least one cationic monomer, and from 5 to 95% by weight, in particular from 50 to 100% by weight, of at least one neutral monomer, based in each case on the total amount of the monomers making up the cationic polymer. Their molecular weight is generally >1000 daltons and is preferably within the range from 2000 to 50,000 daltons.

Cationic polymers PW deserving of particular emphasis are:

copolymers of 1-vinylpyrrolidone with 1-vinyl-3-alkylimidazolinium salts, especially with 1-vinyl-3-alkylimidazolinium chloride or methosulfate; copolymers of 1-vinylpyrrolidone with methacryloyloxyethyltrialkylammonium salts, especially with methacryloyloxyethyltrialkylammonium chloride or methosulfate; and terpolymers of vinylpyrrolidone and vinylcaprolactam with 1-vinyl-3-alkylimidazolinium salts, especially with 1-vinyl-3-alkylimidazolinium chloride or methosulfate.

Polymers PW of this kind are known in principle to the skilled worker from, for example, EP-A 246 580, EP-A 544148, U.S. Pat. No. 4,859,756 and EP-A 715 843, the contents of which is hereby expressly incorporated by reference. The polymers are also available commercially, for example, as LUVIQUAT® FC 370, LUVIQUAT® FC 550, LUVIQUAT® HM 552, LUVIQUAT® FC 905, LUVIQUAT® MS 370, LUVIQUAT® PQ 11 and LUVIQUAT® Hold from BASF AG (Ludwigshafen).

Polymers PW having acidic functional groups are generally employed in neutralized form, i.e., in the form of their salts, especially their ammonium or alkali metal salts. In the aqueous dispersion medium of the dye-comprising formulation of the invention they are present in at least partly deprotonated form. For this reason they are also referred to below as anionic polymers PW.

Examples of suitable anionic polymers PW are homopolymers and copolymers which are composed of at least one monoethylenically unsaturated monomer having at least one acid group, an example being one of the monomers listed under A', especially a monomer having at least one COOH or $SO_3H$ group and, if desired, at least one further, neutral comonomer or a monoethylenically unsaturated comonomer with an acid group. Specific monomers with an acid group are acrylic acid, methacrylic acid, maleic acid and 2-acrylamido-2-methylpropanesulfonic acid. Suitable neutral comonomers in the present case are the abovementioned neutral comonomers, especially $C_1$–$C_{10}$-alkyl esters and, in particular, $C_1$–$C_4$-alkyl esters of acrylic acid or of methacrylic acid, hydroxyalkyl esters of acrylic acid or of methacrylic acid, vinylaromatic monomers, olefins, acrylamide and methacrylamide. Polymers with copolymerized maleic acid can also be produced starting from maleic anhydride copolymers by hydrolysis. Preference is given to anionic polymers PW which are composed of at least one monoethylenically unsaturated monomer with an acid group and at least one neutral comonomer.

Particular preference is given to the salts, especially the alkali metal salts and ammonium salts of the abovementioned anionic homopolymers and copolymers. Where the anionic polymers have carboxyl groups, some of these groups can be esterified with polyalkylene oxides or their monoalkyl ethers (in this respect see e.g. EP-A 367 049).

Examples of suitable anionic polymers PW are the homopolymers and copolymers of acrylic acid, methacrylic acid, maleic acid and 2-acrylamido-2-methylpropanesulfonic acid and salts thereof. Polymers of this kind are well known to the skilled worker.

Particularly preferred anionic copolymers PW are in general composed of from 5 to 95% by weight, in particular from 30 to 90% by weight, of at least one anionic monomer, and of from 5 to 90% by weight, in particular from 10 to 70% by weight, of at least one neutral monomer, based in each case on the total amount of the monomers making up the anionic polymer. Their molecular weight is generally at least 1000 daltons and is preferably within the range from 2000 to 50,000 daltons.

Anionic polymers PW deserving of particular emphasis are:

homopolymers and copolymers of 2-acrylamido-2-methylpropanesulfonic acid; copolymers of acrylic acid and/or of methacrylic acid with styrene; copolymers of acrylic acid and/or of methacrylic acid with $C_1$–$C_4$-alkyl esters of acrylic acid and/or of methacrylic acid; copolymers of maleic acid or of maleic anhydride with olefins, especially with diisobutene; formaldehyde condensates of an arylsulfonic acid; and the salts, preferably the alkali metal salts or ammonium salts, and especially the sodium salts, of the abovementioned anionic polymers PW.

Suitable homopolymers and copolymmers of 2-acrylamido-2-methyl-propanesulfonic acid are known, for example, from DE 195 39 460, from EP 671 435 and from EP 629 650. The content of said documents is hereby incorporated in its entirety by reference. Polymers of this kind are preferably employed in the form of their sodium salts or their ammonium salts.

Preferred styrene-acrylic acid copolymers and styrene-methacrylic acid copolymers have a styrene content of from about 20 to 60% by weight, in particular from 35 to 50% by weight, and an acid number of from 130 to 250. Their average molecular weight $M_w$ is preferably from 1000 to 15,000. The glass transition temperature of the copolymers is preferably from 60 to 90° C. Some of the carboxyl groups of these copolymers may be in esterified form, e.g. ethoxylated or propoxylated. Preference is given to the ammonium and, in particular, the sodium salts of such polymers. Such polymers are known (e.g., EP-A-68 024, 96 901 and 467 103) and are obtainable commercially, for example, under the name Joncryl®, Carboset®, Morez® or Glascol®.

Preferred copolymers of maleic acid (or of maleic anhydride following hydrolysis) with olefins, preferably $C_4$–$C_{12}$ olefins, especially isobutene and diisobutene, and processes for preparing them are known, for example, from EP-A 9169, EP-A 9170 and EP-A 367049. In these polymers the molar ratio of copolymerized maleic acid to copolymerized olefin is preferably within the range from 5:1 to 1:5. Preferably, at least some of the carboxyl groups in these polymers are neutralized. Preference is given to the ammonium and, in particular, the sodium salts of such polymers. Some of the carboxyl groups of these copolymers can also be in esterified form, e.g. ethoxylated or propoxylated. The K value of the polymers in the acidic, i.e. nonneutralized, form is generally in the range from 5 to 100, preferably from 10 to 60 (determined by the method of Fikentscher as a 1% strength solution, Cellulose-Chemie 13, 1932, 58–64 and 71–74). Polymers of this kind are obtainable commercially, for example, under the name Sokalan® CP9 from BASF AG.

Preferred formaldehyde condensates of arylsulfonic acids are, in particular, condensates of benzenesulfonic acid or of naphthalenesulfonic acids, e.g., of the α or β isomer, or mixtures thereof. They generally have an average molecular weight in the range from 500 to 10,000 daltons, in particular in the range from 700 to 2500 daltons. Preference is given to the alkali metal salts, especially the sodium salts. Formaldehyde condensates of aromatic sulfonic acids are known to the skilled worker as spraying assistants from, for example, DE-A 24 45 813, EP-A 78 449, EP-A 407 889, WO 98/03576 and WO 98/03577. The disclosure content of these documents in terms of the spraying assistants is hereby expressly incorporated by reference. Suitable formaldehyde condensates are also available commercially, for example, as TAMOL® NN 4501 and as TAMOL® NN 9104 from BASF AG.

The abovementioned water-soluble polymers PW can be incorporated into the dye-comprising formulations of the invention conventionally, i.e., by adding the polymer PW to an aqueous dispersion of the dye-comprising polymer of the invention. They can also be added during the preparation of the dye-comprising polymer dispersion of the invention, in the form of protective colloids, for example. Alternatively, they can be used as drying assistants for the drying of the dye-comprising polymer dispersion of the invention, and so incorporate it into the polymer powders obtainable in that process.

The proportion by weight of the polymers PW, based on the dye-comprising polymer in the formulation, is generally within the range from 0.5 to 100% by weight, preferably within the range from 1 to 60% by weight and, in particular, within the range from 2 to 30% by weight.

Surprisingly, the use of water-soluble polymers PW not only results in an improved redispersibility of the polymer but also, during the preparation of the dye-comprising polymer dispersions of the invention, results in reduced formation of coagulum and enhanced storage stability of the dye-comprising polymer dispersions, which is particularly important when the intention is to prepare polymer dispersions having a relatively high dye content of, for example, more than 2% by weight, in particular more than 5% by weight, based on the total amount of the monomers to be polymerized.

Furthermore, polymer powders of the invention obtainable by drying such dye-comprising polymer dispersions of the invention which contain no polymer PW can be dispersed by treatment with aqueous solutions of the polymers PW. This is the case in particular when the glass transition temperature of the polymer matrix of the dye-comprising polymers is at least 60° C.

Effective redispersibility of the dye-comprising polymer of the invention can also be achieved by using, during the preparation of the dye-comprising polymer dispersions of the invention, a monomer mixture which comprises from 0.5 to 30% by weight, preferably from 1 to 20% by weight and, especially, from 2 to 15% by weight, based on the total monomer amount, of at least one monomer A1, in particular at least one cationic monomer or at least one monomer having an acid group, and especially acrylic acid, methacrylic acid or the sodium salt of 2-acrylamido-2-methylpropanesulfonic acid. Such polymers can also be redispersed without the use of the polymers PW, although in this case the redispersibility can be improved by means of polymers PW.

In many cases, the dye-comprising aqueous formulations according to the invention additionally comprise at least one organic or inorganic base as auxiliary.

Examples of suitable bases are alkali metal hydroxides, ammonia and basic ammonium salts such as ammonium carbonate, aliphatic amines such as mono-, di- and trialkylamines having generally up to four carbon atoms, heterocyclic amines such as morpholine and piperazine, and alkanolamines such as mono-, di- and trialkanolamines, and mono- and dialkanolalkylamines having usually up to four carbon atoms. It is preferred to employ volatile bases. An example that may be mentioned of a particularly preferred base (D) is ammonia.

The dye-comprising aqueous formulations of the invention usually contain, depending on the desired pH, from 0.1 to 10% by weight of base.

The pH of the aqueous, dye-comprising formulations of the invention is generally more than 7 and is, for example, in the range from 9 to 11.

Water constitutes the principal constituent of the formulations of the invention. The water content is generally from 35 to 90% by weight, preferably from 45 to 80% by weight.

The formulations of the invention preferably include a further auxiliary which is a water-soluble agent having a water-retaining action, which makes them particularly suitable for the inkjet process.

Suitable water-soluble agents having a water-retaining action include not only polyhydric alcohols, especially those containing 3 to 8 carbon atoms, such as glycerol, erythritol, pentaerythritol, pentitols such as arabitol, adonitol and xylitol, and hexitols such as sorbitol, mannitol and dulcitol, but also polyalkylene glycols and polyalkylene glycol monoalkyl ethers, a term which is also intended to include the lower (di-, tri- and tetra-) alkylene glycols and alkylene glycol ethers. These compounds preferably have average molecular weights of from 100 to 1500, particular preference being given to polyethylene glycols and polyethylene glycol ethers having an average molecular weight of $\leq 800$. Examples of these components (F) are di-, tri- and tetraethylene glycol, diethylene glycol monomethyl, monoethyl, monopropyl and monobutyl ether, and triethylene glycol monomethyl, monoethyl, monopropyl and monobutyl ether.

Further suitable agents having a water-retaining action are pyrrolidone and N-alkylpyrrolidones such as N-methylpyrrolidone, which in addition assist the penetration of the ink into the substrate material (e.g., paper).

Examples of particularly preferred agents having a water-retaining action are mono-, di- and triethylene glycol monobutyl ether and N-methylpyrrolidone.

The proportion of the agents having a water-retaining action in the dye-comprising formulations of the invention is generally from 0.1 to 35% by weight, in particular from 5 to 25% by weight.

In this context, it is often judicious to use combinations of said agents having a water-retaining action. For example, a particularly suitable combination is that of N-methylpyrrolidone and triethylene glycol monobutyl ether.

The formulations of the invention can of course comprise further auxiliaries as are customary in particular for (aqueous) inkjet inks and in the printing and coatings industries. Mention may be made, for example, of preservatives (such as 1,2-benzisothiazolin-3-one and its alkali metal salts, glutaraldehyde and/or tetramethylolacetyleneurea), antioxidants, devolatilizers/defoamers (such as acetylenediols and ethoxylated acetylenediols, which usually contain from 20 to 40 mol of ethylene oxide per mol of acetylene diol and also have a dispersing action at the same time), viscosity regulators, flow aids, wetting agents, antisettling agents, gloss enhancers, lubricants, adhesion promoters, dulling agents, emulsifiers, stabilizers, hydrophobicizers, light stabilizer additives, handle improvers and antistatics. When these auxiliaries are part of the pigment formulations of the invention, their total amount is generally $\leq 1\%$ by weight, based on the weight of the formulation.

When used as inks, especially for inkjet printing, the aqueous dye-comprising formulations of the invention preferably have a dynamic viscosity of from 1 to 20 $mm^2/s$, in particular from 2 to 10 $mm^2/s$. It has also been found advantageous if the surface tension of the aqueous, dye-comprising formulations of the invention is from 20 to 70 mN/m, in particular from 30 to 50 mN/m.

It has also proven advantageous if the polymer matrix of the dye-comprising polymers used for this purpose has a glass transition temperature $T_g$ of more than 60° C.

The procedure for preparing the aqueous, dye-comprising formulations of the invention is judiciously as follows:

The dye-comprising polymer of the invention, in the form, for example, of a powder or an aqueous disperison, is mixed with the auxiliaries and, if appropriate, with the polymer PW, which is used preferably in the form of an aqueous solution, in the presence of water. At the end, it is common to make a final adjustment of the formulation by adding to it, for example, appropriate amounts of water and, if desired, one or more further auxiliaries, such as agents having a water-retaining action, mixing in the components and then carrying out filtration with a filter means having fine separation in the range from, generally, 10 to 1 μm and preferably carrying out subsequent filtration with a further filter means having fine separation in the range from 1 to 0.5 μm. The dye-comprising polymer dispersions of the invention can also be employed just as they are for inks, for example.

The aqueous, dye-comprising formulations of the invention can be employed with advantage in the process, likewise of the invention, for printing sheetlike or three-dimensionally configured substrates in inkjet techniques, said process comprising printing the substrate with the aqueous, dye-comprising formulations and then fixing the resultant print.

In the inkjet process, the typically aqueous inks are sprayed as small droplets directly onto the substrate. There is a continuous form of the process, in which the ink is pressed at a uniform rate through a nozzle and the jet is directed onto the substrate by an electrical field depending on the pattern to be printed, and there is an interrupted or drop-on-demand process, in which the ink is expelled only where a colored dot is to appear, the latter form of the process employing either a piezoelectric crystal or a heated hollow needle (bubble jet or thermo jet process) to exert pressure on the ink system and so eject an ink droplet. These techniques are described in Text. Chem. Color, 19 (1987), No. 8, 23–29, and 21 (1989), No. 6, 27–32.

The aqueous, dye-comprising formulations of the invention are particularly suitable as inks for the bubble jet process and for the process employing a piezoelectric crystal.

The aqueous, dye-comprising formulations of the invention may be printed on all kinds of substrate material. Examples of substrate materials include coated or uncoated cellulosic materials such as paper, paperboard, cardboard, wood and woodbase materials, coated or uncoated metallic materials such as foils, sheets or workpieces made of aluminum, iron, copper, silver, gold, zinc or alloys thereof, coated or uncoated silicatic materials such as glass, porcelain and ceramics, polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and naturally occurring polymers such as gelatin, textile materials such as fibers, yarns, threads, knits, wovens, nonwovens and garments composed of polyester, modified polyester, polyester blend fabrics, cellulosic materials such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabrics, leather—both natural and artificial—in the form of smooth leather, nappa leather or suede leather, and comestibles and cosmetics.

The substrate material may be sheetlike or three-dimensional in configuration and may be printed both uniformly and imagewise with the aqueous, dye-comprising formulations of the invention.

The aqueous, dye-comprising formulations of the invention are found to be inks, especially inkjet inks, having altogether advantageous performance properties, especially good flow characteristics, and produce prints of high rubfastness, wet rubfastness, lightfastness and waterfastness. The aqueous, dye-comprising formulations are also outstandingly suitable for producing writing inks.

The present invention additionally provides pigmented aqueous formulations comprising:

i. at least one dye-comprising polymer which is present in the formulation in the form of dispersed polymer particles and is selected from the polymers of the aqueous dye-comprising polymer dispersions of the invention and from the polymer powders obtainable therefrom, and whose dye comprises at least one optical brightener, ii. at least one dye-free, film-forming water-insoluble polymer which is composed of ethylenically unsaturated monomers, iii. at least one inorganic white pigment alone or together with an inorganic filler, and iv. customary auxiliaries.

Formulations of this kind are used as coating materials, especially as coating materials for paper, and specifically as colored coating slips. Compared with conventional coating materials comprising optical brighteners in dissolved or dispersed form, the aqueous formulations of the invention are notable for the fact that the amount of optical brightener required to achieve the same degree of whiteness is much lower. Furthermore, such formulations have a much lower tendency toward yellowing as a consequence, for example, of exposure to UV radiation or heat.

The polymers of the invention employed in such formulations typically contain from 0.001 to 5% by weight, preferably from 0.01 to 2% by weight and, in particular, from 0.05 to 1% by weight of optical brightener, based on the weight of the polymer matrix. The aqueous pigmented formulations of the invention typically contain from 0.5 to 30% by weight, preferably from 1 to 20% by weight, in particular from 2 to 15% by weight and, especially, from 3 to 10% by weight, based on the solids content of the pigmented formulation of the invention, of at least one dye-comprising polymer whose dye includes at least one optical brightener.

The film-forming dye-free polymers employed in such formulations are those typically used as binders in conventional aqueous, pigmented coating compositions as well. Such film-forming polymers are usually conventional emulsion polymers. Within the formulations of the invention, they are present in the form of dispersed polymer particles.

The film-forming water-insoluble polymer is composed essentially of the abovementioned ethylenically unsaturated monomers A2. Typical monomers A2 in this case are vinyl acetate, vinyl propionate, alone or together with ethylene as copolymer, vinylaromatic monomers, especially styrene, $C_1$–$C_{10}$-alkyl esters of acrylic acid or methacrylic acid, especially methyl methacrylate, n-butyl acrylate and 2-ethylhexyl acrylate, and butadiene. Particularly common are homopolymers and copolymers of vinyl acetate with comonomers selected from the abovementioned esters of acrylic acid, ethylene and vinyl propionate, the copolymers of methyl methacrylate with the abovementioned esters of acrylic acid, the copolymers of styrene with the abovementioned esters of acrylic acid, and copolyers of butadiene with styrene. The film-forming polymers also include monomers A1, preferably in an amount of from 0.01 to 10% by weight and, in particular, from 0.1 to 5% by weight. In addition, the film-forming polymers may also include monomers B, C and D. Preferably, the film-forming polymers contain no monomers B, C and D.

In order to ensure the formation of a film, the film-forming polymer generally has a glass transition temperature (in accordance with ASTM-D 3418-82) of below 50° C. and preferably below 40° C., in particular below 30° C. In general, however, it is above −80° C. The glass transition temperature of the film-forming polymer depends of course on the specific end use. In the case of binders for emulsion paints it is frequently above −20° C. In the case of emulsion paints formulated without solvent, the glass transition temperature is frequently below 15° C. With paper coating slips for the intaglio printing sector, the glass transition temperature of the film-forming polymer lies preferably within the range from −30 to −10° C. and, in particular, within the range from −25 to −20° C.; in the case of paper coating slips for the offset sector, it lies preferably within the range from 0 to 40° C. and, in particular, within the range from 0 to 25° C.

In this context it proves useful to estimate the glass transition temperature $T_g$ of the dispersed polymer. According to Fox (T. G. Fox, Bull. Am. Phys. Soc. (Ser. II) 1 [1956] 123 and Ullmanns Enzyklopädie der technischen Chemie, Weinheim (1980), pp. 17, 18) the glass transition temperature of copolymers at high molecular masses is given in good approximation by $$\frac{1}{T_g} = \frac{X_1}{T_g^1} + \frac{X_2}{T_g^2} + \ldots \frac{X_n}{T_g^n}$$

where $X^1, X^2, \ldots, X^n$ are the mass fractions of the monomers $1, 2, \ldots, n$ and $T_g^1, T_g^2, \ldots, T_g^n$ the glass transition temperatures of the homopolymers of each of the monomers $1, 2, \ldots, n$, in degrees Kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook 3$^{rd}$ ed, J. Wiley, New York 1989. Accordingly, the glass transition temperature can be modified in a known manner through the choice of monomers.

Film-forming polymers are generally prepared, in a manner known to the skilled worker, by free-radical aqueous emulsion polymerization of the monomers in the presence of at least one polymerization initiator and at least one surface-active substance selected from the abovementioned emulsifiers and from protective colloids.

The dispersions of the dye-free film-forming polymer that are obtainable in this way generally have weight-average particle sizes in the range from 20 to 1000 nm, in particular from 50 to 800 nm. For use in paper coating slips, the average particle size is with particular preference in the range from 50 to 200 nm and, with very particular preference, from 100 to 160 nm. Bimodal and multimodal particle size distributions may also be of advantage.

In the pigmented formulations of the invention, the dye-free film-forming polymer is the binder component for the inorganic white pigment and the fillers. Such formulations comprise the film-forming polymer as binder, preferably in amounts of from 1 to 50% by weight, in particular from 2 to 40% by weight, based on the total solids content of the formulation. The paper coating slips comprise the film-forming polymers, in particular, in an amount of from 3 to 30% by weight, based on the total solids content of the paper coating slips (the figures relate to the polymer per se, not to the dispersion). The binder content depends of course on the printing ink used, on the particular type of paper, and on the mode of printing. In the intaglio printing sector, in particular, when using solventborne printing inks, the binder content is from 3 to 6% by weight, in the case of aqueous printing inks from 15 to 20% by weight and, in the offset sector, from 8 to 20% by weight. It should be borne in mind here that the polymer matrix of the polymers comprising the optical brightener likewise acts as a binder provided its glass transition temperature is appropriate for the formation of a film. Suitable film-forming polymers for paper coating slips are known, for example, from EP-A 307 816 and EP-A 833 752. Preferably, the total amount of polymer with brightener and dye-free polymer will not exceed 50% by weight, in particular 40% by weight and, with particular preference, 30% by weight, based on the total solids content of the formulation.

Normally, inorganic white pigments and inorganic fillers constitute the principal component of the pigmented formulations of the invention. The level in which they are present, based on the total solids content of the formulations, is generally from 50 to 98% by weight, and in particular, from 60 to 90% by weight. Examples of commonoly used pigments and fillers are feldspars, silicates, kaolin, talc, mica, magnesite, dolomite, alkaline earth metal sulfates, such as calcium sulfate and barium sulfate, silicon dioxide, calcium sulfoaluminate, titanium dioxide, zinc oxide, chalk, and coating clay.

The pigmented formulations of the invention may also comprise customary dispersants as auxiliaries. Suitable dispersants are polyanions, for example those of polyphosphoric acids or of polyacrylic acids, which are usually present in amounts of from 0.1 to 3% by weight, based on the amount of pigment/filler.

In addition, the pigmented formulations of the invention may comprise, as auxiliaries, what are known as cobinders, and thickeners. Naturally occurring cobinders and thickeners that may be mentioned include starch, casein, gelatin and alginates, while modified natural products include hydroxyethylcellulose, methylcellulose and carboxymethylcellulose, and cationically modified starch. It is, however, also possible to use common synthetic cobinders and thickeners, such as those based on vinyl acetate or on acrylate. They can be present, based on the amount of pigment, in amounts of from 0.1 to 10% by weight.

Further auxiliaries, depending on end use, are defoamers, preservatives, hydrophobicizers, biocides, dyes and/or fibers. To adjust the film-forming properties of the polymers A, the polymer formulations may also include solvents or plasticizers.

To prepare the pigmented formulations of the invention, the components are mixed conventionally, using the dye-free polymer generally in the form of the aqueous dispersion.

The level of water in the pigmented formulations of the invention, especially in the paper coating slip, is usually adjusted to from 30 to 75% by weight, based on the paper coating slip.

The pigmented formulations of the invention are particularly suitable for use as paper coating slips. Paper coating slips are used to coat paper, especially papers to be used in printing processes, such as offset or intaglio printing processes, for example.

The paper coating slip can be applied by conventional methods to the papers to be coated (cf. Ullmanns Enzyklopädie der Technischen Chemie, $4^{th}$ edition, Vol. 17, p. 603 ff). Suitable papers for coating are papers of different thicknesses, including cardboard and the like. The papers are preferably coated with from 2 g ($m^2$) to 50 g ($m^2$) of the paper coating slip (dry).

A particular feature of the paper coating slips of the invention is that papers coated with them do not undergo severe yellowing on exposure to heat or UV radiation. Furthermore, the achievement of a comparable level of whiteness requires a very much lower amount of optical brightener than in the case of paper coating slips containing water-soluble optical brighteners.

EXAMPLES

I. Analysis

The pH of the dispersions was determined using a glass electrode.

The LT was determined by comparing the light transmittance of a 0.01% strength by weight sample (path length 2.5 cm) of the respective polymer dispersion against water.

The particle size in the monomer emulsion ($\bar{d}_z$) was determined as for the polymer particle size ($d_z$) in the manner described above using a Coulter N4 Plus Particle Analyzer on 0.01% strength by weight samples of the dispersion or emulsion, respectively.

The surface tension of the dye-comprising polymer dispersions was determined using a ring tensiometer TE 1C from Lauda in a method based on ISO 1409 at 20° C. and 1 atm.

The color properties of the colored polymers were determined by comparative assessment of the freeze-dried polymer dispersions (visually) and from their colorations in plasticized PVC in analogy to DIN 53775 (chromophore concentration of 0.02% by weight for fluorescent and 0.05% by weight for nonfluorescent colorants, values based on dry mass of dispersion). For this purpose, sheets of plasticized PVC were printed and calendered with a white sheet of plasticized PVC (hot rolling on a double-roll mill at 160° C., 200 revolutions, roll nip 0.3 mm; pressing of the calendered sheet at 160° C., 200 bar, 3 min, spacer frame thickness 1 mm). The coating material used was an alkyd melamine stoving enamel with 5% by weight pigmentation, based on dry mass of dispersion (film thickness 100 μm wet; stoving conditions 30 min, 130° C.). The coloristic comparison used comprised the monomeric dyes used in each case, with a comparable level of addition of chromophore (see Table 2).

II. Dyes Employed in Accordance With the Invention, and Preparation of the Copolymerizable Perylene Dyes of the Invention, of the Formula III The following dyes are used to prepare the monomer emulsions employed in accordance with the invention and described under III., and to prepare the polymer dispersions of the invention described under IV.

Dye 1: Lumogen® F Yellow 083: (1,7-bis(isobutyloxycarbonyl)-6,12-dicyanoperylene)

Dye 2: Lumogen® F Orange 240 (from BASF; perylenetetracarboxylic diimide fluorescent dye);

Dye 3: Lumogen® F Red 300 (from BASF; perylenetetracarboxylic diimide fluorescent dye);

Dye 4: Lumogen® F Violet 570 (from BASF; naphthylimide fluorescent dye);

Dye 5: Neopen® Yellow 075 (from BASF; Solvent Yellow 162; monoazo dye);

Dye 6: Neopen® Cyan 742 (from BASF; azamethine dye);

Dye 6a: Neopen® Magenta 525 (from BASF; azamethine dye)

Dye 6b: C.I. Solvent Red 49 (45170:1)(3',6'-bis(diethylamino)fluoran;

Dye 7: Neopen® Blue FF 4012 (from BASF; copper phthalocyanine dye);

Dye 7a: Neopen® Blue 807 (from BASF; reaction product of a mixture of copper phthalocyanine trisulfochloride and tetrasulfochloride with 3-(2-ethylhexoxy)propylamine);

Dye 8:. 5,9,14,18,23,27,32,36-octabutoxy-2,3-naphthalocyanine (from Aldrich);

Dye 9: Ultraphor® SF-OO (from BASF; o,o-dicyanodistyrylbenzene);

Dye 10: N-(n-nonyl)perylene-3,4-dicarboximide;

Dye 11: N-(2,6-diisopropylphenyl)-1,6,9-tris(p-tert-butylphenoxy)perylene-3,4-dicarboximide Dye 5:

Dye 6:

Dye 6a:

Novel dyes 12a, 12b, 13, 14, 15a, 15b, 16, 17a, 17b, 18

Dye 12a

Dye 12b

Dye 13
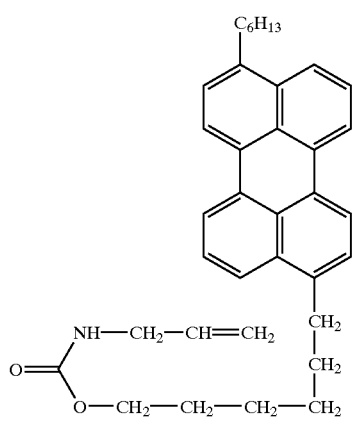
Dye 14
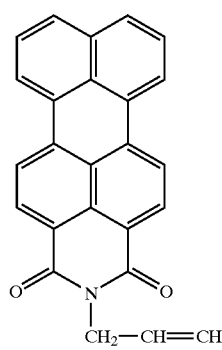
Dye 15a
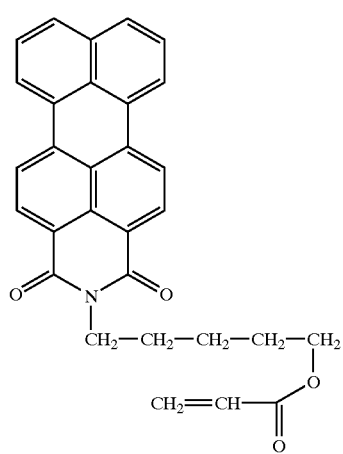
Dye 15b
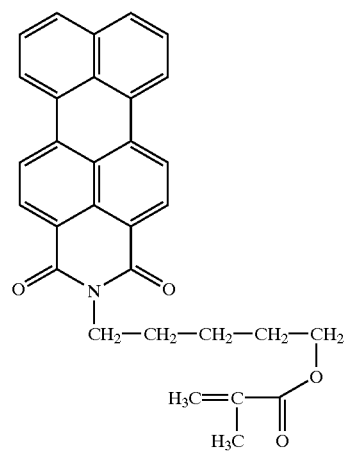
Dye 16
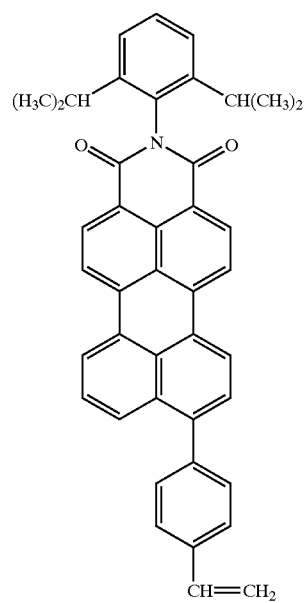
Dye 17a
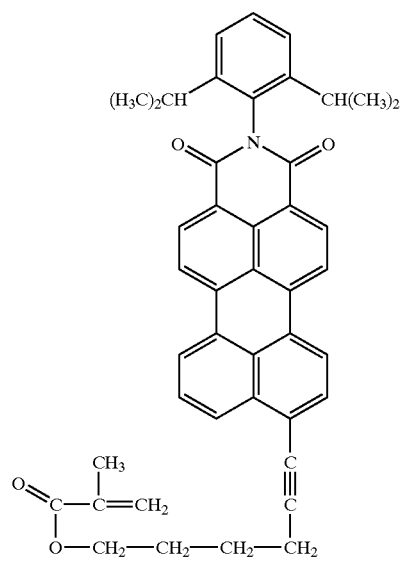

-continued

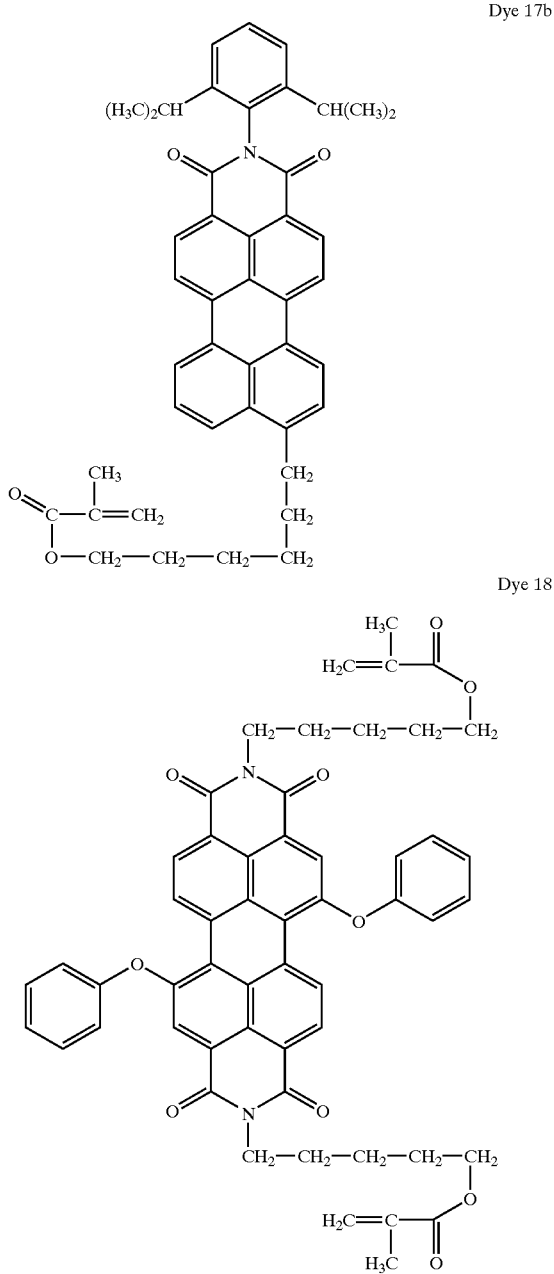

Preparation of the Dyes Employed in Accordance With the Invention

Example 1

Preparation of N-Nonylperylene-3,4-dicarboximide (Dye 10)

A mixture of 5 g (15.5 mmol) of perylene-3,4-dicarboxylic anhydride (prepared in accordance with Liebigs Ann. 1995, 1229–1244), 2.44 g (17 mmol) of n-nonylamine and 75 ml of N-methylpyrrolidone (NMP) was heated at 175° C. under nitrogen for 1.5 h. After cooling to room temperature, the resulting precipitate was filtered off, washed with methanol and dried under reduced pressure at 80° C. This gave 5.5 g (79%) of the desired product in the form of dark red crystals having a melting point of 201° C.

Analytical data for dye 10: Elemental analysis (% by weight calc./found): C: 83.2/83.3; H: 6.5/6.5; N: 3.1/3.1; Mass (FD, 8 kV): m/z=447 (m$^+$, 100%); UV/VIS (CH$_2$Cl$_2$): $\lambda_{max}$ ($\epsilon$)=482 (28791), 500 (32531) nm; $^1$H-NMR (400 MHz, CDCl$_3$): δ=8.02 (d, 2H), 7.82 (d, 2H), 7.70 (d, 2H), 7.59 (d, 2H), 7.51 (d, 2H), 4.05 (m, 2H), 1.78 (m, 2H), 1.45 (m, 2H), 1.34 (m, 10H), 0.90 (t, 3H) ppm; IR (KBr): ν=1680 (s, C=O), 1650 (s, C=O) cm$^{-1}$.

Example 2

Preparation of N-(2,6-Diisopropylphenyl)-1,6,9-tris (p-tert-butylphenoxy)perylene-3,4-dicarboximide (Dye 11)

A mixture of 32.3 g (45 mmol) of N-(2,6-diisopropylphenyl)-1,6,9-tribromoperylene-3,4-dicarboximide (prepared in accordance with Example 1a of WO 96/22 332), 27.0 g (180 mmol) of p-tert-butylphenol, 16.6 g (120 mmol) of anhydrous, finely pulverized potassium carbonate and 1200 ml of N-methylpyrrolidone (NMP) was heated at 120° C. with stirring for 6 h. After cooling to room temperature, the reaction mixture was introduced with stirring into 4500 g of 6% strength by weight aqueous hydrochloric acid, the mixture was subsequently stirred for 2 h, and the precipitated solid was filtered off, washed to neutrality with water and dried under reduced pressure at 100° C. Filtration through a short silica gel column using methylene chloride as eluent, and removal of the solvent under reduced pressure, gave 38.9 g (93%) of the desired product in the form of reddish violet crystals having a softening point of 156° C.

Analytical data for dye 11: Elemental analysis (% by weight calc./found): C: 83.0/83.2; H: 6.9/6.8; N: 1.5/1.5; Mass (FD, 8 kV): m/z=926 (m$^+$, 100%); UV/VIS (CH$_2$Cl$_2$): $\lambda_{max}$ ($\epsilon$)=531 (38122) nm; IR (KBr): ν=1689 (s, C=O), 1652 (s, C=O) cm$^{-1}$.

Example 3

Preparation of 3-Hexyl-9(10)-(6-methacryloxy-1-hexynyl)perylene (Dye 12a)

1 g (2.3 mmol) of 3-hexyl-9(10)-(6-hydroxy-1-hexynyl) perylene (prepared by alkaline hydrolysis of 3-(6-acetoxy-1-hexynyl)-9(10)-hexylperylene in accordance with Liebigs Ann./Recueil 1997, 395–407) was dissolved in 60 ml of dry dioxane, heated to 45° C. under nitrogen, admixed with 0.75 ml of triethylamine and 0.52 ml of methacryloyl chloride, stirred at 45° C. for 4 h, then admixed with 0.52 ml of methacryloyl chloride, stirred at 45° C. for a further 12 h, cooled to room temperature, admixed with 250 ml of water and extracted with a total of 350 ml of methylene chloride. The solvent was removed by distillation under reduced pressure and the residue was chromatographed on silica gel using methylene chloride as eluent. Following removal of the solvent under reduced pressure, 790 mg (68%) of the desired product were isolated as a yellow, finely crystalline solid.

Analytical data for dye 12a: Elemental analysis (% by weight calc./found): C: 86.4/86.3; H: 7.2/7.3; Mass (FD, 8 kV): m/z=500.4 (m$^+$, 100%); UV/VIS (dioxane): $\lambda_{max}$ ($\epsilon$)= 455 (29712) nm; $^1$H-NMR (300 MHz, CDCl$_3$): δ=8.25–8.00 (m, 4H), 7.89–7.85 (m, 2H), 7.49–7.41 (m, 2H), 7.33–7.26 (m, 2H), 6.12 (s, 1H), 5.57 (s, 1H), 4.23 (t, 2H), 3.04–2.95 (t, 2H), 2.82–2.67 (m, 4H), 1.98 (s, 3H), 1.94–1.83 (m, 4H), 1.78–1.40 (m, 6H), 0.97 (t, 3H) ppm.

Example 4

Preparation of 3-Hexyl-9(10)-(6-methacryloxyhexyl)perylene (Dye 12b)

The reaction, analogous to Example 3, of 3-hexyl-9(10)-(6-hydroxyhexyl)perylene (prepared in accordance with Liebigs Ann./Recueil 1997, 395–407) with methacryloyl chloride followed by chromatography on silica gel using methylene chloride as eluent gave the desired product in the form of dark yellow crystals in a yield of 74%.

Analytical data for dye 12b: Elemental analysis (% by weight calc./found): C: 85.7/85.8; H: 8.0/7.9; Mass (FD, 8 kV): m/z 504 (m$^+$, 100%); UV/VIS (dioxane): $\lambda_{max}$ ($\epsilon$)=450 (30514) nm; $^1$H-NMR (300 MHz, CDCl$_3$): $\delta$=8.25–8.04 (m, 4H), 7.87–7.85 (m, 2H), 7.53–7.45 (m, 2H), 7.33–7.25 (m, 2H), 6.14–6.10 (m, 1H), 5.58–5.57 (m, 1H), 4.19 (t, 2H), 3.00 (t, 4H), 1.98 (s, 3H), 1.78–1.40 (m, 16H), 0.97 (t, 3H) ppm; $^{13}$C-NMR (75 MHz, CDCl$_3$): $\delta$=167.5, 138.4, 138.0, 133.0, 132.9, 132.1, 132.0, 129.7, 129.6, 128.8, 126.7, 126.6, 126.3, 126.2, 126.1, 125.2, 123.7, 123.6, 120.0, 119.6, 119.5, 64.8, 33.4, 33.2, 31.8, 30.6, 30.4, 29.6, 29.5, 28.7, 26.0, 22.7, 18.4, 14.2 ppm.

Example 5

Preparation of 3-(N-Allylaminocarbonyloxyhexyl)-9(10)-hexylperylene (Dye 13)

1 g (2.29 mmol) of 3-hexyl-9(10)-(6-hydroxyhexyl)perylene (prepared in accordance with Liebigs Ann./Recueil 1997, 395–407) and 0.57 g (6.87 mmol) of allyl isocyanate were dissolved in 200 ml of dry toluene under inert gas and the solution was heated at reflux for 12 h with stirring. After cooling to room temperature and the subsequent removal of the solvent by distillation, the solid residue was taken up in a little methylene chloride, precipitated by stirring with methanol, filtered off, washed with methanol and dried. This gave 1.1 g (85%) of the desired product as a yellow powder having a melting point of 118° C.

Analytical data for dye 13: Elemental analysis (% by weight calc./found): C: 83.2/83.1; H: 7.9/8.0; N: 2.7/2.7; Mass (FD, 8 kV): m/z=519.4 (m$^+$, 100%); UV/VIS (dioxane): $\lambda_{max}$ ($\epsilon$)=450 (30548) nm; $^1$H-NMR (300 MHz, CDCl$_3$): $\delta$=8.20–8.00 (m, 4H), 7.90–7.80 (m, 2H), 7.55–7.45 (m, 2H), 7.35–7.30 (m, 2H), 5.90–5.76 (m, 1H), 5.20–5.05 (m, 2H), 4.10–4.00 (t, 2H), 3.80–3.70 (m, 2H), 3.00 (t, 4H), 1.85–1.25 (m, 16H), 0.90 (t, 3H) ppm; $^{13}$C-NMR (125 MHz, CDCl$_3$): $\delta$=139.5, 139.4, 139.1, 139.0, 136.8, 133.9, 132.9, 130.6, 129.7, 127.6, 127.1, 126.9, 124.4, 124.0, 120.8, 120.4, 114.9, 64.7, 54.7, 46.2, 44.0, 43.4, 34.0, 33.9, 32.6, 31.5, 30.5, 30.3, 30.1, 26.7, 23.5, 14.3 ppm.

Example 6

Preparation of N-Allylperylene-3,4-dicarboximide (Dye 14)

A mixture of 5 g (15.5 mmol) of perylene-3,4-dicarboxylic anhydride (prepared in accordance with Liebigs Ann. 1995, 1229–1244), 11.4 g (0.2 mol) of allylamine and 1200 ml of N-methylpyrrolidone was heated at 85° C. in a 2 l autoclave for 7 h and then cooled to room temperature, the autoclave was let down, the solvent was reduced to about 25% of its original volume by concentration, and the precipitation of the crude product was completed by adding four times the amount of methanol. The precipitate formed was isolated by filtration, washed with methanol and dried at 60° C. under reduced pressure. Chromatographic separation on silica gel using 40:1 chloroform/methanol as eluent, followed by twofold recrystallization from chloroform, gave 4.83 g (86%) of the desired end product in the form of brownish red crystals which underwent decomposition at temperatures above 260° C.

Analytical data for dye 14: Elemental analysis (% by weight calc./found): C: 83.1/82.9; H: 4.2/4.2; N: 3.9/3.9; Mass (FD, 8 kV): m/z=361 (m$^+$, 100%); UV/VIS (CH$_2$Cl$_2$): $\lambda_{max}$ ($\epsilon$)=485 (33852), 502 (37056) nm; $^1$H-NMR (400 MHz, DMSO-d$_6$): $\delta$=8.10 (d, 2H), 7.75 (d, 2H), 7.71 (d, 2H), 7.40 (t, 2H), 7.25 (d, 2H), 5.98 (m, 1H), 5.17 (dd, 2H), 4.22 (d, 2H) ppm; IR (KBr): $\nu$=1680 (s, C=O), 1651 (s, C=O) cm$^{-1}$.

Example 7

Preparation of N-(5-Acryloxypentyl)perylene-3,4-dicarboximide (Dye 15a)

1. A mixture of 10 g (31 mmol) of perylene-3,4-dicarboxylic anhydride (prepared in accordance with Liebigs Ann. 1995, 1229–1244), 3.6 g (35 mmol) of 5-amino-1-pentanol and 250 ml of NMP was heated at 175° C. under nitrogen for 1.5 h. After cooling to room temperature, the reddish brown precipitate was filtered off, washed with methanol and dried under reduced pressure at 100° C. This gave 9.0 g (71%) of N-(5-hydroxypentyl)perylene-3,4-dicarboximide in the form of a brownish red powder having a melting point of 274–276° C.

Analytical data for N-(5-hydroxypentyl)perylene-3,4-dicarboximide: Elemental analysis (% by weight calc./found): C: 79.6/79.4; H: 5.2/5.2; N: 3.4/3.4; Mass (FD, 8 kv): m/z=407.2 (m$^+$, 100%); UV/VIS (CH$_2$Cl$_2$): $\lambda_{max}$ ($\epsilon$)= 482 (30101), 507 (33006) nm; $^1$H-NMR (500 MHz, C$_2$D$_2$Cl$_4$): $\delta$=8.52 (d, 2H), 8.34 (d, 2H), 8.32 (d, 2H), 7.86 (d, 2H), 7.52 (t, 2H), 4.15 (t, 2H), 3.61 (t, 2H), 1.78 (m, 2H), 1.62 (m, 2H), 1.48 (m, 2H) ppm; IR (KBr): $\nu$=1680 (s, C=O), 1650 (s, C=O) cm$^{-1}$.

2. 2 g (5 mmol) of N-(5-hydroxypentyl)perylene-3,4-dicarboximide from 1. were dissolved under nitrogen in 60 ml of pyridine, with heating at 80° C., cooled to 65° C. and admixed dropwise at this temperature with a solution of 0.81 ml (10 mmol) of acryloyl chloride in 30 ml of anhydrous dioxane. The mixture was stirred at 65° C. for a further 1.5 h, the solvent was removed by distillation, the residue was taken up in 20 ml of chloroform, a filtration was conducted, the filtrate was admixed with 100 ml of hexane, and the precipitated product was isolated by filtration. Chromatography on a short silica gel column using methylene chloride as eluent gave 1.5 g (65%) of the desired product as a brownish red powder with a strong tendency to polymerize on heating.

Analytical data for dye 15a: Elemental analysis (% by weight calc./found): C: 78.1/78.2; H: 5.0/5.0; N: 3.0/3.0; Mass (FD, 8 kV): m/z=461.3 (m$^+$, 100%); UV/VIS (CH$_2$Cl$_2$): $\lambda_{max}$ ($\epsilon$)=484 (29711), 505 (31976) nm; $^1$H-NMR (400 MHz, CDCl$_3$): $\delta$=8.00 (d, 2H), 7.88 (d, 2H), 7.71 (d, 2H), 7.62 (d, 2H), 7.32 (t, 2H), 6.21 (m, 1H), 5.82 (m, 1H), 5.58 (m, 1H), 4.19 (t, 2H), 4.10 (t, 2H), 1.81 (m, 4H), 1.58 (m, 2H) ppm; IR (KBr): $\nu$=1731 (s, C=O, acrylic ester), 1680 (s, C=O, imide), 1651 (s, C=O, imide) cm$^{-1}$.

Example 8

Preparation of N-(5-Methacryloxypentyl)perylene-3,4-dicarboximide (Dye 15b)

2 g (5 mmol) of N-(5-hydroxypentyl)perylene-3,4-dicarboximide from Example 7, 1. were dissolved in 60 ml of pyridine under nitrogen, with heating at 80° C., and the solution was admixed dropwise at this temperature with a solution of 0.97 ml (10 mmol) of methacryloyl chloride in 30 ml of anhydrous dioxane. Stirring was continued at 80°

C. for a further 1.5 h, the solvent was removed by distillation, the residue was taken up in 30 ml of chloroform, a filtration was conducted, the filtrate was admixed with 100 ml of hexane and the precipitated product was isolated by filtration. Chromatographic purification on a short silica gel column using methylene chloride as eluent gave 1.6 g (70%) of the desired product as a brownish red powder.

Analytical data for dye 15b: Elemental analysis (% by weight calc./found): C: 78.3/78.3; H: 5.3/5.3; N: 2.9/2.9; Mass (FD, 8 kV): m/z=475.3 (m$^+$, 100%); UV/VIS (CH$_2$Cl$_2$): $\lambda_{max}$ ($\epsilon$)=486 (29133), 507 (31342) nm; $^1$H-NMR (400 MHz, CDCl$_3$): $\delta$=8.00 (d, 2H), 7.88 (d, 2H), 7.71 (d, 2H), 7.62 (d, 2H), 7.32 (t, 2H), 6.12 (m, 1H), 5.55 (m, 1H), 4.21 (t, 2H), 4.10 (t, 2H), 1.98 (s, 3H), 1.81 (m, 4H), 1.58 (m, 2H) ppm; IR (KBr): $\nu$=1734 (s, C=O, acrylic ester), 1681 (s, C=O, imide), 1650 (s, C=O, imide) cm$^{-1}$.

Example 9

Preparation of N-(2,6-Diisopropylphenyl)-9-(p-styryl)perylene-3,4-dicarboximide (Dye 16)

A mixture of 5 g (9 mmol) of 9-bromo-N-(2,6-diisopropylphenyl)perylene-3,4-dicarboximide (prepared in analogy to Example 6a of WO 96/22 332 using N-(2,6-diisopropylphenyl)perylene-3,4-dicarboximide from Example 28 of WO 97/22 607 as starting material), 1.6 g (10.8 mmol) of p-styreneboronic acid, 0.9 g of Pd(PPh$_3$)$_4$, 100 ml of a 2N potassium carbonate solution and 500 ml of toluene was heated at reflux temperatures (115–120° C.) with stirring in an argon atmosphere for 12 h, cooled and then precipitated on ice; the organic phase was separated off, the aqueous phase was extracted with 2 times 200 ml of methylene chloride, and the combined organic phases were dried over potassium sulfate. Subsequently, the solvent was removed under reduced pressure and the residue was taken up in the minimum amount of methylene chloride. The product was precipitated from this solution by adding methanol. Chromatographic purification on silica gel using methylene chloride as eluent gave 4.89 g (93%) of the desired product as a brilliant red crystalline solid having a melting point of >300° C.

Analytical data for dye 16: Elemental analysis (% by weight calc./found): C: 86.4/86.3; H: 5.7/5.7; N: 2.4/2.4; Mass (FD, 8 kV): m/z=584 (m$^+$, 100%); UV/VIS (dioxane): $\lambda_{max}$ ($\epsilon$)=502 (41901), 519 (41062) nm; $^1$H-NMR (300 MHz, CDCl$_3$): $\delta$=8.63 (d, 2H), 8.47–8.41 (m, 4H), 8.01 (d, 1H), 7.59–7.45 (m, 7H), 7.33 (d, 2H), 6.85–6.80 (m, 1H), 5.87 (d, 1H), 5.35 (d, 1H), 2.79–2.74 (m, 2H), 1.18 (d, 12H) ppm; $^{13}$C-NMR (75 MHz, CDCl$_3$): $\delta$=165.3, 147.2, 144.4, 140.8, 138.9, 138.7, 138.6, 137.5, 133.8, 133.2, 132.3, 131.7, 131.6, 131.4, 130.6, 130.5, 129.7, 129.6, 129.4, 128.2, 128.1, 127.6, 125.2, 125.1, 124.7, 122.2, 122.1, 121.5, 121.2, 115.9, 93.1, 30.3, 25.2 ppm. IR (KBr): $\nu$=1692 (s, C=O), 1655 (s, C=O) cm$^{-1}$.

Example 10

Preparation of N-(2,6-Diisopropylphenyl)-9-(6-methacryloxy-1-hexynyl)perylene-3,4-dicarboximide (Dye 17a)

1. 2.0 g (3.56 mmol) of 9-bromo-N-(2,6-diisopropylphenyl)perylene-3,4-dicarboximide (prepared in analogy to Example 6a of WO 96/22 332 using N-(2,6-diisopropylphenyl)perylene-3,4-dicarboximide from Example 28 of WO 97/22 607 as starting material) was dissolved in 500 ml of a mixture of one part by volume of absolute tetrahydrofuran (THF) and one part by volume of dry piperidine under inert gas, admixed in succession with 4 mol % of Pd(PPh$_3$)$_4$ (164 mg, 0.14 mmol), 5 mol % of CuI (32 mg, 0.18 mmol) and 1.14 g (7.12 mmol) of 6-acetoxy-1-hexyne; this mixture was slowly heated to 70° C. and held at this temperature for 1 h. After cooling to room temperature, the reaction mixture was added to three times the volume of a mixture of ice and concentrated hydrochloric acid in a volume ratio of 3:1, the organic phase was separated off, the aqueous phase was extracted with 3 times 200 ml of methylene chloride, the combined organic extracts were dried over magnesium sulfate and the solvent was removed under reduced pressure. Chromatography on silica gel using methylene chloride as eluent gave 1.98 g (90%) of N-(2,6-diisopropylphenyl)-9-(6-acetoxy-1-hexynyl)perylene-3,4-dicarboximide as a red powder having a melting point >300° C.

Analytical data for N-(2,6-diisopropylphenyl)-9-(6-acetoxy-1-hexynyl)perylene-3,4-dicarboximide: Elemental analysis (% by weight calc./found): C: 81.4/81.2; H: 6.0/6.1; N: 2.3/2.3; Mass (FD, 8 kV): m/z=619.5 (m$^+$, 100%); UV/VIS (dioxane): $\lambda_{max}$ ($\epsilon$)=492 (45955), 519 (49298) nm; $^1$H-NMR (300 MHz, CDCl$_3$): $\delta$=8.61 (d, 2H), 8.38–8.24 (m, 5H), 7.64 (d, 2H), 7.47 (t, 1H), 7.33 (d, 2H), 4.18 (t, 2H), 2.79–2.74 (m, 2H), 2.67 (t, 2H), 2.07 (s, 3H), 1.93–1.82 (m, 4H), 1.16 (d, 12H) ppm; $^{13}$C-NMR (125 MHz, CDCl$_3$): $\delta$=170.0, 162.9, 144.7, 136.3, 133.4, 131.0, 130.9, 130.1, 130.0, 128.4, 128.3, 128.2, 127.7, 126.7, 126.4, 125.7, 123.6, 123.1, 123.0, 122.1, 120.1, 119.4, 119.3, 97.4, 78.1, 63.0, 28.2, 24.3, 23.0, 20.0, 18.6, 17.1 ppm.

2. A mixture of 1.98 g (3.2 mmol) of N-(2,6-diisopropylphenyl)-9-(6-acetoxy-1-hexynyl)perylene-3,4-dicarboximide, 2.2 g (38 mmol) of potassium hydroxide, 400 ml of isopropanol and 250 ml of water was heated at reflux for 12 h, concentrated by distillative removal of the organic solvent, and acidified using ice-cold dilute hydrochloric acid. The precipitate was separated off and recrystallized from glacial acetic acid. This gave 1.8 g (97%) of N-(2,6-diisopropylphenyl)-9-(6-hydroxy-1-hexynyl)perylene-3,4-dicarboximide as a red powder having a melting point >300° C.

Analytical data for N-(2,6-diisopropylphenyl)-9-(6-hydroxy-1-hexynyl)perylene-3,4-dicarboximide: Elemental analysis (% by weight calc./found): C: 83.2/83.3; H: 6.1/6.1; N: 2.4/2.4; Mass (FD, 8 kV): m/z=577.5 (m$^+$, 100%); UV/VIS (dioxane): $\lambda_{max}$ ($\epsilon$)=492 (46203), 519 (50125) nm; $^1$H-NMR (300 MHz, CDCl$_3$): $\delta$=8.61 (d, 2H), 8.37–8.21 (m, 5H), 7.66–7.57 (m, 2H), 7.47 (t, 1H), 7.33 (d, 2H), 3.78–3.74 (m, 2H), 3.66–3.61 (m, 2H), 2.67 (t, 2H), 1.86–1.82 (m, 4H), 1.14 (d, 12H) ppm; $^{13}$C-NMR (125 MHz, CDCl$_3$): $\delta$=163.9, 145.6, 137.1, 136.7, 134.1, 131.8, 131.7, 130.9, 130.7, 130.3, 129.4, 129.1, 128.4, 127.5, 127.0, 126.5, 124.6, 123.9, 122.9, 120.8, 120.1, 98.8, 78.8, 62.3, 32.0, 29.1, 25.1, 23.9, 19.7 ppm.

3. A solution of 1 g (1.72 mmol) of N-(2,6-diisopropylphenyl)-9-(6-hydroxy-1-hexynyl)perylene-3,4-dicarboximide in 100 ml of dry dioxane was heated to 45° C. under nitrogen, admixed with 0.4 ml of triethylamine and 0.28 ml of methacryloyl chloride, stirred at 45° C. for 4 h, admixed with 0.28 ml of methacryloyl chloride, stirred at 45° C. for a further 12 h, cooled to room temperature, again admixed with 200 ml of water and extracted with a total of 400 ml of methylene chloride. The solvent was distilled off under reduced pressure and the residue was chromatographed on silica gel using methylene chloride as eluent. Following removal of the solvent under reduced pressure, 800 mg (78%) of the desired product were isolated as a red, finely crystalline solid.

Analytical data for dye 17a: Elemental analysis (% by weight calc./found): C: 81.8/81.6; H: 6.1/6.1; N: 2.2/2.2; Mass (FD, 8 kV): m/z=645.5 (m$^+$, 100%); UV/VIS (dioxane): $\lambda_{max}$ ($\epsilon$)=492 (48287), 519 (50034) nm; $^1$H-NMR (300 MHz, CDCl$_3$): δ=8.61–8.56 (m, 2H), 8.33–8.17 (m, 5H), 7.63–7.55 (m, 2H), 7.46 (t, 1H), 7.33 (d, 2H), 6.13 (s, 1H), 5.56 (s, 1H), 4.27 (t, 2H), 2.82–2.66 (m, 2H), 1.96 (s, 3H), 1.95–1.84 (m, 4H), 1.19 (d, 12H) ppm; $^{13}$C-NMR (75 MHz, CDCl$_3$): δ=167.5, 163.9, 145.7, 137.2, 136.9, 136.4, 134.2, 131.9, 131.8, 131.1, 130.9, 130.4, 129.4, 129.2, 128.6, 127.6, 127.5, 127.2, 126.6, 125.4, 124.6, 124.0, 123.0, 120.9, 120.3, 120.2, 98.5, 79.1, 64.2, 29.2, 28.1, 25.4, 24.0, 19.6, 18.3, 17.9 ppm; IR (KBr): ν=1733 (s, C=O, acrylic ester), 1696 (s, C=O, imide), 1654 (s, C=O, imide) cm$^{-1}$.

Example 11

Preparation of N-(2,6-Diisopropylphenyl)-9-(6-methacryloxyhexyl)perylene-3,4-dicarboximide (Dye 17b)

Reduction of 2 g (3.2 mmol) of N-(2,6-diisopropylphenyl)-9-(6-acetoxy-1-hexynyl)perylene-3,4-dicarboximide (cf. Example 10, 1.) in accordance with the hydrogenation instructions indicated for alkynylperylenes in Liebigs Ann./Recueil 1997, 395–407 gave a quantitative yield of the corresponding acetoxyhexyl derivative, which could be hydrolyzed as per Example 10, 2. in 98% yield to N-(2,6-diisopropylphenyl)-9-(6-hydroxyhexyl)perylene-3,4-dicarboximide. This, when reacted with methacryloyl chloride in accordance with Example 10, 3., gave the desired product in 81% yield as a red, amorphous solid.

Analytical data for dye 17b: Elemental analysis (% by weight calc./found): C: 81.3/81.2; H: 6.7/6.8; N: 2.15/2.1; Mass (FD, 8 kV): m/z=649.5 (m$^+$, 100%); UV/VIS (dioxane): $\lambda_{max}$ ($\epsilon$)=489 (48003), 511 (49732) nm; $^1$H-NMR (300 MHz, CDCl$_3$): δ=8.61–8.52 (m, 2H), 8.38–8.21 (m, 5H), 7.63–7.55 (m, 2H), 7.49 (t, 1H), 7.34 (d, 2H), 6.12 (s, 1H), 5.58 (s, 1H), 4.21 (t, 2H), 3.00 (t, 2H), 2.80 (m, 2H), 1.97 (s, 3H), 1.81–1.44 (m, 8H), 1.19 (d, 12H) ppm; $^{13}$C-NMR (75 MHz, CDCl$_3$): δ=167.3, 163.8, 145.6, 137.0, 136.9, 136.3, 134.4, 131.7, 131.6, 131.1, 130.9, 130.6, 129.5, 129.1, 128.4, 127.8, 127.2, 127.1, 126.6, 125.4, 124.6, 124.0, 123.0, 120.9, 120.3, 120.2, 64.2, 33.7, 31.0, 29.2, 28.1, 25.4, 24.0, 19.6, 18.3, 17.9 ppm; IR (KBr): ν=1735 (s, C=O, acrylic ester), 1696 (s, C=O, imide), 1656 (s, C=O, imide) cm$^{-1}$.

Example 12

Preparation of N,N'-bis(5-Methacryloxypentyl)-1,7-diphenoxyperylene-3,4:9,10-tetracarboxylic Diimide (Dye 18)

1. A mixture of 5 g (8.6 mmol) of 1,7-diphenoxyperylene-3,4:9,10-tetracarboxylic dianhydride (from PCT/EP96/05519), 2.1 g (mmol) of 5-amino-1-pentanol and 75 ml of N-methylpyrrolidone was heated at 175° C. under nitrogen for 1.5 h. After cooling to room temperature, the deep violet precipitate was filtered off, washed with copious amounts of methanol and dried under reduced pressure at 100° C. This gave 5.9 g (92%) of N,N'-bis(5-hydroxypentyl)-1,7-diphenoxyperylene-3,4:9,10-tetracarboxylic diimide in the form of a blackish violet powder having a melting point of >300° C.

Analytical data for N,N'-bis(5-hydroxypentyl)-1,7-diphenoxyperylene-3,4:9,10-tetracarboxylic diimide: Elemental analysis (% by weight calc./gef.): C: 74.0/73.8; H: 5.1/5.1; N: 3.75/3.7; Mass (FD, 8 kV): m/z=746.4 (m$^+$, 100%); UV/VIS (CH$_2$Cl$_2$): $\lambda_{max}$ ($\epsilon$)=404 (8312), 515 (38122), 550 (57103) nm; IR (KBr): ν=1695 (s, C=O), 1653 (s, C=O) cm$^{-1}$.

2. 2.8 g (3.8 mmol) of N,N'-bis(5-hydroxypentyl)-1,7-diphenoxyperylene-3,4:9,10-tetracarboxylic diimide from 1. were dissolved in 75 ml of pyridine, and the solution was heated to 80° C. under nitrogen and admixed dropwise at this temperature with a solution of 1.5 ml (15.2 mmol) of methacryloyl chloride in ml of anhydrous dioxane. This mixture was stirred at 80° C. for a further 1.5 h, the solvent was removed by distillation, the residue was taken up in a little chloroform (about 20 ml), a filtration was conducted, the filtrate was admixed with about 100 ml of hexane and the precipitated product was isolated by filtration. Chromatography on a short silica gel column using methylene chloride as eluent gave 1.5 g (45%) of the desired product as a blackish violet powder with a tendency to polymerize on heating.

Analytical data for dye 18: Elemental analysis (% by weight calc./found): C: 73.45/73.4; H: 5.25/5.2; N: 3.2/3.2; Mass (FD, 8 kV): m/z=483 (m$^+$, 100%); UV/VIS (CH$_2$Cl$_2$): $\lambda_{max}$ ($\epsilon$)=403 (8111), 514 (37001), 549 (55865) nm; $^1$H-NMR (200 MHz, CDCl$_3$): δ=9.53 (d, 2H), 8.56 (d, 2H), 8.28 (s, 2H), 7.48 (m, 4H), 7.28 (m, 2H), 7.16 (m, 4H), 6.08 (m, 2H), 5.51 (m, 2H), 4.16 (m, 8H), 1.92 (s, 6H), 1.81 (m, 8H), 1.53 (m, 4H) ppm; IR (KBr): ν=1734 (s, C=O, acrylic ester), 1694 (s, C=O, imide), 1654 (s, C=O, imide) cm$^{-1}$.

III. Preparation of the Monomer Emulsion Employed in Accordance With the Invention (General Preparation Instructions)

A reaction vessel with stirrer was charged with an aqueous emulsifier solution (initial charge). The components of this solution are indicated in Table 1. This initial charge was admixed over 2 minutes with a solution of the respective dye in the monomers to be polymerized (monomer/dye solution). The components of this solution are indicated in Table 1. The mixture was subsequently stirred for 10 minutes more. The resultant, conventional, dye-comprising monomer emulsion was subsequently homogenized as follows, using ultrasound, to give an aqueous monomer microemulsion:

The ultrasound source used was a Branson Sonifier II 450. 1 liter of each aqueous macroemulsion was sonicated with stirring for 5 minutes at the setting duty cycle 25%, output control 10, and for 10 minutes at duty cycle 100% and output control 10. This resulted in aqueous, dye-comprising miniemulsions. The droplet sizes of these miniemulsions ($\bar{d}_z$) are indicated in Table 2.

IV. Preparation of the Polymer Dispersions of the Invention

The miniemulsions obtainable in accordance with III were introduced into a polymerization vessel and heated to 85° C. They were then admixed all at once, with stirring, with a solution of sodium peroxodisulfate in water (initiator solution). The composition of the initiator solution is indicated in Table 1. Following the end of the addition of initiator, the batches were left to react at 80–85° C. with stirring for 2.5 hours and then cooled to 25° C. The properties of the aqueous polymer dispersions thus obtained, and the color properties of the colored polymer powders obtained from them by freeze drying, are summarized in Table 2.

TABLE 1

| | Initial charge | | Monomer/dye solution | | | | | Initiator solution | |
|---|---|---|---|---|---|---|---|---|---|
| Ex. | $H_2O$ (g) | Emulsifier Type[1]/(g) | Dye No./(g) | SA[2] (g) | S[3] (g) | MMA[4] (g) | Crosslinker Type[5]/(g) | $H_2O$ (g) | SPS[6] (g) |
| 13 | 403 | A/4.0 | 1/1.0 | 5 | 95 | — | a/2 | 10 | 0.5 |
| 14 | 415 | A/4.0 | 1/1.0 | 5 | 95 | — | a/5 | 10 | 0.5 |
| 15 | 403 | A/4.0 | 2/1.0 | 5 | 95 | — | a/2 | 10 | 0.5 |
| 16 | 415 | A/4.0 | 2/1.0 | 5 | 95 | — | a/5 | 10 | 0.5 |
| 17 | 415 | A/4.0 | 2/2.0 | 5 | 95 | — | a/5 | 10 | 0.5 |
| 18 | 403 | A/4.0 | 2/1.0 | 5 | 95 | — | c/2 | 10 | 0.5 |
| 19 | 403 | A/4.0 | 3/1.0 | 5 | 95 | — | a/2 | 10 | 0.5 |
| 20 | 415 | A/4.0 | 3/1.0 | 5 | 95 | — | a/5 | 10 | 0.5 |
| 21 | 403 | A/4.0 | 3/1.0 | 5 | 95 | — | b/2 | 10 | 0.5 |
| 22 | 403 | A/4.0 | 3/1.0 | 5 | 95 | — | c/2 | 10 | 0.5 |
| 23 | 1162 | A/11.2 | 3/2.8 | 14 | 266 | — | a/14 | 28 | 1.4 |
| 24 | 1173 | A/11.2 | 3/5.6 | 14 | 266 | — | a/14 | 28 | 1.4 |
| 25 | 407 | A/4.0 | 3/1.0 | 5 | — | 95 | a/5 | 20 | 1.0 |
| 26 | 411 | B/2.0 | 3/1.0 | 5 | — | 95 | a/5 | 20 | 1.0 |
| 27 | 411 | C/2.1 | 3/1.0 | 5 | — | 95 | a/5 | 20 | 1.0 |
| 28 | 977 | A/9.6 | 3/2.4 | 12 | — | 228 | a/12 | 48 | 2.4 |
| 29 | 616.5 | A/6.0 | 3/3.0 | 7.5 | — | 142.5 | a/7.5 | 30 | 1.5 |
| 30 | 1153 | A/11.2 | 4/0.56 | 14 | 266 | — | a/14 | 28 | 1.4 |
| 31 | 1156 | A/11.2 | 4/1.4 | 14 | 266 | — | a/14 | 28 | 1.4 |
| 32 | 788.5 | A/7.6 | 4/1.9 | 9.5 | 180.5 | — | a/9.5 | 19 | 0.95 |
| 33 | 419 | A/4.0 | 4/2.0 | 5 | 95 | — | a/5 | 10 | 0.5 |
| 34 | 610.5 | A/6.0 | 5/1.5 | 7.5 | — | 142.5 | a/7.5 | 30 | 1.5 |
| 35 | 616.5 | B/3.0 | 5/1.5 | 7.5 | — | 142.5 | a/7.5 | 30 | 1.5 |
| 36 | 616 | C/3.2 | 5/1.5 | 7.5 | — | 142.5 | a/7.5 | 30 | 1.5 |
| 37 | 610.5 | A/6.0 | 6/1.5 | 7.5 | — | 142.5 | a/7.5 | 30 | 1.5 |
| 38 | 616.5 | B/3.0 | 6/1.5 | 7.5 | — | 142.5 | a/7.5 | 30 | 1.5 |
| 39 | 616 | C/3.2 | 6/1.5 | 7.5 | — | 142.5 | a/7.5 | 30 | 1.5 |
| 40 | 610.5 | A/6.0 | 7/1.5 | 7.5 | — | 142.5 | a/7.5 | 30 | 1.5 |
| 41 | 616.5 | B/3.0 | 7/1.5 | 7.5 | — | 142.5 | a/7.5 | 30 | 1.5 |
| 42 | 616 | C/3.2 | 7/1.5 | 7.5 | — | 142.5 | a/7.5 | 30 | 1.5 |
| 43 | 415 | A/4.0 | 8/1.0 | 5 | 95 | — | a/5 | 14 | 1.5 |
| 44 | 415 | A/4.0 | 8/1.0 | 5 | 95 | — | a/5 | 20 | 3.0 |
| 45 | 419 | A/4.0 | 8/2.0 | 5 | 95 | — | a/5 | 14 | 1.5 |
| 46 | 423 | A/4.0 | 8/3.0 | 5 | 95 | — | a/5 | 14 | 1.5 |
| 47 | 427 | A/4.0 | 8/4.0 | 5 | 95 | — | a/5 | 14 | 1.5 |
| 48 | 431 | A/4.0 | 8/5.0 | 5 | 95 | — | a/5 | 14 | 1.5 |
| 49 | 1174 | A/11.4 | 9/0.6 | 14.25 | 271 | — | a/14.25 | 28.5 | 1.4 |
| 50 | 1156 | A/11.2 | 9/1.4 | 14 | 266 | — | a/14 | 28 | 1.4 |
| 51 | 400 | A/4.0 | 10/0.25 | 5 | 95 | — | a/2 | 10 | 0.5 |
| 52 | 415 | A/4.0 | 11/1.0 | 5 | 95 | — | a/5 | 10 | 0.5 |
| 53 | 400 | A/4.0 | 12a/0.2 | 5 | 95 | — | a/2 | 10 | 0.5 |
| 54 | 400 | A/4.0 | 12b/0.2 | 5 | 95 | — | a/2 | 10 | 0.5 |
| 55 | 391 | A/4.0 | 13/0.05 | 5 | 95 | — | — | 10 | 0.5 |
| 56 | 391 | A/4.0 | 14/0.05 | 5 | 95 | — | — | 10 | 0.5 |
| 57 | 327 | A/3.3 | 15a/0.82 | 4.1 | 77.4 | — | a/1.6 | 10 | 0.4 |
| 58 | 400 | A/4.0 | 15b/0.25 | 5 | 95 | — | a/2 | 10 | 0.5 |
| 59 | 401 | A/4.0 | 15b/0.5 | 5 | 95 | — | a/2 | 10 | 1.0 |
| 60 | 400 | A/4.0 | 16/0.25 | 5 | 95 | — | a/2 | 10 | 0.5 |
| 61 | 400 | A/4.0 | 17a/0.2 | 5 | 95 | — | a/2 | 10 | 0.5 |
| 62 | 400 | A/4.0 | 17b/0.2 | 5 | 95 | — | a/2 | 10 | 0.5 |
| 63 | 445.5 | A/4.4 | 18/0.55 | 5.5 | — | 104.5 | a/5.5 | 22 | 1.1 |

[1] Emulsifier A: 15% strength by weight aqueous sodium lauryl sulfate solution; emulsifier B: 2-sulfosuccinic acid bis(2'-ethylhexyl) ester sodium salt (50% strength by weight aqueous solution); C: 1:1 mixture of emulsifier B (50% strength by weight) and Dowfax ® 2A1 (from DOW, 45% strength by weight)
[2] SA: stearyl acrylate
[3] S: styrene
[4] MMA: methyl methacrylate
[5] a: butane-1,4-diol diacrylate; b: 1,4-divinylbenzene; c: methacryloxypropyltrimethoxysilane
[6] SPS: sodium peroxodisulfate

TABLE 2

| | Properties of the monomer | Properties of the polymer dispersion IV[8] | | | | Color properties of the (dry) polymer dispersion IV | |
|---|---|---|---|---|---|---|---|
| Ex. | emulsion III[7] $d_z^{ME}$ (nm) | SC (%) | pH | LT (%) | $d_z^{PE}$ (nm) | Shade[9] (monomer/aggregate band) | Fluorescence[10] (intensity) |
| 13 | 131 | 18.0 | 2.4 | n.d. | 138 | yellow-brown (A) | none |
| 14 | 154 | 19.1 | 2.4 | n.d. | 152 | yellow (M) | green-yellow (w) |
| 15 | 158 | 15.2 | 2.4 | n.d. | 173 | orange (M) | orange (w) |

TABLE 2-continued

| | Properties of the monomer emulsion III[7] | Properties of the polymer dispersion IV[8] | | | | Color properties of the (dry) polymer dispersion IV | |
|---|---|---|---|---|---|---|---|
| Ex. | $d_z^{ME}$ (nm) | SC (%) | pH | LT (%) | $d_z^{PE}$ (nm) | Shade[9] (monomer/aggregate band) | Fluorescence[10] (intensity) |
| 16 | 132 | 18.9 | 2.4 | 58 | 141 | orange (M) | orange (s) |
| 17 | 126 | 19.2 | 2.4 | 73 | 110 | orange (M) | orange (s) |
| 18 | 144 | 19.3 | 2.4 | 56 | 144 | orange (M) | orange (s) |
| 19 | 147 | 20.0 | n.d. | n.d. | 142 | bluish red (M) | magenta (s) |
| 20 | 168 | 19.0 | 2.4 | n.d. | 177 | bluish red (M) | magenta (s) |
| 21 | 137 | 17.6 | 2.4 | n.d. | 152 | bluish red (M) | magenta (s) |
| 22 | 111 | 19.0 | 2.4 | n.d. | 117 | bluish red (M) | magenta (s) |
| 23 | 125 | 19.7 | 2.2 | 67 | 125 | bluish red (M) | magenta (s) |
| 24 | 146 | 19.7 | 2.2 | n.d. | 134 | bluish red (M) | magenta (s) |
| 25 | 95 | 20.0 | 2.4 | 87 | 106 | bluish red (M) | magenta (s) |
| 26 | 108 | 20.0 | 2.5 | 87 | 106 | bluish red (M) | magenta (s) |
| 27 | 103 | 20.0 | 2.4 | 87 | 104 | bluish red (M) | magenta (s) |
| 28 | 86 | 19.9 | 2.3 | n.d. | 112 | bluish red (M) | magenta (s) |
| 29 | 98 | 19.9 | 2.4 | n.d. | 107 | bluish red (M) | magenta (s) |
| 30 | 142 | 19.7 | 2.2 | n.d. | 140 | colorless (M) | violet (s) |
| 31 | 159 | 19.4 | 2.2 | n.d. | 155 | colorless (M) | violet (s) |
| 32 | 166 | 19.6 | 2.2 | n.d. | 147 | colorless (M) | violet (s) |
| 33 | 172 | 19.2 | 2.3 | 60 | 134 | pale yellow (A) | violet (m) |
| 34 | 122 | 20.0 | 2.4 | n.d. | 138 | yellow (M) | — |
| 35 | 120 | 20.0 | 2.4 | n.d. | 131 | yellow (M) | — |
| 36 | 131 | 20.0 | 2.4 | n.d. | 142 | yellow (M) | — |
| 37 | 107 | 20.0 | 2.4 | n.d. | 145 | reddish blue (M) | — |
| 38 | 104 | 20.0 | 2.5 | n.d. | 120 | reddish blue (M) | — |
| 39 | 118 | 20.0 | 2.4 | n.d. | 110 | reddish blue (M) | — |
| 40 | 137 | 20.0 | 2.3 | n.d. | 125 | greenish blue (M) | — |
| 41 | 168 | 20.0 | 2.4 | n.d. | 119 | greenish blue (M) | — |
| 42 | 125 | 20.0 | 2.3 | n.d. | 121 | greenish blue (M) | — |
| 43 | 146 | 19.3 | 2.2 | 28 | 199 | dirty brown (M) | — |
| 44 | 130 | 19.7 | 1.9 | 36 | 182 | dirty brown (M) | — |
| 45 | 142 | 19.6 | 2.4 | 32 | 193 | dirty brown (M) | — |
| 46 | 130 | 19.9 | 2.8 | 29 | 201 | dirty brown (M) | — |
| 47 | 142 | 19.7 | 4.6 | n.d. | 194 | dirty brown (M) | — |
| 48 | 147 | 19.7 | 6.7 | n.d. | 201 | dirty brown (M) | — |
| 49 | 155 | 19.7 | 2.2 | n.d. | 142 | colorless (M) | violet (s) |
| 50 | 173 | 19.7 | 2.1 | n.d. | 143 | colorless (M) | violet (s) |
| 51 | 170 | 18.5 | 2.5 | n.d. | 134 | yellowish orange (M) | yellowish orange (s) |
| 52 | 147 | 18.6 | 2.2 | n.d. | 150 | red (M) | yellowish red (s) |
| 53 | 165 | 19.6 | n.d. | n.d. | 143 | yellow (M) | greenish yellow (s) |
| 54 | 158 | 19.8 | 2.4 | n.d. | 149 | yellow (M) | greenish yellow (s) |
| 55 | 139 | 18.7 | 2.4 | 56 | 147 | yellow (M) | greenish yellow (s) |
| 56 | 151 | 19.2 | 2.4 | 55 | 144 | yellowish orange (M) | yellowish orange (m) |
| 57 | 130 | 14.2 | n.d. | n.d. | 147 | yellow-brown (A) | yellowish orange (w) |
| 58 | 139 | 18.3 | 2.2 | n.d. | 139 | yellowish orange (M) | yellowish orange (s) |
| 59 | 171 | 19.3 | 2.3 | n.d. | 144 | yellowish orange (M) | yellowish orange (s) |
| 60 | 146 | 18.9 | 2.2 | n.d. | 138 | orange (M) | orange (s) |
| 61 | 176 | 19.5 | n.d. | n.d. | 138 | orange (M) | orange (s) |
| 62 | 166 | 19.6 | 2.3 | n.d. | 141 | orange (M) | yellowish orange (s) |
| 63 | 167 | 19.6 | 2.3 | n.d. | 124 | red (M) | red (s) |

[7]$d_z^{ME}$: average monomer droplet diameter
[8]SC: solids content (target: 20.0% by weight), LT: light transmittance, $d_z^{PE}$: average diameter of the polymer particles, n.d.: not determined
[9]determined visually, (M): absorption band of the molecularly disperse, i.e., non-aggregated dye; (A): absorption bands of higher dye aggregates
[10]determined visually on the coloration in plastic; (w): weak (about 0–30% of the fluorescence intensity of a solution of the corresponding dye with the same concentration of chromophore); (m): moderate (about 30–70% of the fluorescence intensity of a solution of the corresponding dye with the same concentration of chromophore); (s): strong (>70% of the fluorescence intensity of a solution of the corresponding dye with the saine concentration of chromophore)

V. Preparation of Redispersible, Dye-comprising Polymers (Examples 64 to 101)

1. Preparation by Batch Process (General Instructions):

1.1 Preparation of the Dye-comprising Miniemulsion

A reaction vessel with stirrer was charged with an aqueous emulsifier solution (initial charge). The components of this solution are indicated in Table 3. This initial charge was admixed over 2 minutes with a solution of the respective dye in the monomers to be polymerized (monomer/dye solution). The components of this solution are indicated in Table 3. The mixture was subsequently stirred for 10 minutes more. The resultant, conventional, dye-comprising monomer emulsions were subsequently homogenized as follows, using ultrasound, to give an aqueous monomer miniemulsion:

The ultrasound source used was the apparatus described in FIG. 4 of DE 197 56 874, equipped with a flow cell having a vessel diameter of 42 mm and a height of mm. The sonotrode had a diameter of 40 mm and an output of 1000 W. About 0.5 liter of each aqueous macroemulsion with a flow rate of 30 l/h was sonicated at an output of 1000 W, with stirring. This gave aqueous, dye-comprising miniemulsions. The droplet sizes of these miniemulsions ($\bar{d}_z$) are indicated in Table 5.

1.2 Polymerization of the Dye-comprising Miniemulsion

The resultant miniemulsion was charged to a polymerization vessel and heated to 85° C. Then the initiator solution (see Table 3) was added in one portion with stirring, and the mixture is left to react at 80–85° C. for 2.5 h and then cooled to 25° C. The properties of the resulting polymer dispersion are indicated in Table 5.

2. Preparation by Feed Process (General Instructions):

First of all, a miniemulsion was prepared in the manner described under V 1.1 from initial charge 1 and a monomer/dye solution. The composition of this miniemulsion is indicated in Table 4.

The resultant miniemulsion was transferred to a feed vessel. A polymerization vessel was charged with water and a portion of the initiator solution (IS) (initial charge 2; see Table 4). The initial charge 2 was heated to 85° C. and then, still at 85° C. and beginning at the same time, the dye-comprising miniemulsion and the aqueous initiator solution were added to the polymerization vessel over the course of 3 h. The properties of the dye-comprising polymer dispersions are indicated in Table 5.

In Tables 3 to 14 the following abbreviations are used:

AMPS: 2-acrylamido-2-methylpropanesulfonic acid sodium salt
AN: acrylonitrile
AA: acrylic acid
BA: n-butyl acrylate
BDDA: butanediol diacrylate
DVB: divinylbenzene
E: emulsifier
HD: hexadecane
IS: initiator solution
L370: Luviquat® FC 370
LA: lauryl acrylate
LH: Luviquat® Hold
MAA: methacrylic acid
MMA: methyl methacrylate
NaPS: sodium peroxodisulfate
PW: water-soluble polymer
S: styrene
SA: stearyl acrylate
T: Tamol® NN4501
V50: 2,2'-azobis(2-amidinopropane)dihydrochloride Luviquat® FC 370 is an approximately 40% strength by weight aqueous solution of a copolymer of vinylpyrrolidone and 1-vinyl-3-methylimidazolium chloride in a weight ratio of 7:3, having a K value (in accordance with Fikentscher; determined in a procedure based on DIN 53726 as a 1% strength by weight solution in 3% strength by weight aqueous NaCl solution) in the range from 41 to 49 (manufacturer: BASF AG, Ludwigshafen)

Luviquat® Hold is an approximately 20% strength by weight aqueous solution of a terpolymer of vinylcaprolactam, vinylpyrrolidone and 1-vinyl-3-methylimidazolium methylsulfonate in a weight ratio of 5:4:1, having a viscosity (by Brookfield LV; determined as a 1% strength by weight solution in a procedure based on DIN 53018) in the range from 1.5 to 4 (manufacturer: BASF AG, Ludwigshafen).

Tamol® NN 4501 is the pulverulent sodium salt of a low-molecular mass product of the condensation of formaldehyde with an isomer mixture of α- and β-naphthalenesulfonic acid, whose 45% strength by weight aqueous solution has an average viscosity (by Brookfield) of about 70 mpa·s (determined at 23° C.) (manufacturer: BASF AG, Ludwigshafen).

Unless specified otherwise, the emulsifier used was the bis-2-ethylhexyl ester of sulfosuccinic acid (as the sodium salt, in the form of a 60% strength by weight aqueous solution, (Lumiten® IRA from BASF AG).

TABLE 3

Preparation of dye-comprising dispersions by the batch method (Examples 64 to 78 of the invention)

| | Initial charge | | | Monomer/dye solution | | | | | | Initiator solution | |
|---|---|---|---|---|---|---|---|---|---|---|---|
| Ex. | H₂O [g] | Polymer PW/ Monomer AI; [g] | E [g] | Dye | Coemulsifier[4) [g] | S [g] | MMA [g] | DVB [g] | Monomer AI [g] | H₂O [g] | Initiator [g] |
| 64 | 448.6 | — | 2.4 | 5 g No. 3 | SA; 5 | — | 90 | 5 | AA; 5 | 19 | 1 NaPS |
| 65 | 450.9 | — | 0.6 | 5 g No. 5 | HD; 5 | — | 90 | 5 | MAA; 10 | 19 | 1 NaPS |
| 66 | 450.9 | — | 0.6 | 5 g No. 6 | LA; 5 | — | 85 | 5 | MAA; 10 | 19 | 1 NaPS |
| 67 | 460.7 | T; 11.1 | 1.2 | 5 g No. 6 | HD; 5 | — | 100 | 5 | — | 19 | 1 NaPS |
| 68 | 422.8 | LH; 25.0 | 1.2 | 5 g No. 3 | LA; 5 | — | 95 | 5 | — | 15.6 | 0.4 V50 |
| 69 | 412.1 | AMPS; 5.0 | 1.2 | 5 g No. 3 | HD; 5 | — | 100 | 5 | — | 15.6 | 0.4 V50 |
| 70 | 431.9 | L370; 4.88 | 1.2 | 5 g No. 6 | — | — | 90 | 5 | AA; 10 | 19 | 1 NaPS |
| 71 | 442.4 | L370; 12.2 | 2.4 | 5 g No. 6a | — | — | 100 | 5 | — | 15.6 | 0.4 V50 |
| 72 | 448.6 | — | 2.4 | 5 g No. 1 | SA; 5 | — | 90 | 5 | AA; 10 | 19 | 1 NaPS |
| 73 | 450.9 | — | 0.6 | 5 g No. 7 | HD; 5 | — | 90 | 5 | MAA; 10 | 19 | 1 NaPS |
| 74 | 429 | — | 2.0 | 10 g No. 6a | SA; 5 | 60 | 30 | 5 | MAA; 5 | 19 | 1 NaPS |
| 75 | 427.8 | — | 1.2 | 10 g No. 6 | SA; 5 | — | 90 | 5 | AA; 5 | 19 | 1 NaPS |
| 76 | 441.7 | T; 11.1 | 1.2 | 10 g No. 6 | SA; 5 | — | 95 | 5 | — | 19 | 1 NaPS |
| 77 | 427.8 | — | 1.2 | 10 g No. 5 | SA; 5 | — | 90 | 5 | AA; 5 | 19 | 1 NaPS |
| 78 | 419 | — | 2.0 | 10 g No. 6a | HD; 5 | 60 | 35 | 5 | AA; 5 | 57 | 3 NaPS |

TABLE 4

Preparation of dye-comprising dispersions by the feed technique (Examples 79 to 101 of the invention)

| | Initial charge 1 | | | Monomer/dye solution | | | | | | Initial charge 2 | | Initiator | |
|---|---|---|---|---|---|---|---|---|---|---|---|---|---|
| Ex. | $H_2O$ [g] | PW [g] | E [g] | Dye | Coemulsifier | S [g] | MMA [g] | DVB [g] | Monomer Al [g] | $H_2O$ [g] | IS [g] | $H_2O$ [g] | NaPS [g] |
| 79 | 133 | — | 2.4 | 5 g No. 3 | 5 g SA | — | 95 | 5 | 5 g AA | 100 | 4 | 39 | 1 |
| 80 | 121.6 | — | 2.4 | 5 g No. 6 | 5 g SA | — | 95 | 5 | 5 g AA | 100 | 4 | 39 | 1 |
| 81 | 120.4 | — | 0.6 | 5 g No. 5 | — | — | 90 | 5 | 10 g MAA | 100 | 4 | 39 | 1 |
| 82 | 132.1 | — | 0.6 | 5 g No. 6 | 5 g LA | — | 90 | 5 | 10 g MAA | 100 | 4 | 39 | 1 |
| 83 | 629 | — | 6 | 30 g No. 6a | 15 g HD | 180 | 105 | 15 | 15 g AA | 125 | 12 | 125 | |
| 84 | 254.9 | — | 4.8 | 10 g No. 3 | 10 g SA | — | 190 | 10 | 10 g MAA | 100 | 8 | 78 | 2 |
| 85 | 236.3 | — | 4.8 | 10 g No. 6 | 10 g SA | — | 180 | 10 | 10 g AA | 100 | 8 | 78 | 2 |
| 86 | 234.8 | — | 1.2 | 10 g No. 5 | — | — | 180 | 10 | 20 g MAA | 100 | 8 | 78 | 2 |
| 87 | 253.4 | — | 1.2 | 10 g No. 6 | 10 g LA | — | 180 | 10 | 20 g MAA | 100 | 8 | 78 | 2 |
| 88 | 240.1 | — | 4.8 | 10 g No. 3 | 10 g SA | — | 190 | 10 | 2 g AA | 100 | 8 | 78 | 2 |
| 89 | 261.4 | 22.2; T | 2.4 | 20 g No. 6 | 10 g SA | — | 190 | 10 | — | 100 | 8 | 78 | 2 |
| 90 | 273.6 | — | 2.4 | 20 g No. 6 | 10 g HD | — | 190 | 10 | 10 g MAA | 100 | 8 | 78 | 2 |
| 91 | 255 | — | 2.4 | 20 g No. 5 | 10 g SA | — | 180 | 10 | 10 g MAA | 100 | 8 | 78 | 2 |
| 92 | 223.3 | — | 2.4 | 10 g No. 3 | 10 g SA | — | 180 | 10 | 10 g AA | 100 | 8 | 78 | 2 |
| 93 | 223.3 | — | 4.8 | 10 g No. 3 | 10 g SA | — | 180 | 10 | 10 g AA | 100 | 8 | 78 | 2 |
| 94 | 223.3 | — | 4.8 | 10 g No. 6 | 10 g SA | — | 180 | 10 | 10 g AA | 100 | 8 | 78 | 2 |
| 95 | 222.7 | — | 1.2 | 10 g No. 5 | — | — | 180 | 10 | 20 g MAA | 100 | 8 | 78 | 2 |
| 96 | 236.9 | — | 4.8 | 10 g No. 3 | 10 g HD | — | 190 | 10 | 10 g AA | 100 | 8 | 78 | 2 |
| 97 | 236.2 | — | 1.2 | 10 g No. 6 | 10 g LA | — | 180 | 10 | 20 g MAA | 100 | 8 | 78 | 2 |
| 98 | 235 | 22.2; T | 2.4 | 20 g No. 6 | 10 g SA | — | 190 | 10 | — | 100 | 8 | 78 | 2 |
| 99 | 250 | — | 2.4 | 20 g No. 6 | 10 g HD | — | 190 | 10 | 10 g MAA | 100 | 8 | 78 | 2 |
| 100 | 236.4 | — | 2.4 | 20 g No. 5 | 10 g SA | — | 180 | 10 | 10 g MAA | 100 | 8 | 78 | 2 |
| 101 | 259.7 | — | 4 | 20 g No. 6a | 10 g HD | 120 | 70 | 10 | 10 g AA | 100 | 8 | 74 | 6 |

TABLE 5

Properties of the dye-comprising polymer dispersions (Examples 64 to 101 of the invention)

| Ex.No. | Solids content [% by wt.] | Droplet size emulsion $d_z$ | Particle size dispersion $d_z$ | Surface tension [mN/m] |
|---|---|---|---|---|
| 64 | 19.2 | 137 | 142 | 37.3 |
| 65 | 19.3 | 201 | 317 | 39.6 |
| 66 | 19.7 | 178 | 297 | 40.8 |
| 67 | 19.3 | 120 | 201 | 42.8 |
| 68 | 19.4 | 211 | 411 | 36.9 |
| 69 | 19.3 | 205 | 386 | 37.7 |
| 70 | 19.5 | 210 | 430 | 36.8 |
| 71 | 19.1 | 196 | 481 | 36.6 |
| 72 | 19.4 | 128 | 172 | 37.9 |
| 73 | 19.6 | 160 | 182 | 38.2 |
| 74 | 19.2 | 177 | 136 | 44.4 |
| 75 | 19.9 | 105 | 179 | 41.2 |
| 76 | 19.8 | 143 | 168 | 40.7 |
| 77 | 20 | 188 | 184 | 39.8 |
| 78 | 19.2 | 167 | 171 | 38.1 |
| 79 | 29.3 | 124 | 185 | 31.9 |
| 80 | 28.9 | 130 | 167 | 32.6 |
| 81 | 28.7 | 253 | 301 | 36.5 |
| 82 | 29.2 | 192 | 322 | 38.6 |
| 83 | 28.3 | 183 | 255 | 33.6 |
| 84 | 34.7 | 121 | 190 | 32.4 |
| 85 | 35 | 112 | 258 | 31.4 |
| 86 | 34.4 | 235 | 373 | 35.8 |
| 87 | 34.8 | 201 | 370 | 36.3 |
| 88 | 34.9 | 131 | 195 | 35.7 |
| 89 | 34.4 | 141 | 205 | 39.9 |
| 90 | 34.5 | 104 | 281 | 38.7 |
| 91 | 34.7 | 185 | 251 | 37.1 |
| 92 | 42.3 | 125 | 130 | 38.2 |
| 93 | 42.5 | 134 | 217 | 37.6 |
| 94 | 42.1 | 156 | 199 | 41.8 |
| 95 | 42.5 | 118 | 151 | 40.3 |
| 96 | 42.4 | 205 | 220 | 38.9 |
| 97 | 41.9 | 217 | 228 | 35.9 |
| 98 | 42.2 | 204 | 210 | 36.1 |
| 99 | 42.5 | 195 | 219 | 36.9 |
| 100 | 42.4 | 138 | 140 | 39.2 |
| 101 | 42.2 | 157 | 182 | 38.5 |

VI. Performance Testing of the Dispersions From Examples 64 to 101

1. Redispersibility:

The redispersibility of the dye-comprising polymers of the invention was determined by placing one drop of a sample of the respective dye-comprising polymer dispersion, adjusted to a solids content of 20% by weight, in a Petri dish and leaving it to dry overnight. Then three drops of water were applied to the dried polymer in the Petri dish, which was shaken gently in order to redisperse the polymer. The degree of redispersion was assessed visually as follows: 1=complete redispersion, 2=almost complete redispersion, 3=about 50% redispersion, 4=partial redispersion; 5 no observable redispersion.

All of the dispersions of Examples 64 to 101 showed a degree of redispersibility of 1.

2. Printing Quality:

2.1 Preparation of an ink formulation: the pure dispersions of Examples 64 to 101 were adjusted to a pH of 7 using triethanolamine. Printability was tested both on the neutralized dispersions and on formulations comprising 9 parts by weight of neutralized dispersion and 1 part by weight of butyltriglycol.

2.2 Determination of Print Quality:

The ink formulations of the invention under 2.1 were printed in a commercial inkjet printer from Epson (Stylus Color 500) on both commercial paper for laser printers (80 g/m$^2$; Intercopy) and specialty paper for high-resolution inkjet printing (paper for 720 dpi printing; Epson). The test print pattern used was a chessboard pattern (full-color/unprinted: 1×1 cm).

To test the rubfastness of the prints, printed and unprinted areas were run over a number of times under gentle finger pressure for 10 s, using circular motions. No print smearing was given the rating 1, and severe smearing the rating 6.

The wet rubfastness was tested similarly except that the print was rinsed with DI water before rubbing. No bleeding/smearing of the print was given the rating 1, and severe bleeding/smearing the rating 6.

Rubfastness and wet rubfastness of the prints obtained with neutralized dispersions of Examples 64 to 101, and the prints obtained with the corresponding solventborne inks, were evaluated throughout as having the rating 1.

VII. Preparation of Dye-comprising Polymer Dispersions of the Invention (Examples 102 to 118)

1. A reaction vessel with stirrer was charged, based on 100 parts by weight of principal monomers, with from about 430 to 450 parts by weight of water, 0.6 part by weight of sodium dodecyl sulfate, and the water-soluble polymer PW specified in Table 6. To this solution there was added over the course of 2 minutes a solution of the respective dye in the monomers to be polymerized (monomer/dye solution). The components of this solution are indicated in Table 6. The solution was subsequently stirred for a further 10 minutes. The resultant, conventional, dye-comprising monomer emulsions were subsequently homogenized by means of ultrasound in the manner described under III.

The resultant miniemulsions were charged to a polymerization vessel and heated to 85° C. 10 parts by weight, based on 100 parts by weight of monomers, of a 10% strength by weight solution of sodium peroxodisulfate in water (initiator solution) were added all at once with stirring. After the end of addition of initiator, the batch was left to react at 80–85° C. with stirring for 3.5 hours and then cooled to 25° C. The properties of the resultant aqueous polymer dispersions are summarized in Table 7.

2. Polymers PW:

Type A is the ammonium salt of a copolymer of maleic acid and 2,4,4-trimethylpent-1-ene obtained by ammoniacal hydrolysis of a copolymer of maleic anhydride and 2,4,4-trimethylpent-1-ene. Latter copolymer is obtainable in accordance with Example 3 of EP-A 9169. Instead of isolating the unhydrolyzed copolymer by spray drying as in Example 3 of EP-A 9169, 325 parts of water are added to the suspension and excess diisobutene is distilled off by steam distillation (bath temperature 80° C.). When an internal temperature of 98° C. is reached, steam is passed in for a further 1 h. Following the addition of a further 200 parts of water and 170 parts of 25% strength by weight ammonia, the mixture is stirred at 60° C. until a virtually clear aqueous solution is obtained (about 1 h). The solids content is then adjusted to 22% using water. The pH of the solution is 9. The K value of the copolymer (determined in accordance with Fikentscher as a 1% strength by weight solution in dimethylformamide) is in the range of 30–40.

Type B is the sodium salt of a copolymer of maleic acid and 2,4,4-trimethylpent-1-ene obtained by hydrolysis of a copolymer of maleic anhydride and 2,4,4-trimethylpent-1-ene. Latter copolymer is obtainable in accordance with Example 3 of EP-A 9169. Instead of isolating the unhydrolyzed copolymer by spray drying as in Example 3 of EP-A 9169, 325 parts of water are added to the suspension and excess diisobutene is distilled off by steam distillation (bath temperature 80° C.). When an internal temperature of 98° C. is reached, steam is passed in for a further 1 h. Following the addition of a further 220 parts of water and 200 parts of 50% strength by weight sodium hydroxide solution, the mixture is stirred at 100° C. until a virtually clear aqueous solution is obtained (about 4 h). The solids content is then adjusted to 25% using water. The pH of the solution is 10. The K value of the copolymer (determined in accordance with Fikentscher as a 1% strength by weight solution in dimethylformamide) is in the range of 30–40.

Type C is a 44% strength by weight aqueous solution of a reaction product obtainable by reacting 420 parts by weight of a copolymer comprising 54% by weight maleic anhydride and 46% by weight 2,4,4-trimethylpent-1-ene with 261 parts by weight of $C_{13/15}$-alkyloxyheptaethylene oxide, and subsequently neutralizing the unesterified acid groups with sodium hydroxide in accordance with Example 7 of EP-A 367 049. The pH of the solution is approximately 7.5. The K value of the copolymer (determined in accordance with Fikentscher on a 1% strength solution of the polymer in cyclohexanone) is in the range from 14 to 18.

TABLE 6

| | | | | Starting materials | | | |
| | Polymer | | | | Principal monomers | | BDDA |
| Ex. | PW | [%][1] | Dye | [%][1] | MMA % | S % | SA % | [%][1] |
|---|---|---|---|---|---|---|---|---|
| 102 | Type A | 11.5 | 4 | 1 | 95 | — | 5 | 5 |
| 103 | Type A | 16.1 | 4 | 1 | 95 | — | 5 | 5 |
| 104 | Type A | 16.2 | 4 | 10 | 95 | — | 5 | 10 |
| 105 | Type B | 2.5 | 4 | 1 | 95 | — | 5 | 5 |
| 106 | Type B | 5.0 | 4 | 1 | 95 | — | 5 | 5 |
| 107 | Type A | 16.1 | 6a | 3 | 85 | 10 | 5 | 10 |
| 108 | Type A | 14.0 | 6a | 1 | 95 | — | 5 | 10 |
| 109 | Type A | 16.5 | 3 | 7.5 | 95 | — | 15 | 10 |
| 110 | Type A | 14.4 | 6 | 4 | 95 | — | 5 | 10 |
| 111 | Type A | 16.5 | 6 | 10 | 95 | — | 5 | 10 |
| 112 | Type A | 15.1 | 7 | 10 | 95 | — | 5 | 10 |
| 113 | Type C | 41.7 | 7 | 30 | 95 | — | 5 | 10 |
| 114 | Type C | 49.0 | 4 | 1 | 95 | — | 5 | 5 |
| 114 | — | — | 4 | 1 | 95 | — | 5 | 5 |
| 115 | — | — | 4 | 2 | 95 | — | 5 | 5 |
| 116 | — | — | 6a | 3 | 85 | 10 | 5 | 10 |
| 117 | — | — | 6 | 1 | 95 | — | 5 | 5 |

[1] All percentages indicate the proportion by weight of the respective active substance, based on the total weight of the principal monomers.

VIII. Performance Testing of the Dispersions of Examples 102 to 118

1. The redispersibility, indicated in Table 7, of the dispersions of Examples 102 to 118 was determined in the manner described under VI 1.

TABLE 7

Properties of the dispersions of Examples 102 to 118

| Ex. | LT [%] | Solids content [%] | Surface tension [N/m] | Redispersibility |
|---|---|---|---|---|
| 102 | 95.1 | 19.1 | 45.0 | 2 |
| 103 | 94.9 | 19.3 | 41.7 | 1 |
| 104 | 93.0 | 20.1 | 43.9 | 1 |
| 105 | 87.1 | 19.6 | 48.1 | 2 |

TABLE 7-continued

Properties of the dispersions of Examples 102 to 118

| Ex. | LT [%] | Solids content [%] | Surface tension [N/m] | Redispersibility |
|---|---|---|---|---|
| 106 | 92.5 | 16.8 | 46.3 | 1 |
| 107 | 89.0 | 18.3 | 42.3 | 1 |
| 108 | 92.5 | 19.3 | 45.1 | 2 |
| 109 | 62.4 | 19.2 | 45.5 | 2 |
| 110 | 96.0 | 19.3 | 44.5 | 2 |
| 111 | 95.6 | 18.0 | 42.6 | 1 |
| 112 | 90.7 | 18.8 | 39.3 | 2 |
| 113 | 89.0 | 18.3 | 35.5 | 3 |
| 114 | 99.0 | 19.0 | 36.7 | 3 |
| 115 | 88.6 | 19.7 | 59.0 | 5 |
| 116 | 88.4 | 19.5 | 57.7 | 5 |
| 117 | 82.9 | 18.9 | 56.7 | 5 |
| 118 | n.d. | 20.1 | n.d. | 5 |

2. The redispersibility of polymer dispersions prepared in the absence of a polymer PW was examined in the manner described under VI 1. before and after the addition of an aqueous solution of polymer PW. Table 8 summarizes the results of this investigation.

TABLE 8

Redispersibility of polymer dispersions prepared in the absence of a polymer PW (Experiments R1 to R11)

| Exp. No. | Dispersion Ex. | Polymer PW | % by wt.[1] | Redispersibility before | after |
|---|---|---|---|---|---|
| R1 | 115 | Type A | 24.3 | 5 | 3 |
| R2 | 116 | Type A | 25.0 | 5 | 3 |
| R3 | 116 | Type A | 45.0 | 5 | 2 |
| R4 | 116 | Type C | 30.0 | 5 | 3 |
| R5 | 116 | Type C | 50.0 | 5 | 2 |
| R6 | 116 | Type B | 5.0 | 5 | 2 |
| R7 | 116 | Type B | 10.0 | 5 | 1 |
| R8 | 117 | Type A | 19.8 | 5 | 3 |
| R9 | 117 | Type C | 36.2 | 5 | 3 |
| R10 | 117 | Type C | 46.9 | 5 | 2 |
| R11 | 118 | Type C | 31.6 | 5 | 3 |

[1]Proportion by weight of active substance, based on the solid, dye-comprising polymer.

3. Investigation of the Dispersibility of Freeze-dried Dye-comprising Polymer Dispersions (Experiments R12 to R15)

a) Dispersions With Polymer PW

The dispersions of Examples 104, 108 and 118 of the invention, and also the dispersion of Example 115 following the addition of polymer PW of type B, were freeze-dried with cooling in a dry-ice/acetone bath, with application of reduced pressure. The resultant powders were mixed thoroughly for one day with four times the amount of water. All of the powders were fully dispersible. Table 9 also indicates the redispersibility of the dried dispersion prior to freeze drying and that of the dispersion obtained from the freeze-dried powder (in each case determined in accordance with the procedure described under VI.1).

TABLE 9

| Exp. No. | Dispersion Ex. | Polymer PW | [%][1] | Dispersibility of powder | Redispersibility before | after |
|---|---|---|---|---|---|---|
| R12 | 104 | Type A | 16.1 | + | 1 | 1 |
| R13 | 105 | Type A | 14.0 | + | 2 | 1 |
| R14 | 115 | Type C | 49.0 | + | 3 | 5 |
| R15 | 116 | Type B | 14.6[2] | + | 1 | 1 |

[1]Proportion by weight of active substance based on the solid, dye-comprising polymer.
[2]Polymer PW was added to the finished dispersion from Example 115.

b) Dispersions Without Polymer PW

The dispersion of Example 115 of the invention was freeze-dried in accordance with the procedure described under a). The resultant powder was mixed thoroughly for one day with four times the amount of water and with the amount of the polymer PW (as an aqueous solution) stated in Table 10. All of the powders were completely dispersible. Table 10 also indicates the redispersibility of the dispersions obtained from the freeze-dried powder (determined in accordance with the procedure described under VI 1.).

TABLE 10

| Exp. No. | Dispersion Ex. | Polymer PW | [%][1] | Dispersibility of the powder | Redispersibility |
|---|---|---|---|---|---|
| R16 | 115 | Type A | 20.0 | +[2] | 3 |
| R17 | 115 | Type C | 40.0 | + | 1 |
| R18 | 115 | Type C | 50.0 | + | 1 |
| R19 | 115 | Type B | 5.0 | + | 1 |
| R20 | 115 | Type B | 10.0 | + | 1 |

[1]Proportion by weight of active substance based on the solid, dye-comprising polymer.
[2]+ : complete dispersibility; no visible powder particles.

IX. Preparation of Dye-comprising Aqueous Polymer Dispersions Having a High Dye Content (Examples 119 to 122)

The dye-comprising dispersions of Examples 119 to 122 were prepared in analogy to the manner described in VII 1. The starting materials are indicated in Table 11.

The respective miniemulsions were charged to a polymerization vessel and heated to 85° C. The intiator was added all at once, with stirring, then the batch was left to react at 80–85° C. with stirring for 3.5 hours, after which it was cooled to 25° C. The properties of the resultant aqueous polymer dispersions are summarized in Table 12. No notable amounts of coagulum were formed during polymerization with any of the samples.

TABLE 11

| Ex. | Polymer PW | | Dye [%][1] | Principal monomers | | BDDA [%][1] | Initiator[3] |
|---|---|---|---|---|---|---|---|
| | | [%][1] | | MMA % | SA % | | |
| 119 | Type A | 18 | 6b[2] | 15 | 95 | 5 | 10 | A1 |
| 120 | Type C | 18 | 7a | 30 | 95 | 5 | 10 | A1 |

TABLE 11-continued

| Ex. | Polymer PW [%]¹⁾ | Dye [%]¹⁾ | Principal monomers MMA % | SA % | BDDA [%]¹⁾ | Initiator³⁾ |
|---|---|---|---|---|---|---|
| 121 | Type C 18 | 7a | 35 | 95 | 5 | 10 | A2 |
| 122 | Type C 18 | 7a | 35 | 95 | 5 | 10 | A3 |

¹⁾All percentages indicate the proportion by weight of the respective active substance based on the total weight of the principal monomers.
²⁾Dye was dissolved in the monomers together with 1 part by weight of oleic acid (per 100 parts by weight of dye).
³⁾A1 1% by weight hydrogen peroxide, 0.15% by weight, based on 100% by weight principal monomers, hydroxymethanesulfinate sodium salt.
A2 0.3% by weight hydrogen peroxide, 0.3% by weight, based on 100% by weight principal monomers, hydroxymethanesulfinate sodium salt.
A3 0.3% by weight hydrogen peroxide, 0.3% by weight, based on 100% by weight principal monomers, ascorbic acid.

TABLE 12

| Ex. | LT [%] | Solids content [%] | Surface tension [mN/m] |
|---|---|---|---|
| 119 | 87.5 | 16.5 | 35.0 |
| 120 | 92.5 | 19.0 | 37.4 |
| 121 | 91.5 | 19.5 | 36.1 |
| 122 | 93.0 | 19.1 | 38.1 |

X. Preparation of Aqueous Polymer Dispersions With Optical Brighteners

Optical Brighteners:

Type 1: N-(2-pentyl)-4,5-bismethoxynaphthalene-1,8-dicarboximide;

Type 2: o,o-dicyanobisstyrylbenzene=1,4-bis(4'-cyanostyryl)benzene;

Type 3: 1,4-bis(4'-methoxycarbonylstyryl)benzene;

Type 4: 1-(4'-methoxycarbonylstyryl)-4-(4"-cyanostyryl)benzene.

1. Examples 123 to 148

A reaction vessel with stirrer was charged with a solution of sodium lauryl sulfate in water (initial charge; for amounts used see Table 13). A solution of the respective optical brightener in the monomers to be polymerized (monomer/brightener solution) was added over the course of 2 minutes. The components of this solution are indicated in Table 13. Subsequently, the mixture was stirred for 10 minutes more. The resultant, conventional monomer emulsion was subsequently homogenized in the manner described under V 1.1 and then polymerized. The initiator employed was a solution of 0.5 g of sodium peroxodisulfate in water. The properties of the miniemulsions and of the resultant polymer dispersions are indicated in Table 14.

TABLE 13

| | Initial charge | | Monomer/optical brightener solution | | | | |
|---|---|---|---|---|---|---|---|
| Ex. | H₂O [g] | Emulsifier [g] | opt. brightener [g] | SA [g] | Monomer A | [g] | Cross-linker¹⁾ [g] |
| 123 | 413 | 4.0 | Type 1 0.5 | 5 | MMA | 95 | a/5 |
| 124 | 411 | 4.0 | Type 1 0.02 | 5 | MMA | 95 | a/5 |
| 125 | 411 | 4.0 | Type 1 0.1 | 5 | MMA | 95 | a/5 |
| 126 | 413 | 4.0 | Type 2 0.5 | 5 | MMA | 95 | a/5 |
| 127 | 411 | 4.0 | Type 2 0.1 | 5 | MMA | 95 | a/5 |
| 128 | 411 | 4.0 | Type 2 0.02 | 5 | MMA | 95 | a/5 |
| 129 | 410 | 6.7 | Type 1 0.01 | 5 | MMA | 95 | b/5 |
| 130 | 410 | 6.7 | Type 1 0.05 | 5 | MMA | 95 | b/5 |
| 131 | 410 | 6.7 | Type 1 0.1 | 5 | MMA | 95 | b/5 |
| 132 | 412 | 6.7 | Type 1 0.5 | 5 | MMA | 95 | b/5 |
| 133 | 414 | 6.7 | Type 1 1 | 5 | MMA | 95 | b/5 |
| 134 | 418 | 6.7 | Type 1 2 | 5 | MMA | 95 | b/5 |
| 135 | 430 | 6.7 | Type 1 5 | 5 | MMA | 95 | b/5 |
| 136 | 410 | 6.7 | Type 1 0.01 | 5 | BA | 95 | b/5 |
| 137 | 410 | 6.7 | Type 1 0.05 | 5 | BA | 95 | b/5 |
| 138 | 410 | 6.7 | Type 1 0.1 | 5 | BA | 95 | b/5 |
| 139 | 412 | 6.7 | Type 1 0.5 | 5 | BA | 95 | b/5 |
| 140 | 414 | 6.7 | Type 1 1 | 5 | BA | 95 | b/5 |
| 141 | 418 | 6.7 | Type 1 2 | 5 | BA | 95 | b/5 |
| 142 | 410 | 6.7 | Type 1 0.01 | 5 | S | 95 | b/5 |
| 143 | 410 | 6.7 | Type 1 0.05 | 5 | S | 95 | b/5 |
| 144 | 410 | 6.7 | Type 1 0.1 | 5 | S | 95 | b/5 |
| 145 | 412 | 6.7 | Type 1 0.5 | 5 | S | 95 | b/5 |
| 146 | 414 | 6.7 | Type 1 1 | 5 | S | 95 | b/5 |
| 147 | 418 | 6.7 | Type 1 2 | 5 | S | 95 | b/5 |
| 148 | 430 | 6.7 | Type 1 5 | 5 | S | 95 | b/5 |

¹⁾a butanediol diacrylate; b divinylbenzene

2. Examples 149 to 158

A reaction vessel with stirrer was charged with a solution of bis(2-ethylhexyl) sulfosuccinate sodium salt (Lumiten® IRA from BASF) in water (initial charge; for amounts used see Table 13a). A solution of the respective optical brightener in the monomers to be polymerized (monomer/brightener solution) was added over the course of 2 minutes. The components of this solution are indicated in Table 13a. Subsequently, the mixture was stirred for 10 minutes more. The resultant, conventional monomer emulsion was subsequently homogenized in the manner described under V 1.1 and then polymerized. The initiator employed was a solution of 1 g of sodium peroxodisulfate in 19 ml of water. The properties of the miniemulsions and of the resultant polymer dispersions are indicated in Table 14.

TABLE 13a

| | Initial charge | | Monomer/optical brightener solution | | | | | |
|---|---|---|---|---|---|---|---|---|
| Ex. | H₂O [g] | E [g] | opt. brightener/[g] | SA [g] | S [g] | MA [g] | AN [g] | BA [g] |
| 149 | 387.8 | 1 | Type 2/0.25 | 5 | 47.5 | 47.5 | — | — |
| 150 | 387.8 | 1 | Type 2/0.25 | 5 | 85 | — | 10 | — |
| 151 | 387.8 | 1 | Type 2/0.25 | 5 | 47.5 | — | — | 47.5 |
| 152 | 387 | 0.6 | Type 3/0.01 | 5 | 47.5 | 47.5 | — | — |
| 153 | 387 | 0.6 | Type 3/0.01 | 5 | 85 | — | 10 | — |
| 154 | 387 | 0.6 | Type 3/0.01 | 5 | 47.5 | — | — | 47.5 |
| 155 | 397.5 | 3 | Type 4/2.0 | 5 | 47.5 | 47.5 | — | — |
| 156 | 397.5 | 3 | Type 4/2.0 | 5 | 85 | — | 10 | — |
| 157 | 397.5 | 3 | Type 4/2.0 | 5 | 47.5 | — | — | 47.5 |
| 158 | 397.5 | 3 | Type 4/2.0 | 5 | 95 | — | — | — |

TABLE 14

| Ex.No. | SC [%] | Part. size emulsion $d_z$ nm | Part. size dispersion $d_z$ nm |
|---|---|---|---|
| 123 | 19.8 | 124 | 134 |
| 124 | 19.7 | 105 | 137 |
| 125 | 19.9 | 98 | 116 |
| 126 | 19.6 | 113 | 117 |
| 127 | 19.8 | 102 | 124 |
| 128 | 19.9 | 103 | 115 |
| 129 | 19.6 | 102 | 112 |
| 130 | 19.8 | 108 | 152 |
| 131 | 19.7 | 103 | 148 |
| 132 | 20 | 111 | 149 |
| 133 | 20 | 138 | 130 |
| 134 | 19.7 | 153 | 132 |
| 135 | 19.8 | 490 | 97 |
| 136 | 20 | 126 | 142 |
| 137 | 19.8 | 120 | 143 |
| 138 | 19.9 | 171 | 126 |
| 139 | 19.7 | 149 | 147 |
| 140 | 19.9 | 141 | 139 |
| 141 | 19.4 | 156 | 137 |
| 142 | 19 | 141 | 186 |
| 143 | 18.9 | 161 | 189 |
| 144 | 18.6 | 178 | 182 |
| 145 | 19.2 | 189 | 163 |
| 146 | 19 | 152 | 179 |
| 147 | 19.4 | 177 | 175 |
| 148 | 19 | 199 | 165 |
| 149 | 20 | 114 | 97 |
| 150 | 20 | 125 | 108 |
| 151 | 19.7 | 131 | 125 |
| 152 | 19.9 | 141 | 160 |
| 153 | 20.0 | 150 | 133 |
| 154 | 20.5 | 138 | 134 |
| 155 | 20.0 | 132 | 95 |
| 156 | 19.9 | 157 | 113 |
| 157 | 19.6 | 131 | 114 |
| 158 | 19.7 | 178 | 133 |

XI. Preparation and Performance Testing of the Pigmented Formulations of the Invention (in the Form of a Paper Coating Slip) (Examples A1 to A10 and Comparative Examples CA1 and CA2)

Preparation (Examples A1 to A10)

The polymers of the invention with optical brightener were blended together with the components indicated below to form a colored paper coating slip (parts are by weight). The stated solids content was established by adding water.

70 parts of finely divided chalk (Hydrocarb 90)

30 parts of finely divided clay (Amazon 88)

0.5 part of carboxymethylcellulose (CMC 7 L2T)

0.4 part of a sodium salt of a polyacrylic acid having a molecular weight of 4000 (Polysalz S from BASF AG)

14 parts of binder polymer in the form of an aqueous emulsion polymer based on styrene/butyl acrylate (Acronal® S728 from BASF AG)

6 parts of polymer with optical brightener (Table 15)

Solids content: 60% pH: 8.8 to 9.1 (established using NaOH)

Comparative Example CA1 was prepared in the same way. In contradistinction to Examples A1 to A10, CA1 contains no polymer with optical brightener and 20 parts (rather than 14 parts) of binder polymer.

In contradistinction to CA1, Comparative Example CA2 contains an additional 0.9 part by weight of a water-soluble brightener based on stilbene (Blankophor® PSG from Bayer AG, Leverkusen).

Processing:

These paper coating slips were processed further as follows:

The untreated paper used was a mechanical untreated coating paper (unsatinized) with a basis weight of 38 g/m². The coating slip was applied on both sides at 6 g/m² per side on a pilot plant coating machine (application technique: roller, metering technique: blade) at a rate of 1000 m/min. The paper web was adjusted to a paper moisture content of 5.0% by means of an IR drying unit and air drying.

The paper web was smoothed by single passage through a supercalender. Here, the linear pressure was 250 kN/m, the belt speed was 300 m/min and the temperature was 80° C.

Analysis:

The quality of the coated papers was analyzed on the basis of the CIE whiteness in accordance with DIN 6174. Measurement was made using an Elrepho type Datacolor 2000 spectrophotometer. The results are indicated in Table 15.

To determine the thermal stability, the coated papers were stored at 120° C. for 48 h and then subjected to measurement as described. The results are indicated in Table 15.

To determine the UV stability, the coated papers were exposed to light in the range of 300–800 nm ($\lambda_{max}$ 450 nm) using an Atlas Suntest XLS Plus xenon lamp with an output density of 250 W/m² for 8 h and then subjected to measurement. The results are indicated in Table 15.

TABLE 15

| Examples | Polymer with optical brightener (Ex.) | Optical brightener Type | % [1] | CIE whiteness UV [3] | CIE whiteness thermal [4] |
|---|---|---|---|---|---|
| CA1 | — | — | — | 18.6 | 32.9 |
| CA2 | — | B [2] | 0.9 | 23.8 | 39.6 |
| A1 | 123 | 1 | 0.03 | 30.7 | 43.4 |
| A2 | 124 | 1 | 0.0012 | 31.1 | 43.0 |
| A3 | 125 | 1 | 0.006 | 32.7 | 42.0 |
| A4 | 126 | 2 | 0.03 | 32.4 | 42.1 |
| A5 | 127 | 2 | 0.006 | 31.4 | 42.7 |
| A6 | 128 | 2 | 0.0012 | 29.2 | 41.9 |
| A7 | 129 | 1 | 0.0006 | 29.3 | 41.5 |
| A8 | 130 | 1 | 0.003 | 28.9 | 42.0 |
| A9 | 136 | 1 | 0.0006 | 29.1 | 41.1 |
| A10 | 137 | 1 | 0.003 | 30.1 | 40.9 |

[1] % by weight, based on 100% by weight filler/pigment
[2] B = Blankophor PSG
[3] after 8 hours of UV exposure (see above)
[4] after 48 hours of thermal exposure (see above)

We claim:

1. A process for preparing dye-comprising aqueous polymer dispersions by aqueous emulsion polymerization of ethylenically unsaturated monomers in the presence of free-radical initiators, in which process at least some of the monomers are employed in the form of an oil-in-water emulsion E1 whose disperse phase comprises at least one oil-soluble dye, wherein the disperse phase of E1 is formed essentially of dye-comprising monomer droplets having an average diameter <500 nm.

2. A process as claimed in claim 1, wherein the ethylenically unsaturated monomers comprise at least one monoethylenically unsaturated monomer A having a water solubility >0.01 g/l and at least one monoethylenically unsaturated monomer B having a water solubility <0.01 g/l.

3. A process as claimed in claim 1, wherein oil droplets of the oil-in-water emulsion E1 comprise a noncopolymerizable compound B' having a water solubility <0.01 g/l.

4. A process as claimed in claim 1, wherein the ethylenically unsaturated monomers comprise at least one monomer C which has at least two nonconjugated double bonds.

5. A process as claimed in claim 4, wherein the ethylenically unsaturated monomers comprise at least one monoethylenically unsaturated monomer D which is different from the at least one monomer C and has a crosslinking action.

6. A process as claimed in claim 1, wherein the oil-soluble dye is selected from the group consisting of oil-soluble derivatives of naphthalene, perylene, terrylene, quaterrylene, diketopyrrolopyrrole, from perinone dyes, coumarin dyes, oxazine dyes, anthracene dyes, azo dyes, anthraquinone dyes, methine dyes, azamethine dyes, isoindoline dyes and isoindolinone dyes, porphyrins, phthalocyanines and naphthalocyanines.

7. A process as claimed in claim 1, wherein the oil-soluble dye is an optical brightener.

8. A process as claimed in claim 7, wherein the optical brightener is selected from compounds from the classes of the bisstyrylbenzenes, stilbenes, benzoxazoles, coumarins, pyrenes and naphthalenes.

9. A process as claimed in claim 1, wherein the oil-soluble dye has at least one copolymerizable, ethylenically unsaturated double bond which does not belong to the chromophore of the dye.

10. A process as claimed in claim 9, wherein the oil-soluble organic dye is selected from perylene dyes of the formula III:

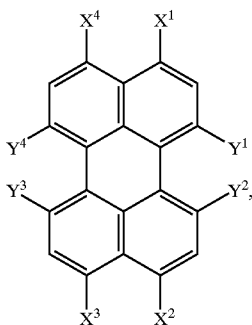

(III)

in which one or two of the groups $X^1$ to $X^4$, $Y^1$ to $Y^4$ is or are a radical of the formula IV $$—X—S—P \qquad (IV)$$

in which

X is selected from a single bond, ethynylene or —(CH$_2$)$_k$—X'— where k=0, 1, 2, 3 or 4 and X' is selected from —O—; —N(R)—; —S—; —O—C(O)—; —O—C(O)—O—; —O—C(O)—NR')—; —N(R')—C(O)—; —N(R')—C(O)—O—; —N(R')—C(O)—N(R")—; —C(O)—; —C(O)—O—; —C(O)—N(R')—; —S(O)$_2$—O—; —S(O)$_2$—NR')—; —O—S(O)$_2$—; —N(R')—S(O)$_2$—;

in which R is hydrogen, linear or branched C$_1$–C$_6$-alkyl, aryl, aryl-C$_1$–C$_6$-alkyl, C$_1$–C$_6$-alkylcarbonyl, arylcarbonyl or formyl and R', R" independently of one another are hydrogen, linear or branched C$_1$–C$_6$-alkyl, aryl or aryl-C$_1$–C$_6$-alkyl which are optionally substituted by OH, halogen, C$_1$–C$_4$-alkyl or C$_1$–C$_4$-alkyloxy, S is selected from a single bond, C$_1$–C$_{12}$-alkylene which can be interrupted by one or more nonadjacent oxygen atoms, sulfur atoms or (alkyl)imino groups, or is 1,2-, 1,3- or 1,4-phenylene which optionally has one or two substituents selected from C$_1$–C$_4$-alkyl, C$_1$–C$_4$-alkyloxy or halogen, or is 1,2-, 1,3- or 1,4-xylylene which is optionally substituted as for said phenylene, and P is a polymerizable group of the formula II:

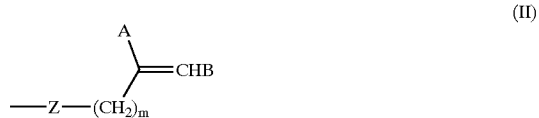

(II)

in which

A and B independently of one another are hydrogen, C$_1$–C$_6$-alkyl or phenyl, or A and B together with the double bond to which they are attached form a cyclopentene or cyclohexene ring, m is 0, 1, 2 or 3, and Z is a single bond or possesses one of the definitions indicated above for X', or $X^1$ together with $X^4$ and/or $X^2$ together with $X^3$ are a group of the formula V:

(V)

in which S and P are as defined above, and the remaining groups $X^1$ to $X^4$, $Y^1$ to $Y^4$ independently of one another are selected from hydrogen, linear or branched C$_1$–C$_{12}$-alkyl which can optionally be interrupted by one or more nonadjacent oxygen atoms, sulfur atoms or by (alkyl)imino groups and/or can be substituted by OH and/or halogen, or are cycloalkyl, heterocycloalkyl, aryl, hetaryl, aryl-C$_1$–C$_6$-alkyl, hetaryl-C$_1$–C$_6$-alkyl, C$_2$–C$_{18}$-alkynyl, arylethynyl, tris(C$_1$–C$_4$-alkyl)silylethynyl, cyano, nitro, halogen;

and/or atomic groups selected from: —O—R; —O—C(O)—R'; —N(R')—C(O)—R"; —NRR'; —C(O)—R; —C(O)—OR'; —C(O)—NR'R"; —N(R')—C(O)—OR; —N(R')C(O)—NR'R", —O—S(O)$_2$—R, —N(R')—S(O)$_2$—R", in which R, R' and R" are as defined above, the remaining groups $X^1$ together with $X^4$ and/or $X^2$ together with $X^3$ can furthermore be —X"—C(O)—, —C(O)—N(R''')—C(O)— or —C(O)—O—C(O)—, in which R''' has the definitions indicated for R' and X" is —CH=CH—, 1,2-phenylene, 1,2-naphthylene, 2,3-naphthylene or 2,3-pyridinylene, each of which is unsubstituted or substituted once or twice by C$_1$–C$_4$-alkylene, C$_1$–C$_4$-alkoxy or halogen.

11. A process as claimed in claim 1, wherein the initiator is soluble in water.

12. A process as claimed in claim 11, wherein the water-soluble initiator comprises a nonionic peroxide, and, optionally, one or more reducing agents.

13. A process as claimed in claim 1, wherein the dye-comprising monomer droplets of the oil-in-water emulsion E1 have an average diameter $\bar{d}_z$ in the range from 100 to 400 nm.

14. A process as claimed in claim 1, wherein the oil-in-water emulsion E1 is prepared by homogenizing a conventional, dye-comprising oil-in-water emulsion of the monomers by means of ultrasound, the dye in the monomer droplets of the conventional emulsion being in dissolved or molecularly disperse form.

15. A process for preparing dye-comprising aqueous polymer dispersions by aqueous emulsion polymerization of ethylenically unsaturated monomers in the presence of free-radical initiators, said process comprising:

dissolving at least one oil-soluble dye in the monomers to be polymerized, emulsifying the solution of the at least one oil-soluble dye in the monomers to obtain an oil-in-water macroemulsion in which the dye is dispersed in monomer droplets, homogenizing the oil-in-water macroemulsion to obtain an oil-in-water emulsion E1 in which the disperse phase is formed essentially of dye-comprising monomer droplets having an average diameter <500 nm, and polymerizing said oil-in-water emulsion E1 by contacting said oil-in-water emulsion E1 with at least one initiator under temperature conditions under which the initiator triggers the polymerization of the ethylenically double bonds of the monomers.

16. The process as claimed in claim 15, wherein the dye-comprising monomer droplets of the oil-in-water emulsion E1 have an average diameter $\bar{d}_z$ in the range from 100 to 400 nm.

17. The process as claimed in claim 15, wherein the ethylenically unsaturated monomers comprise at least one monoethylenically unsaturated monomer A having a water solubility >0.01 g/l, and at least one monoethylenically unsaturated monomer B having a water solubility <0.01 g/l.

18. The process as claimed in claim 15, wherein oil droplets of the oil-in-water emulsion E1 comprise a noncopolymerizable compound B' having a water solubility <0.01 g/l.

19. The process as claimed in claim 15, wherein the ethylenically unsaturated monomers comprise at least one monomer C which has at least two nonconjugated double bonds.

20. The process as claimed in claim 19, wherein the ethylenically unsaturated monomers further comprise at least one monoethylenically unsaturated monomer D which is different from the at least one monomer C and has a crosslinking action.

21. The process as claimed in claim 15, wherein the oil-soluble dye is selected from the group consisting of oil-soluble derivatives of perylene, terrylene, quaterrylene, diketopyrrolopyrrole, perinone dyes, coumarin dyes, oxazine dyes, azo dyes, anthraquinone dyes, methine dyes, azamethine dyes, isoindoline dyes and isoindolinone dyes, porphyrins, phthalocyanines and naphthalocyanines.

22. The process as claimed in claim 15, wherein the initiator is soluble in water.

23. The process as claimed in claim 19, wherein the water-soluble initiator comprises a nonionic peroxide and, optionally, one or more reducing agents.

24. The process as claimed in claim 23, wherein the nonionic peroxide comprises hydrogen peroxide.

25. The process as claimed in claim 15, wherein the homogenizing comprises using ultrasound to obtain the oil-in-water emulsion E1, and the dye in the monomer droplets of the oil-in-water macroemulsion is in a dissolved or molecularly disperse form.

26. The process as claimed in claim 15, wherein the monomer emulsion E1 contains at least 1% by weight, based on the monomers, of the at least one oil-soluble dye.

27. The process as claimed in claim 15, wherein the monomer emulsion B1 contains at least 3% by weight, based on the monomers, of the at least one oil-soluble dye.

28. The process as claimed in claim 15, wherein the monomer emulsion E1 contains at least 5% by weight, based on the monomers, of the at least one oil-soluble dye.

* * * * *